Figure 1:
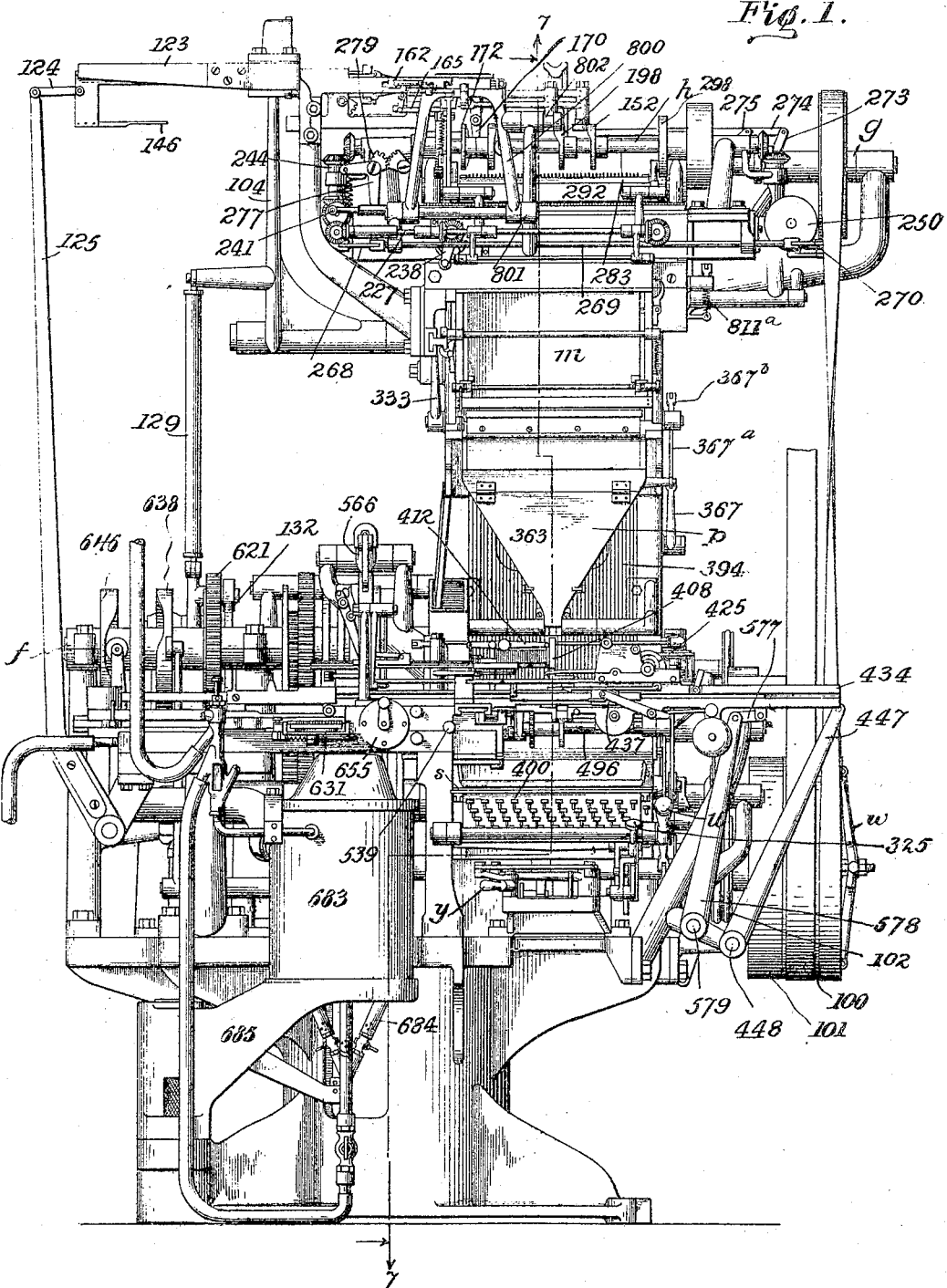

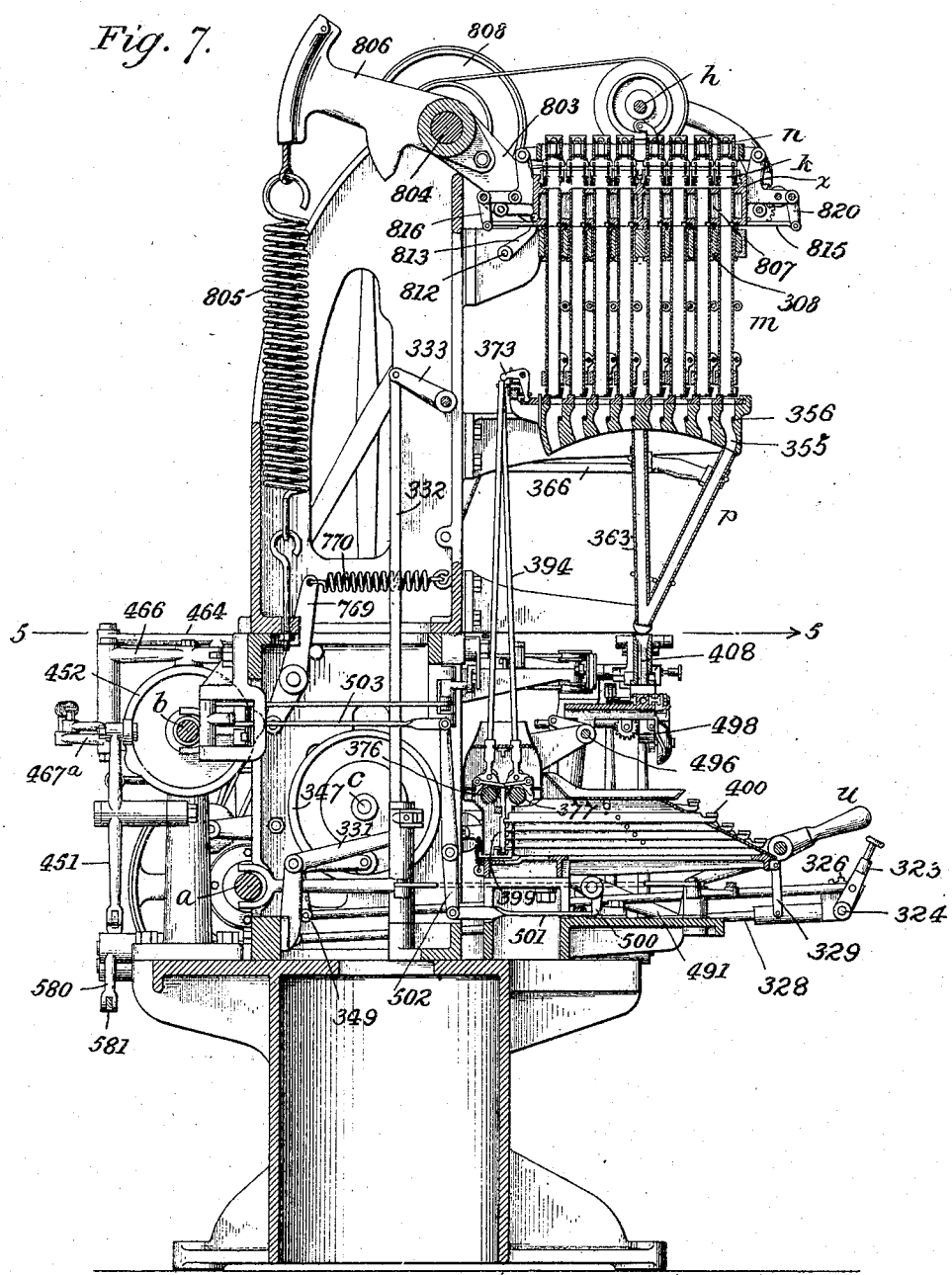

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.

44 SHEETS—SHEET 8.

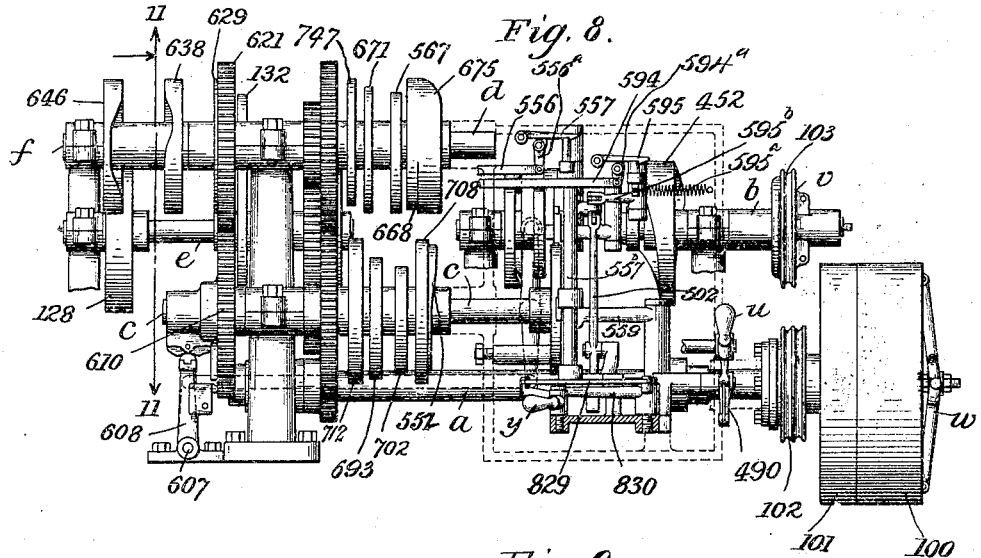

Fig. 8.

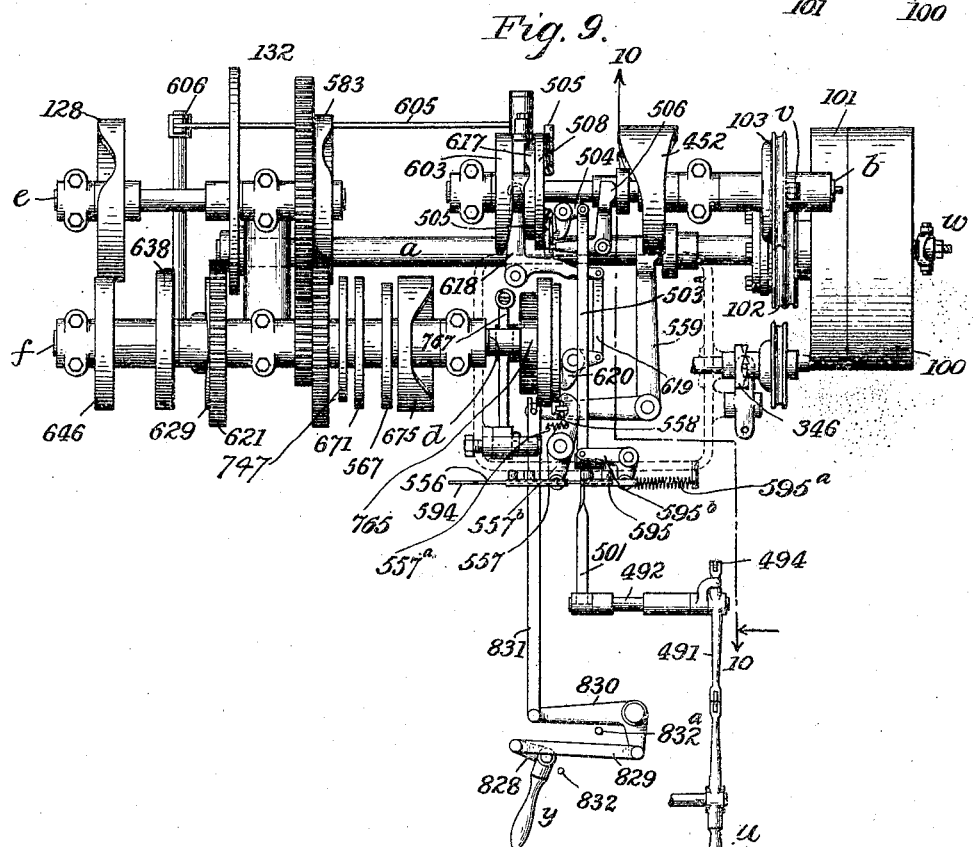

Fig. 9.

Witnesses
Fenton S. Belt
O. W. Clement.

INVENTORS: Safe Deposit and Trust Company of Baltimore, and Abner Greenleaf Executors of OTTMAR MERGENTHALER Deceased, and EMIL LAWRENZ, by J. Watson Attorney No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.

44 SHEETS—SHEET 9.

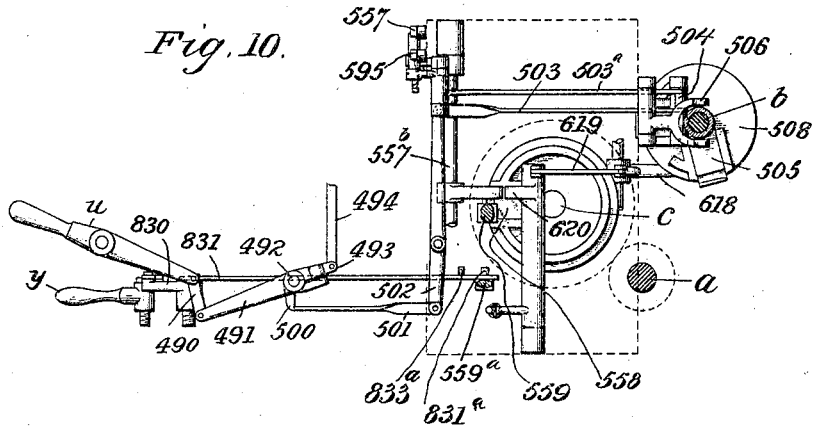

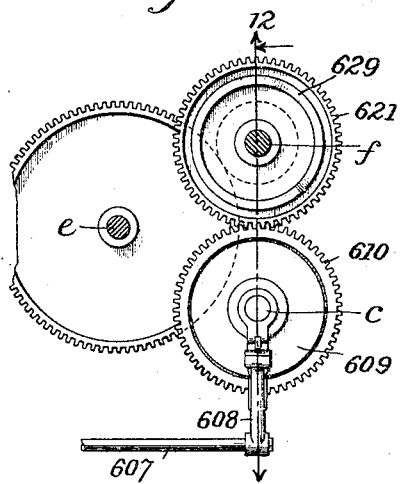

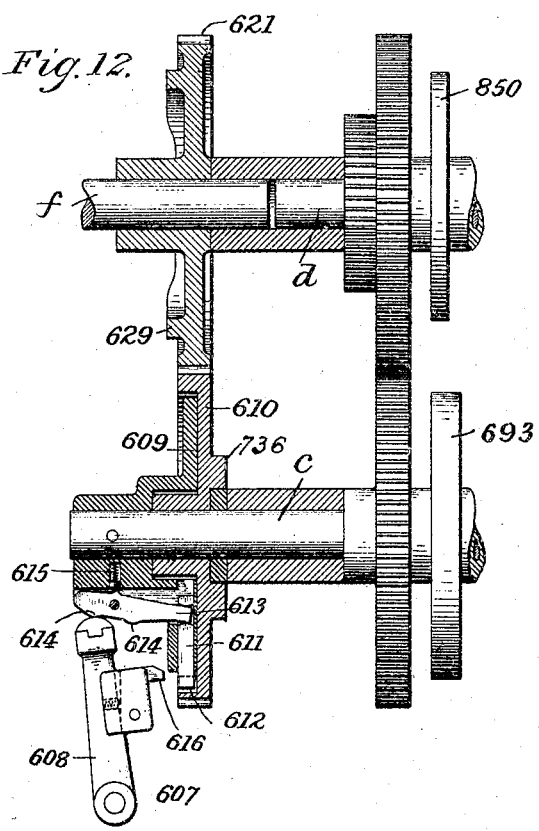

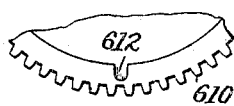

Witnesses
Fenton S. Belt,
C. W. Clement.

INVENTORS: Safe Deposit and Trust Company of Baltimore, and Abner Greenleaf, Executors of OTTMAR MERGENTHALER, Deceased, and EMIL LAWRENZ, by J. W. Watson Attorney.

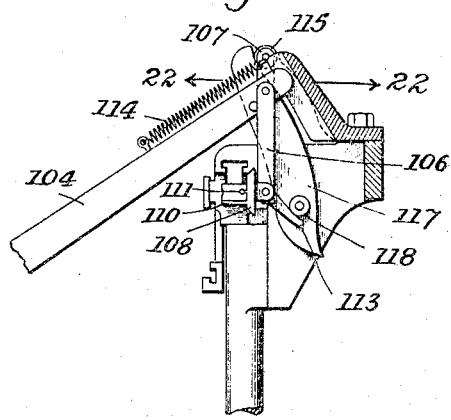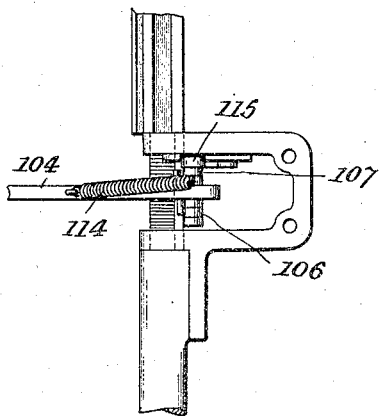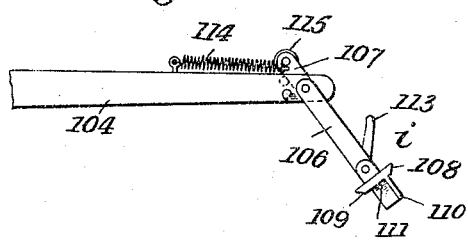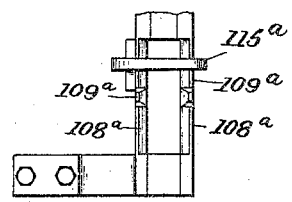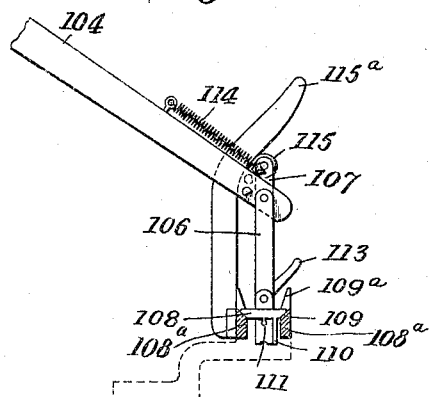

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.
44 SHEETS—SHEET 11.
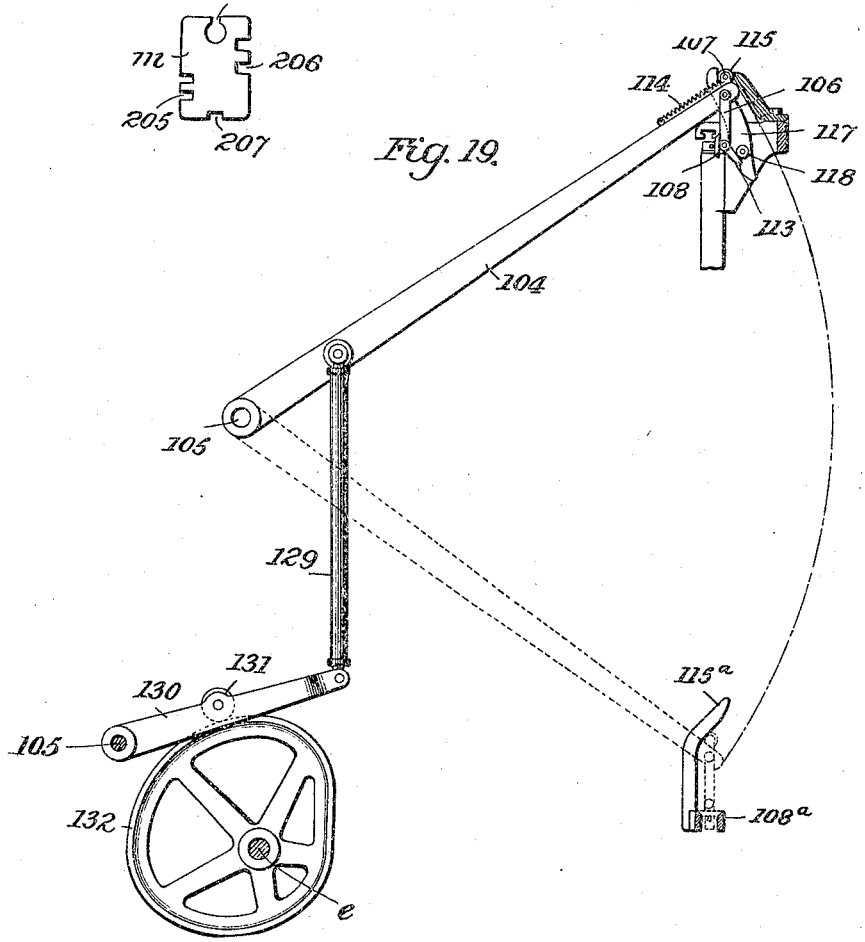

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.

44 SHEETS—SHEET 12.

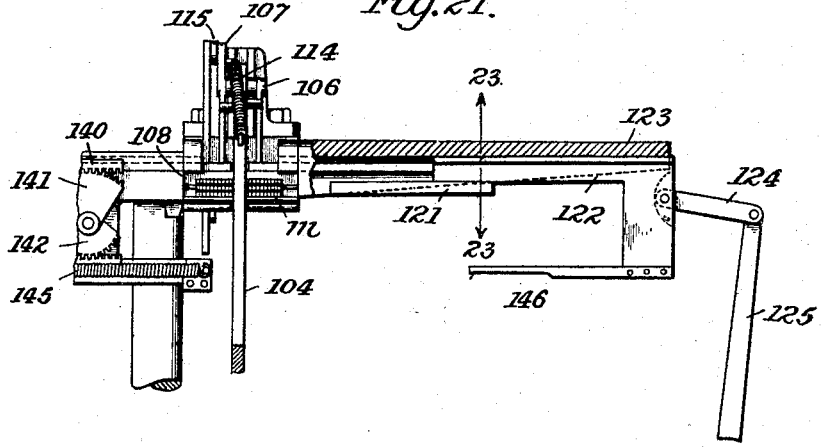

Fig. 21.

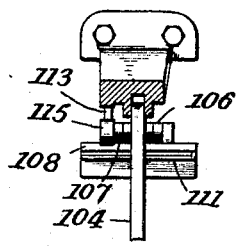

Fig. 22.

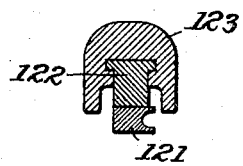

Fig. 23.

Fig. 24.

Witnesses
Fenton S. Pell,
C. W. Clement.

INVENTORS: Safe Deposit and Trust Company of Baltimore, and Abner Greenleaf, Executors of OTTMAR MERGENTHALER, Deceased, and EMIL LAWRENZ, by

 Attorney.

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.

44 SHEETS—SHEET 13.

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.

44 SHEETS—SHEET 14.

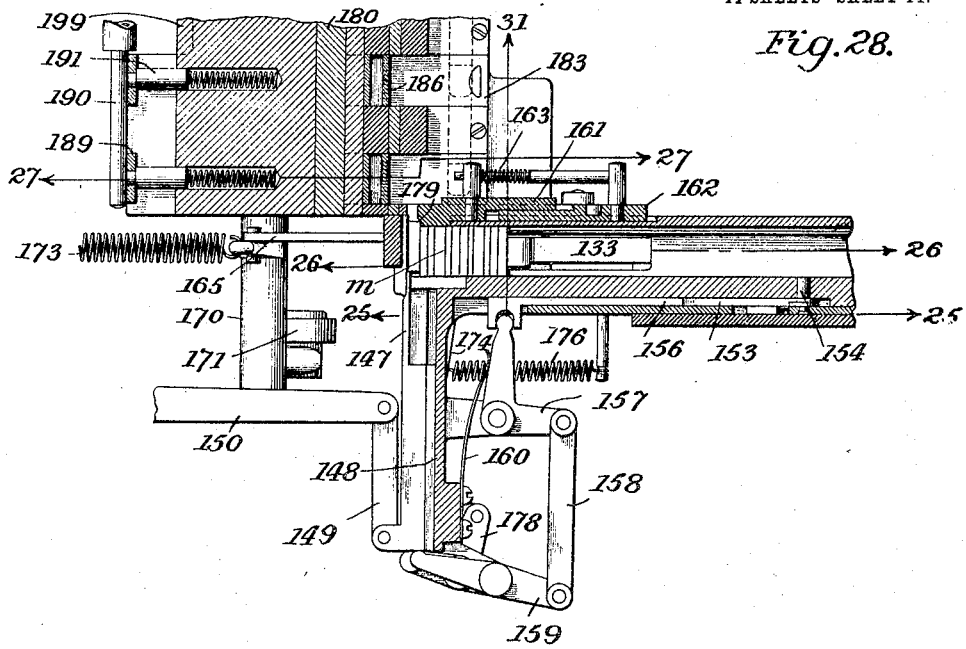

Fig. 28.

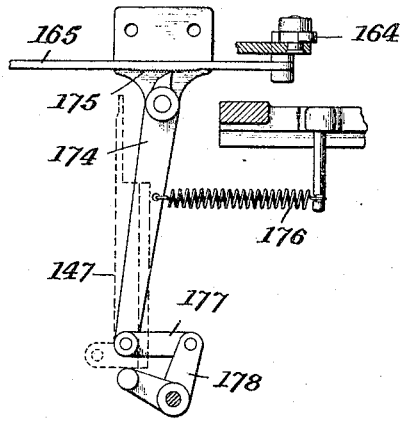

Fig. 29.

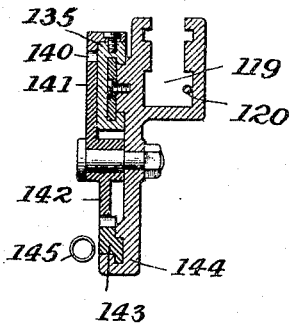

Fig. 30.

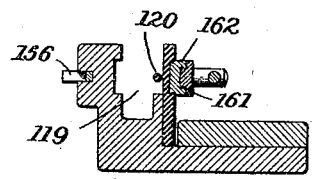

Fig. 31.

Witnesses
Finton S. Belt
G. W. Clement

INVENTORS: Safe Deposit and Trust Company of Baltimore, and Abner Greenleaf, Executors of OTTMAR MERGENTHALER, Deceased, and EMIL LAWRENZ, by, _____ Attorney.

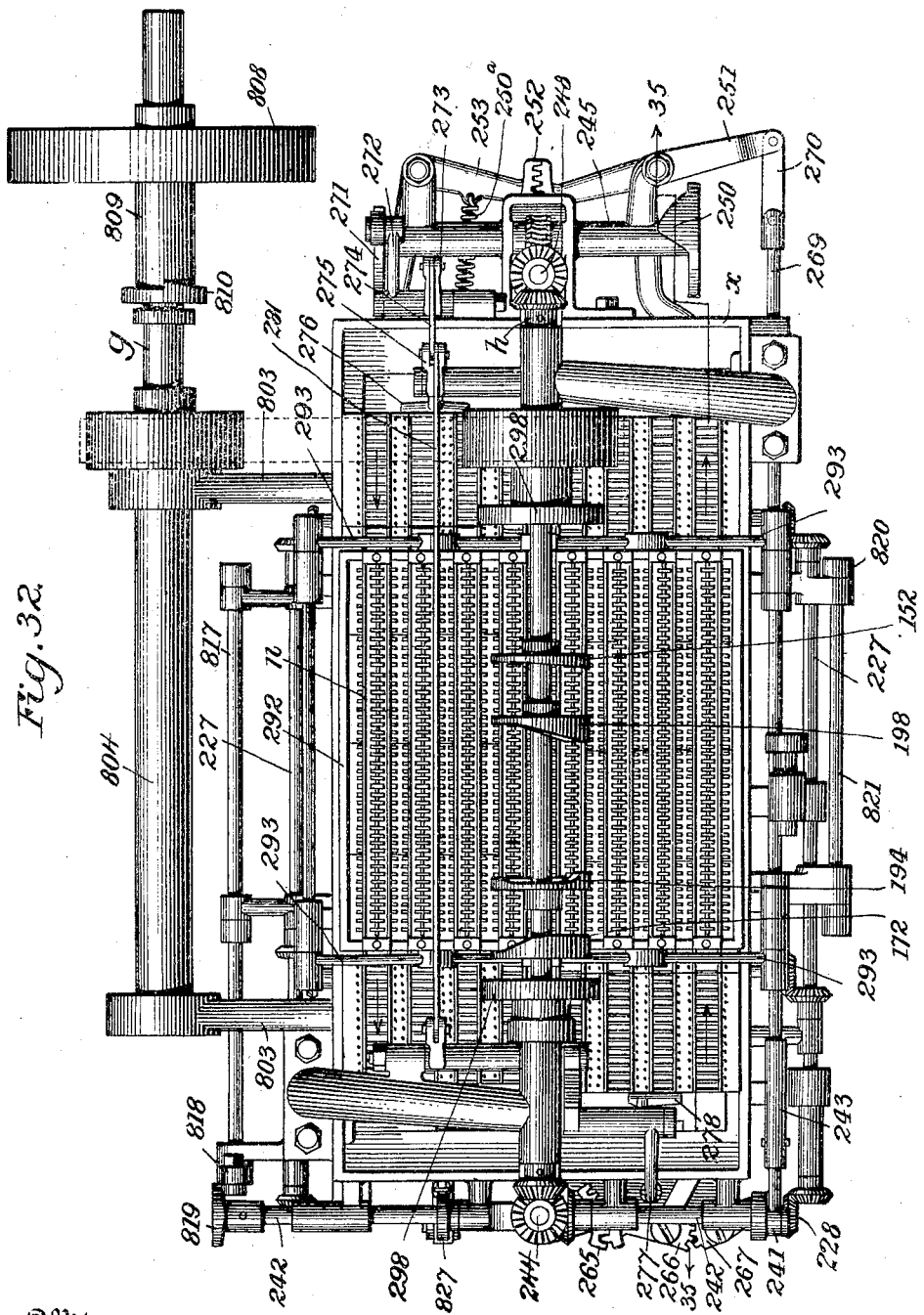

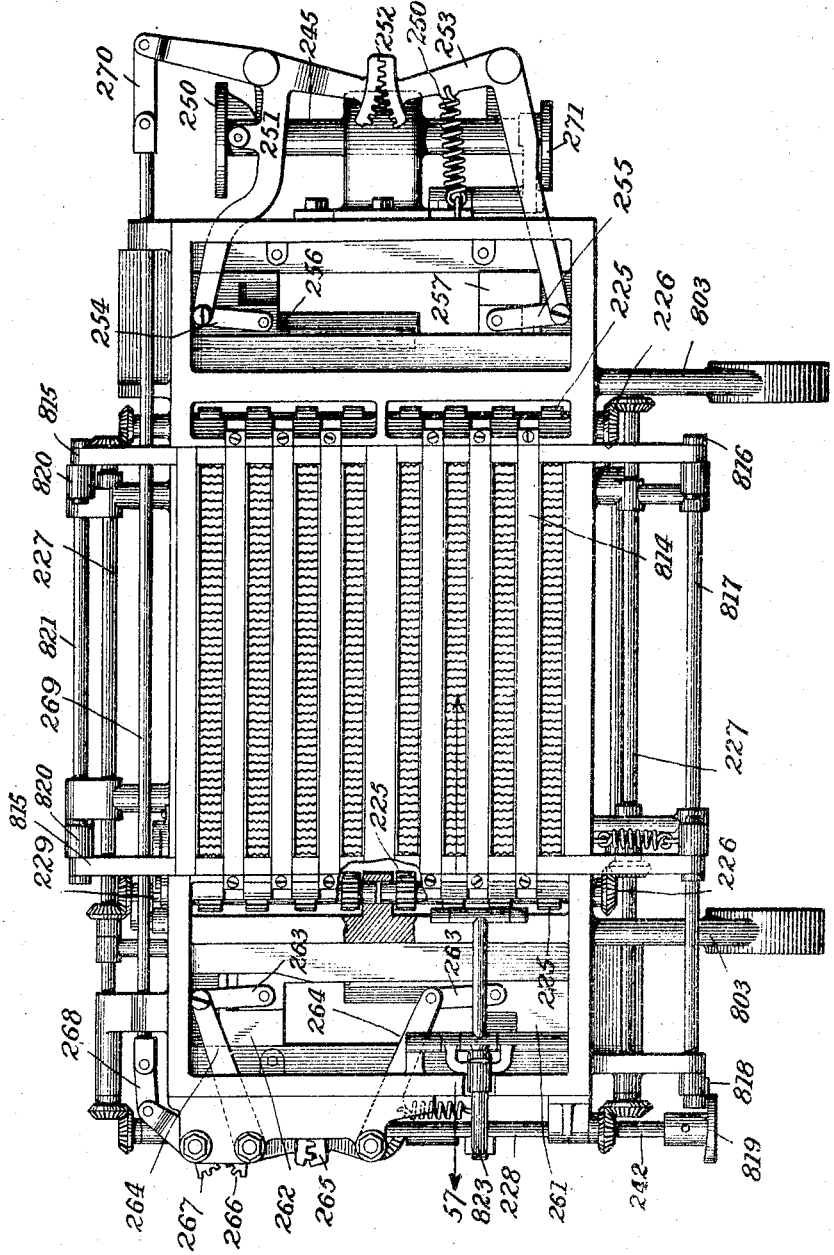

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.

44 SHEETS—SHEET 17.

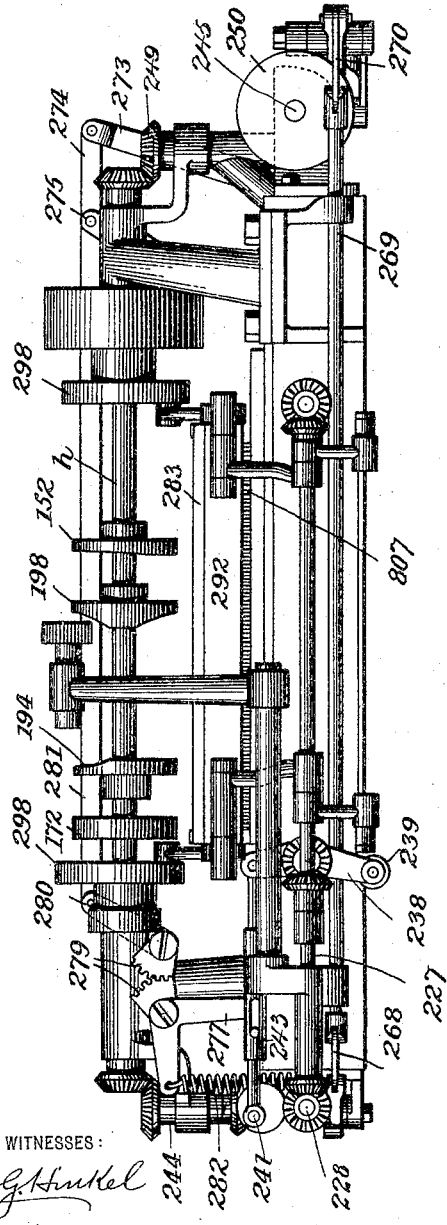

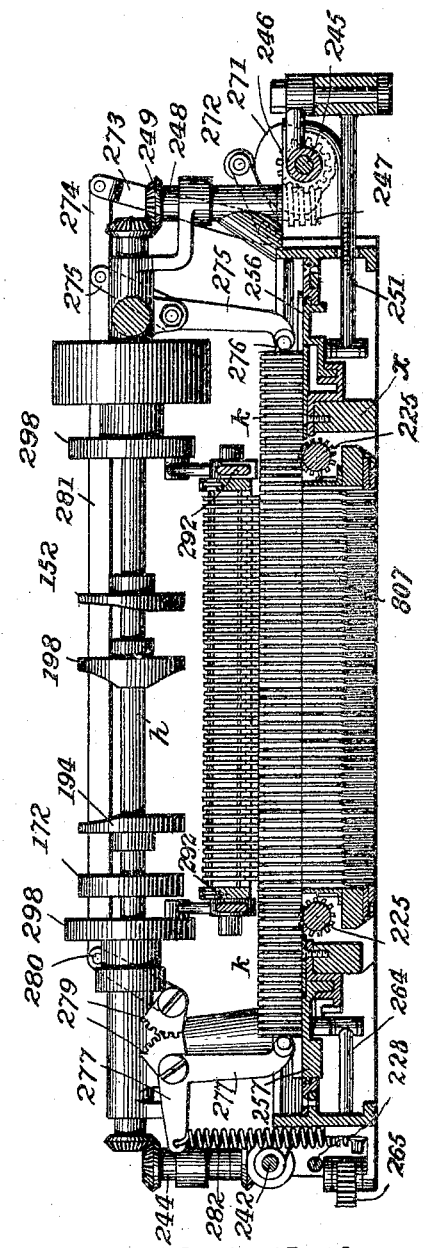

WITNESSES:
J.G.Hinkel
C.W.Clement

INVENTORS: Safe Deposit and Trust Company of Baltimore, and Abner Greenleaf, Executors of OTTMAR MERGENTHALER, Deceased, and EMIL LAWRENZ, by
J.H.Watson —Attorney.

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.
44 SHEETS—SHEET 18.
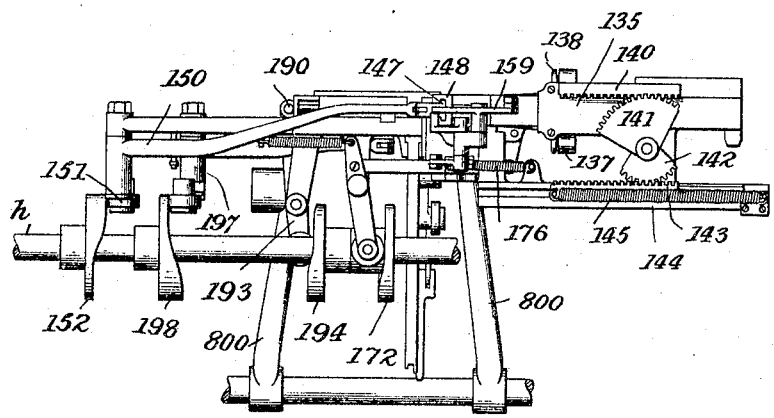
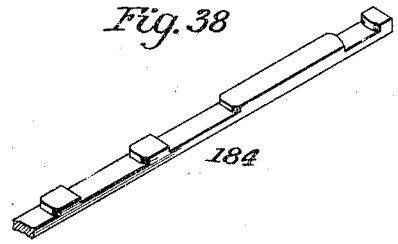
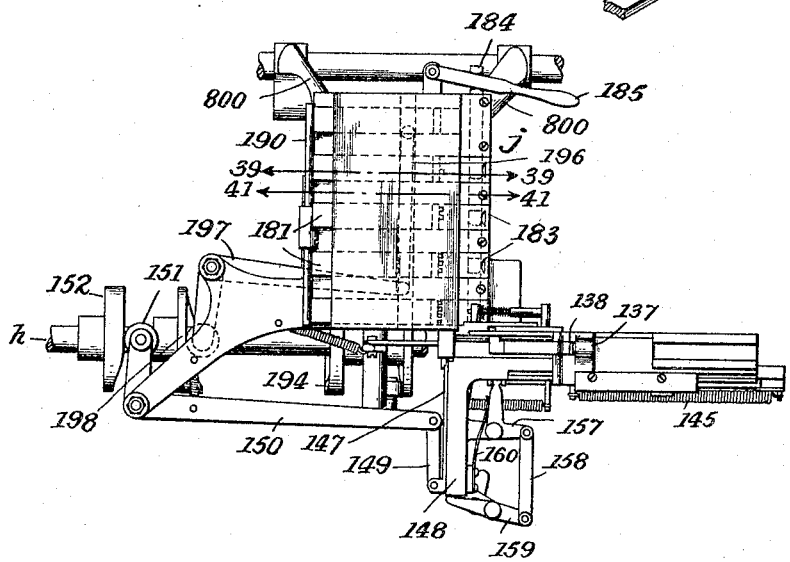

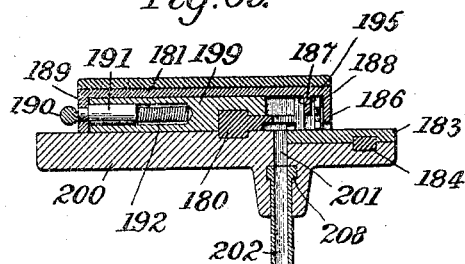
Fig. 39.
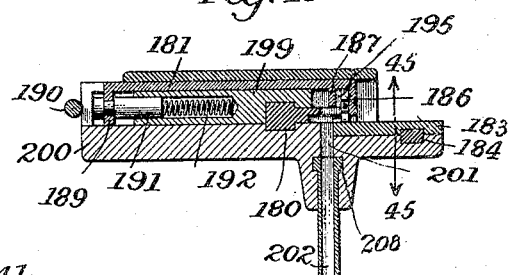
Fig. 40.
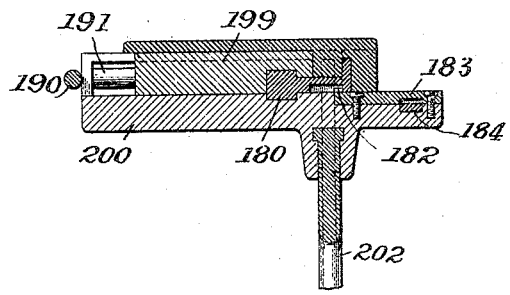
Fig. 41.
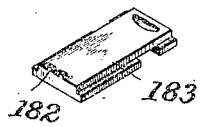
Fig. 42.
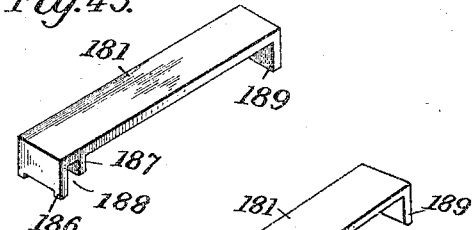
Fig. 43.
Fig. 43.ᵃ
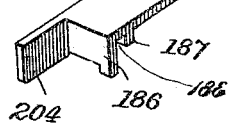
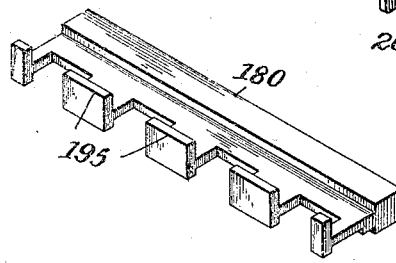
Fig. 44.

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.

44 SHEETS—SHEET 20.

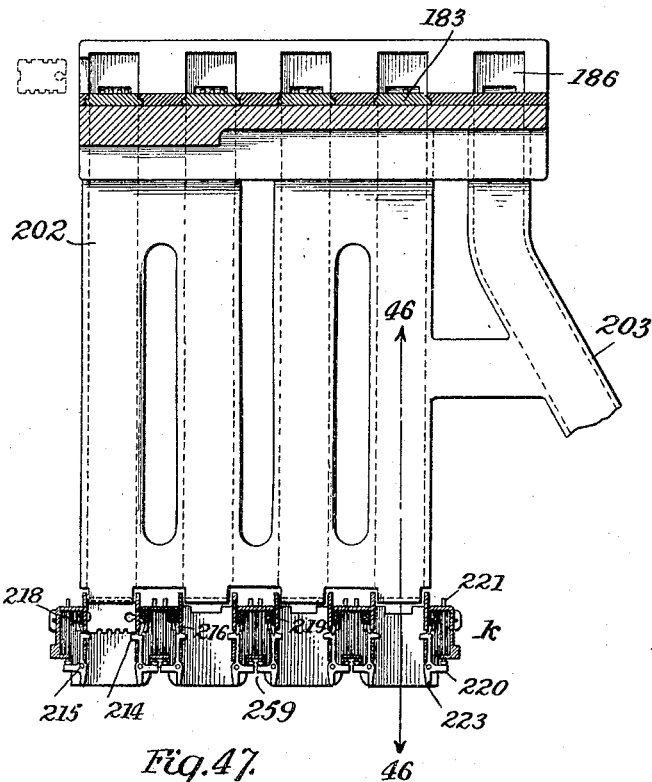

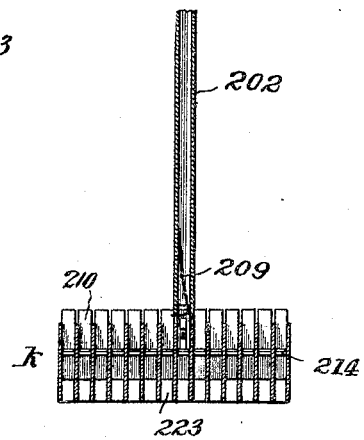

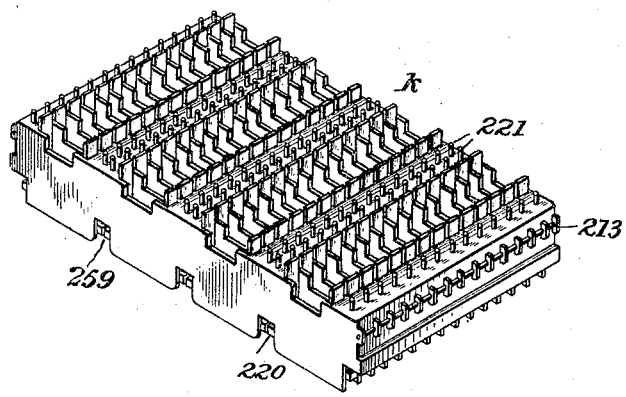

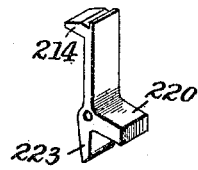

Witnesses
Fenton S. Belt
C. W. Clement

INVENTORS: Safe Deposit and Trust Company of Baltimore, and Abner Greenleaf, Executors of OTTMAR MERGENTHALER, Deceased, and EMIL LAWRENZ, by Attorney.

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.

44 SHEETS—SHEET 21.

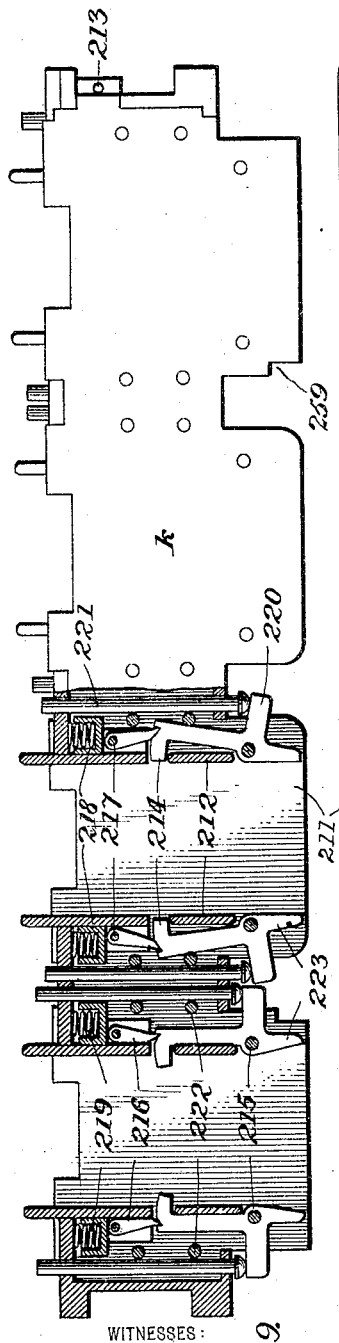

Fig. 49.

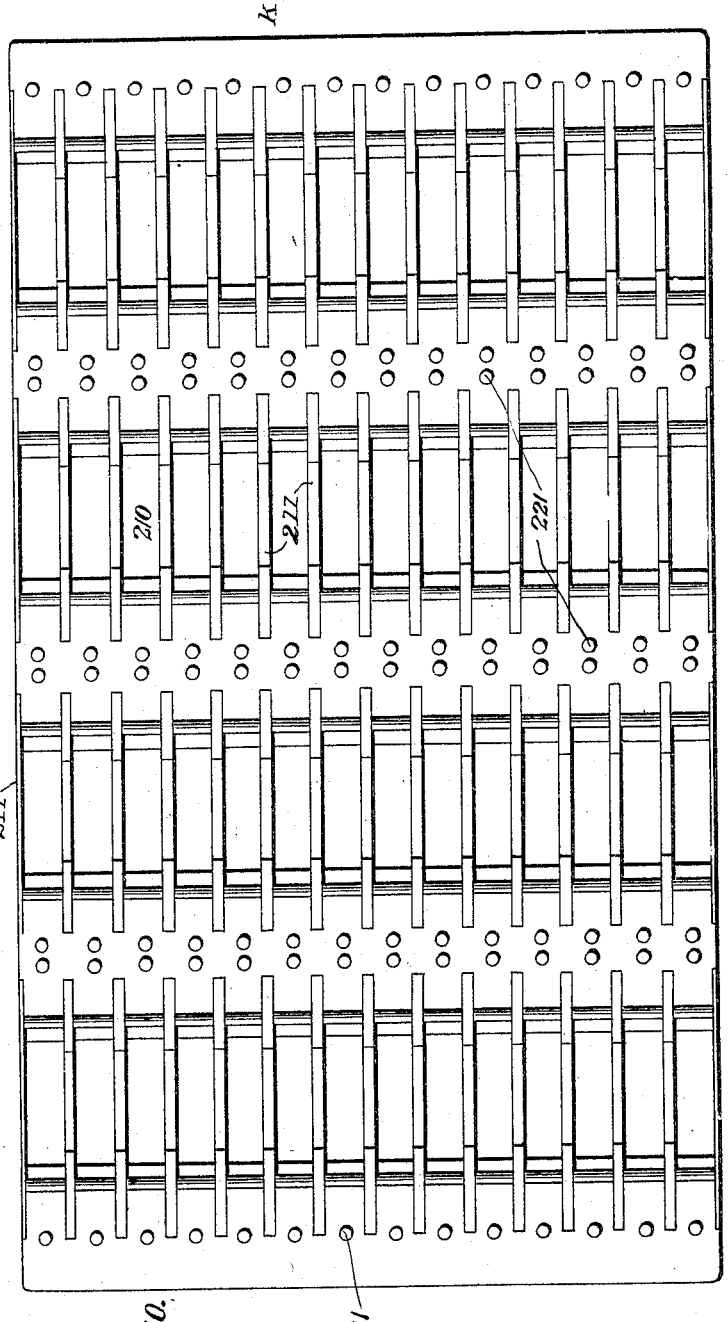

Fig. 50.

WITNESSES:
J. G. Hinkel
C. W. Clement

INVENTORS: Safe Deposit and Trust Company of Baltimore, and Abner Greenleaf, Executors of OTTMAR MERGENTHALER, Deceased, and EMIL LAWRENZ, by J. H. Watson
Attorney.

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS OF O. MERGENTHALER, DEC'D.
TYPOGRAPHIC MACHINE.
APPLICATION FILED DEC. 14, 1901.
44 SHEETS—SHEET 22.
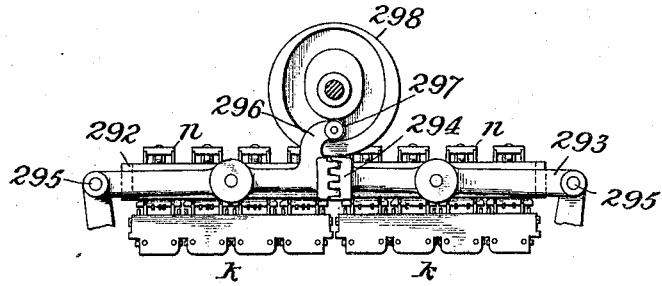
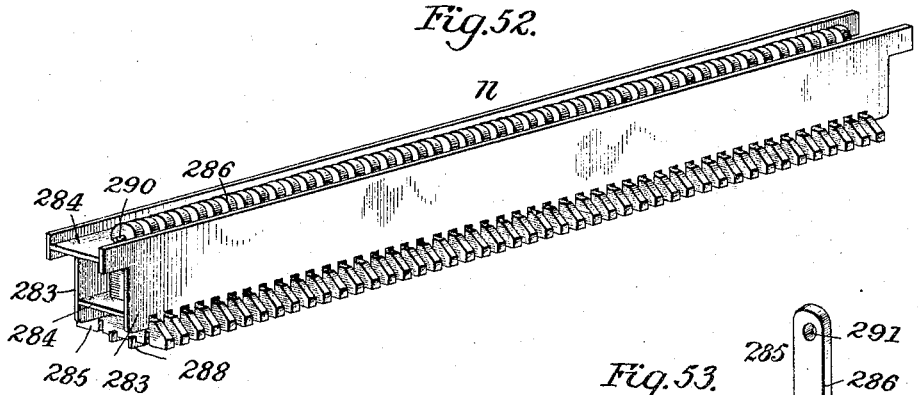
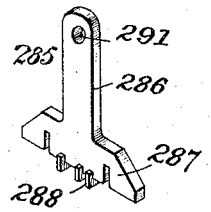
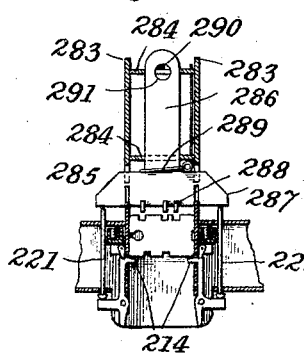
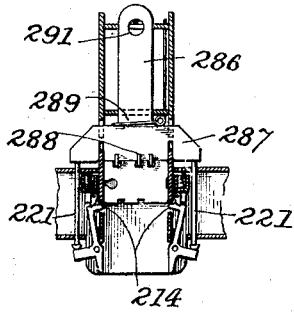
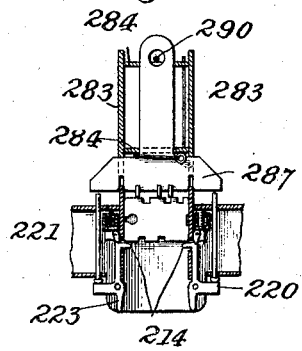

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.

44 SHEETS—SHEET 23.

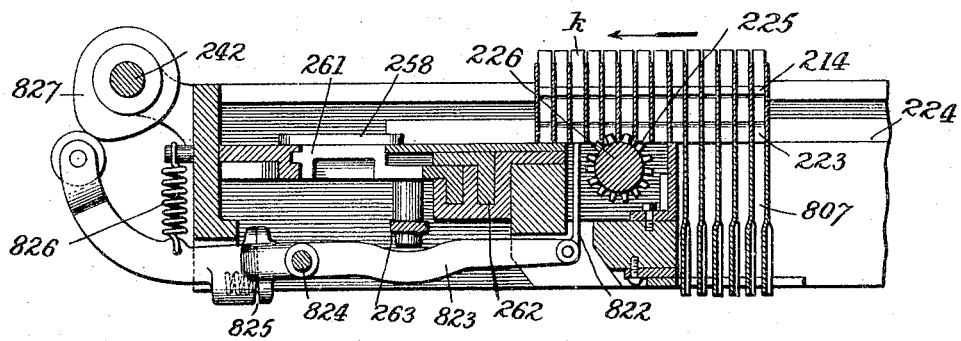

Fig. 57.

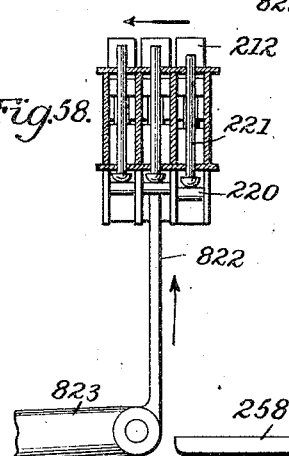

Fig. 58.

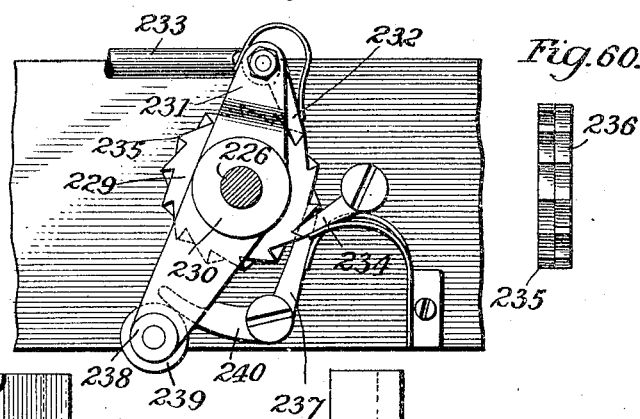

Fig. 59. Fig. 60.

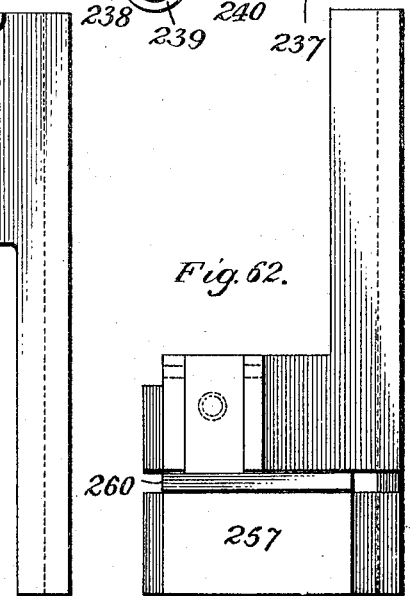

Fig. 61. Fig. 62.

Witnesses
J. G. Hinkel
E. W. Clement

INVENTORS: Safe Deposit and Trust Company of Baltimore, and Abner Greenleaf, Executors of OTTMAR MERGENTHALER, Deceased, and EMIL LAWRENZ, by
_____ Attorney.

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.

44 SHEETS—SHEET 24.

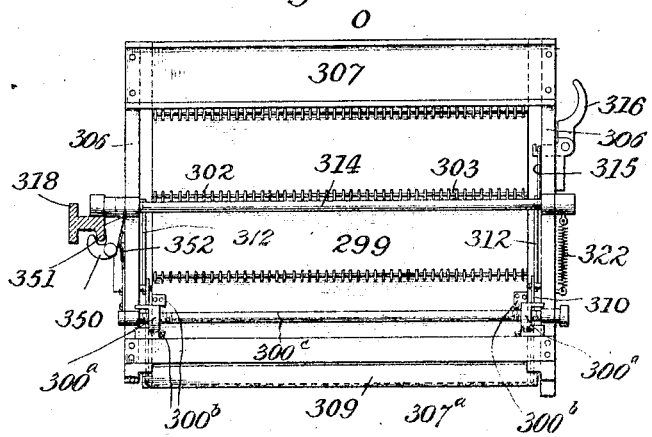
Fig. 63.

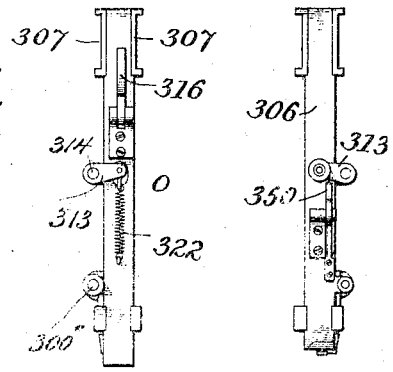
Fig. 64.   Fig. 65.

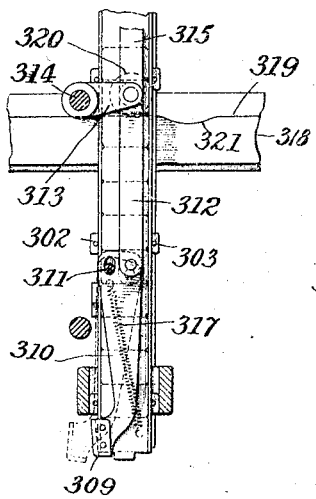
Fig. 66.

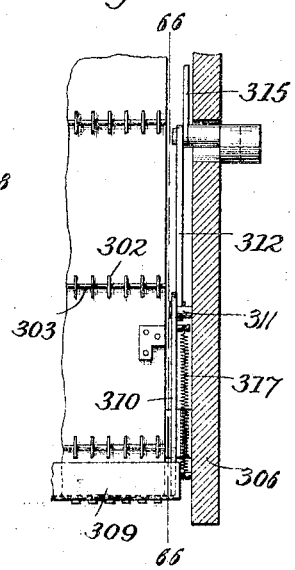
Fig. 67.

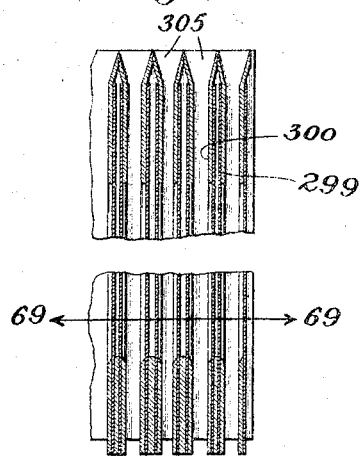
Fig. 68.

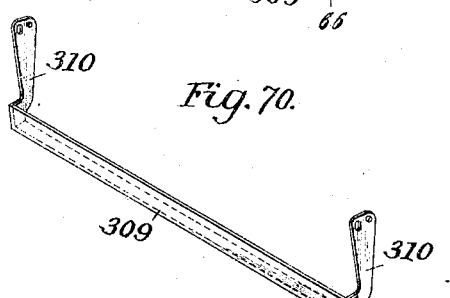
Fig. 70.

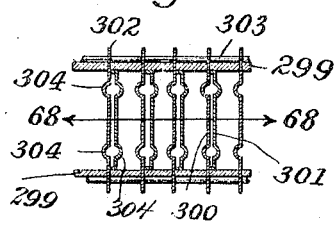
Fig. 69.

Witnesses
Fenton S. Belt
C. W. Clement

INVENTORS: Safe Deposit and Trust Company of Baltimore, and Abner Greenleaf, Executors of OTTMAR MERGENTHALER, Deceased, and EMIL LAWRENZ, by J. H. Watson    Attorney.

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.

44 SHEETS—SHEET 25.

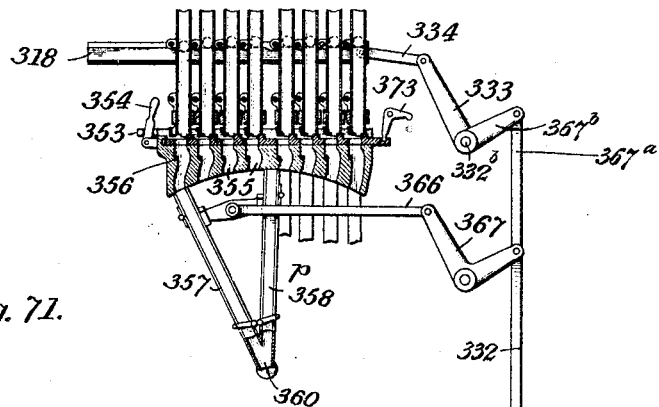

Fig. 71.

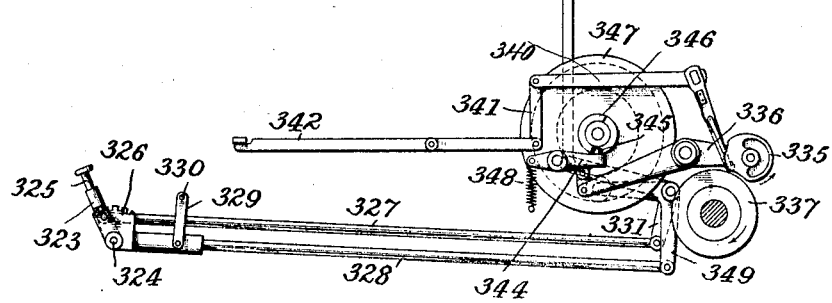

Fig. 72.

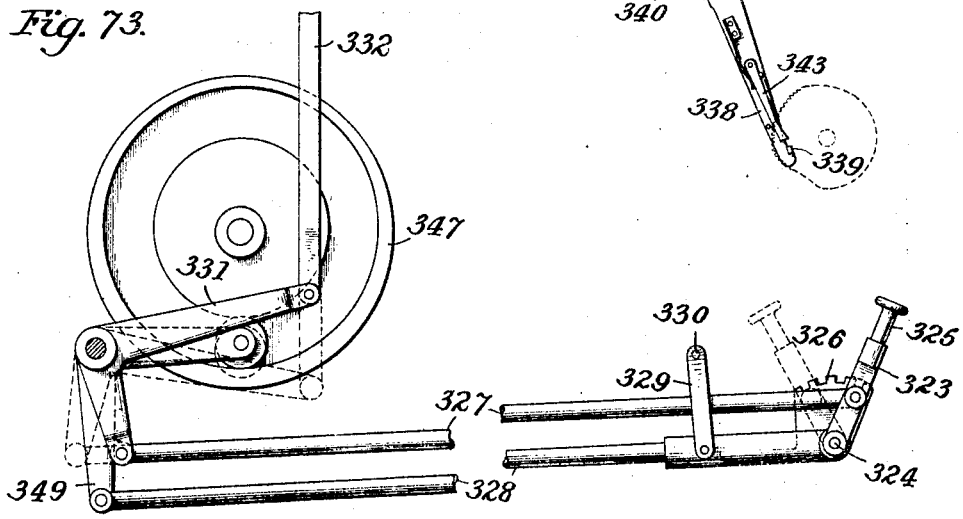

Fig. 73.

Witnesses
Fenton Stott
C. W. Clement

INVENTORS: Safe Deposit and Trust Company of Baltimore, and Abner Greenleaf, Executors of OTTMAR MERGENTHALER, Deceased, and EMIL LAWRENZ, by Watson Attorney.

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.
44 SHEETS—SHEET 26.
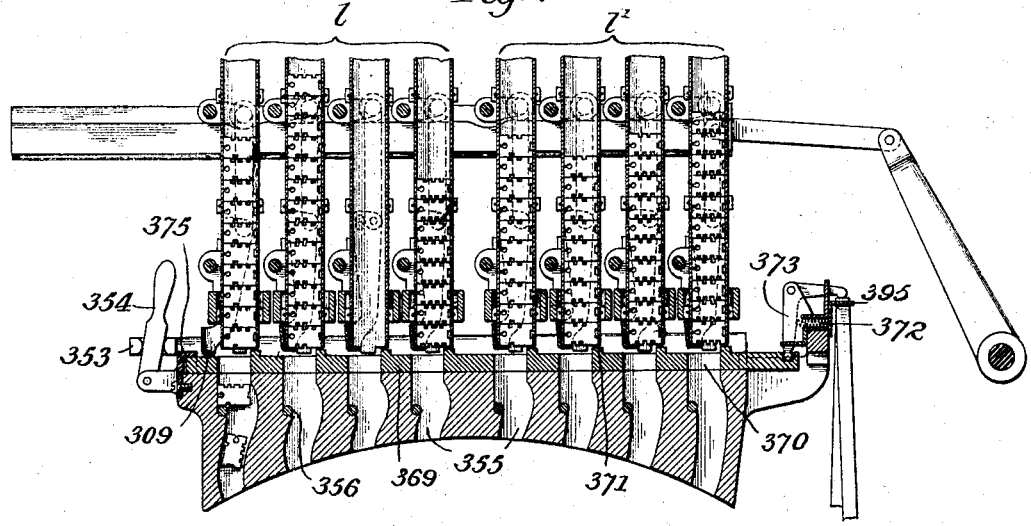
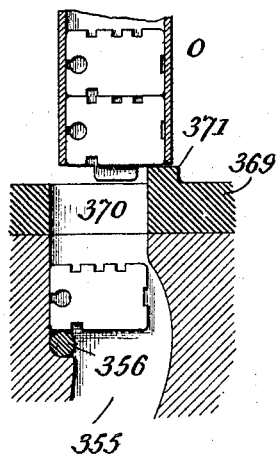
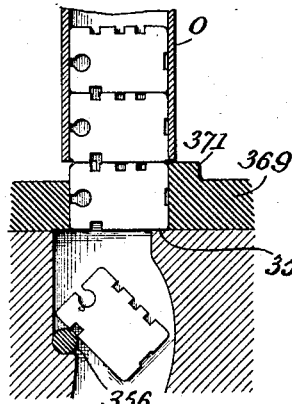
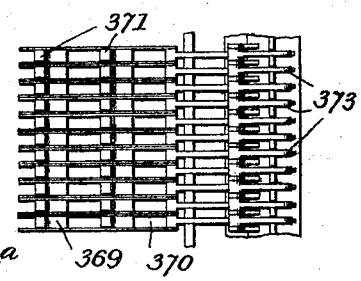
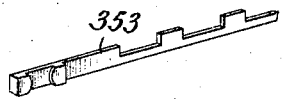
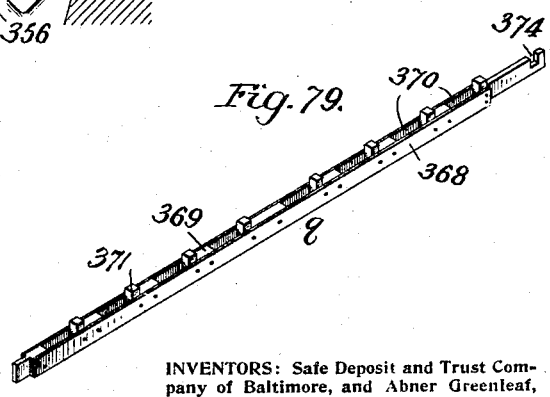
INVENTORS: Safe Deposit and Trust Company of Baltimore, and Abner Greenleaf, Executors of OTTMAR MERGENTHALER, Deceased, and EMIL LAWRENZ, by
*J. W. Watson* Attorney.
Witnesses No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.

44 SHEETS—SHEET 27.

Witnesses

INVENTORS: Safe Deposit and Trust Company of Baltimore, and Abner Greenleaf, Executors of OTTMAR MERGENTHALER, Deceased, and EMIL LAWRENZ, by Attorney.

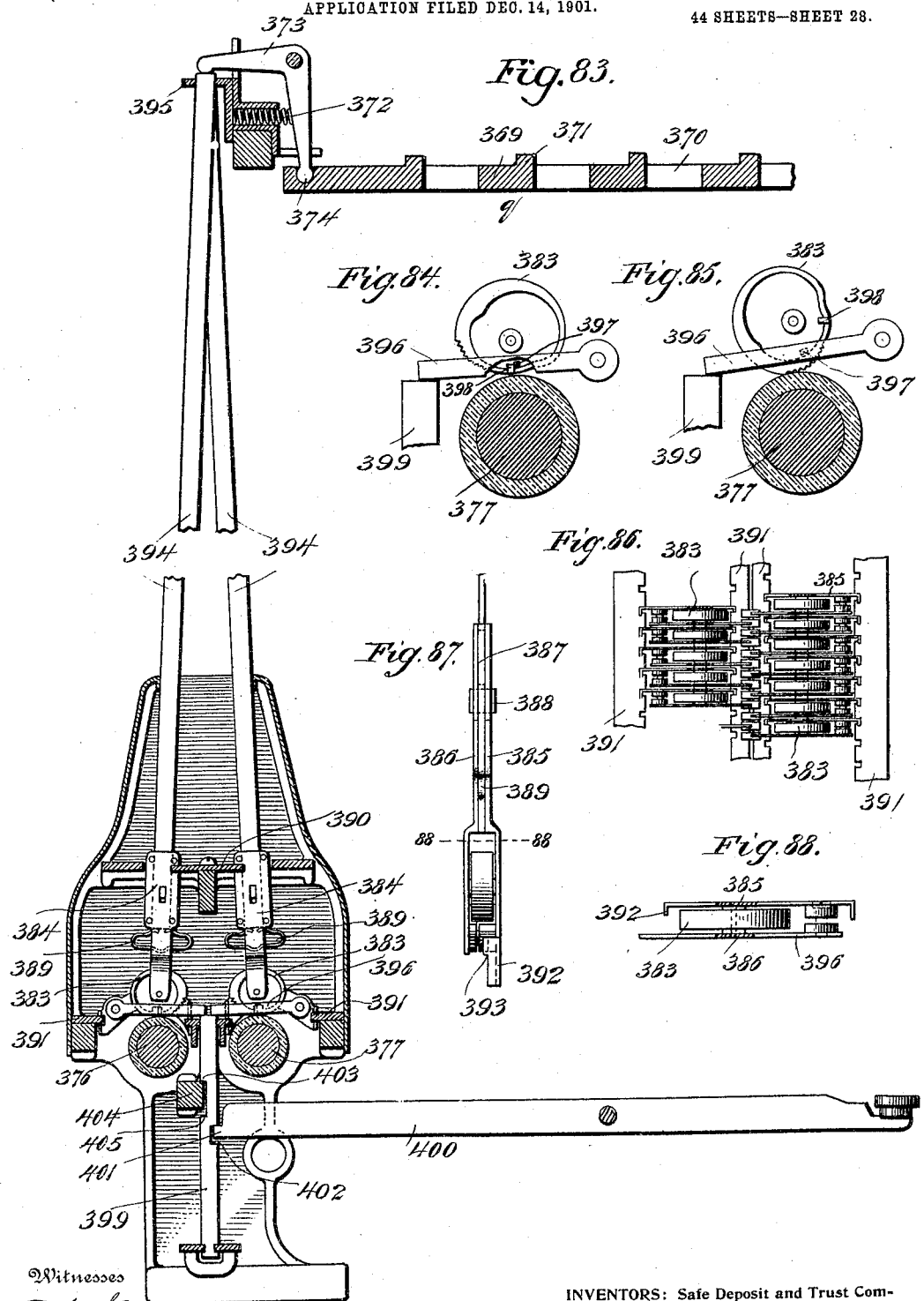

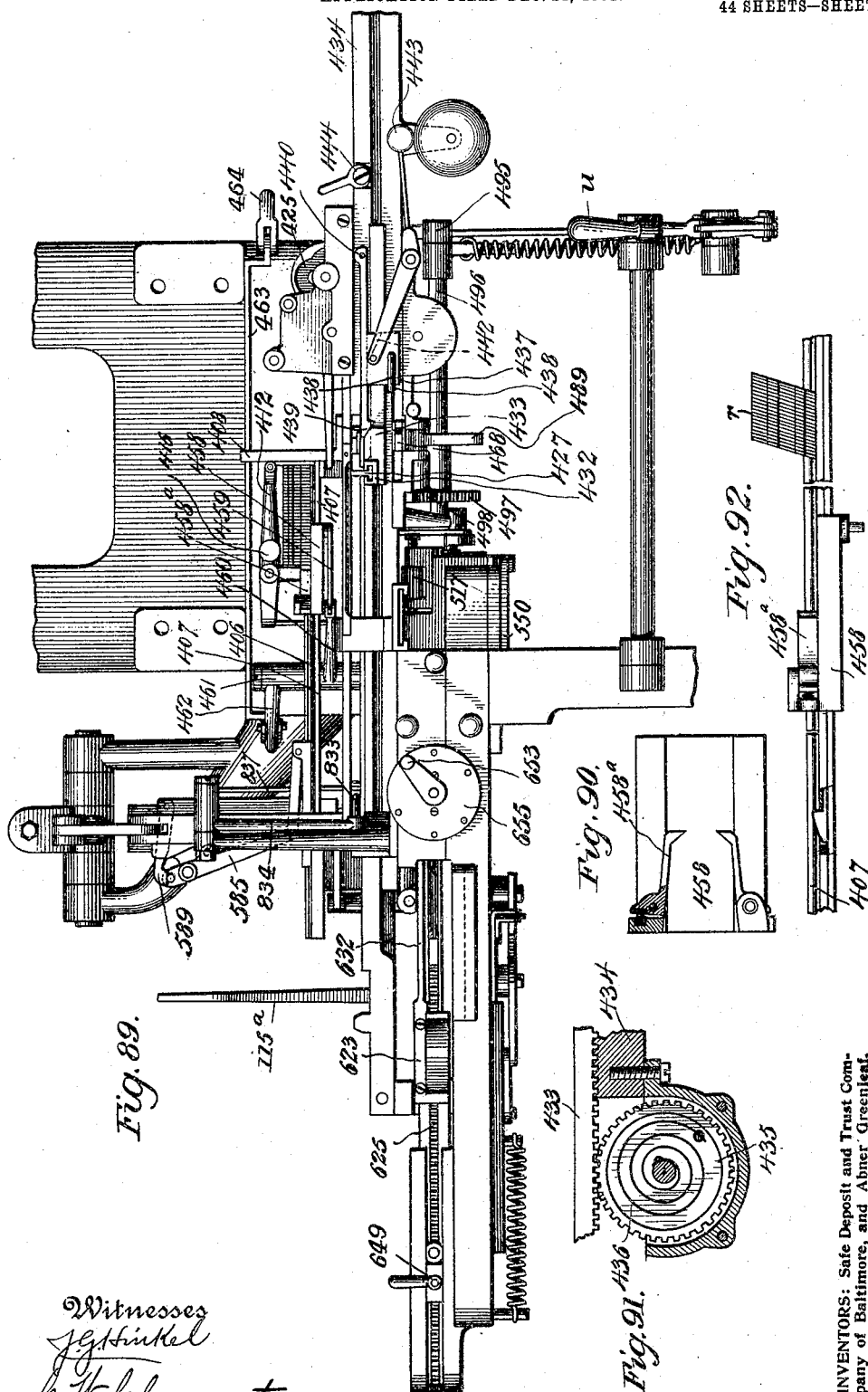

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.
44 SHEETS—SHEET 30.
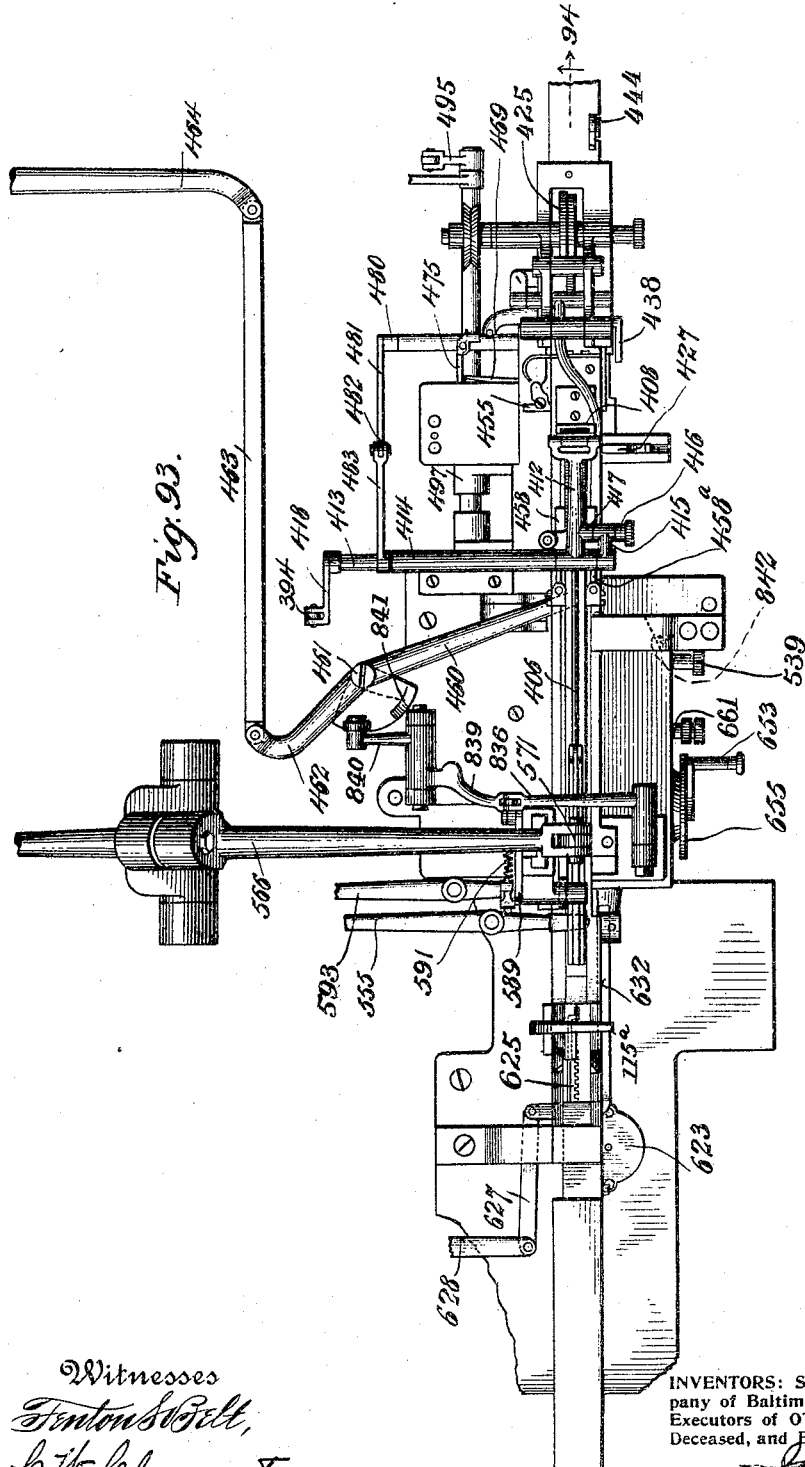
Witnesses
INVENTORS: Safe Deposit and Trust Company of Baltimore, and Abner Greenleaf Executors of OTTMAR MERGENTHALER Deceased, and EMIL LAWRENZ, by
 Attorney

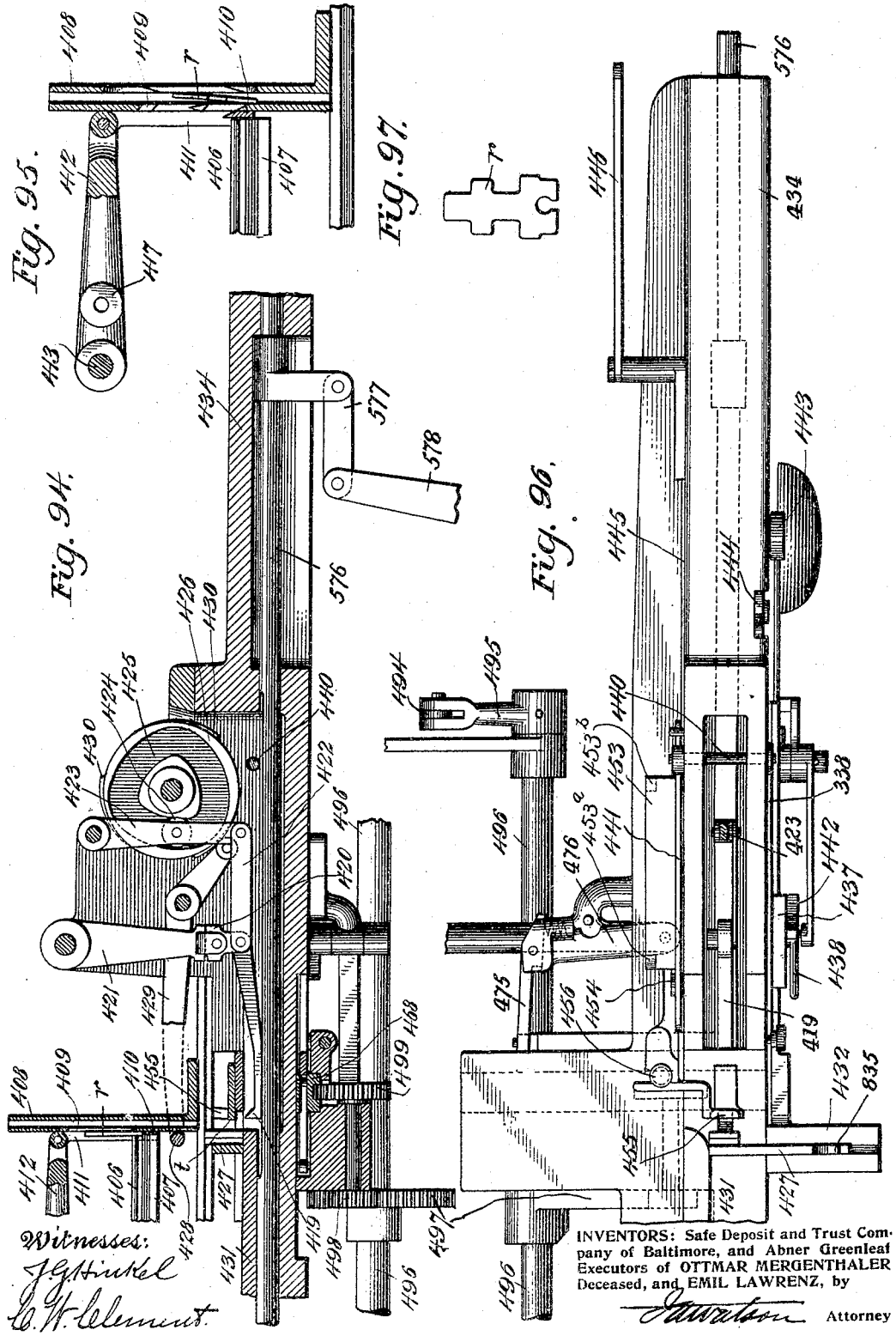

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.

44 SHEETS—SHEET 32.

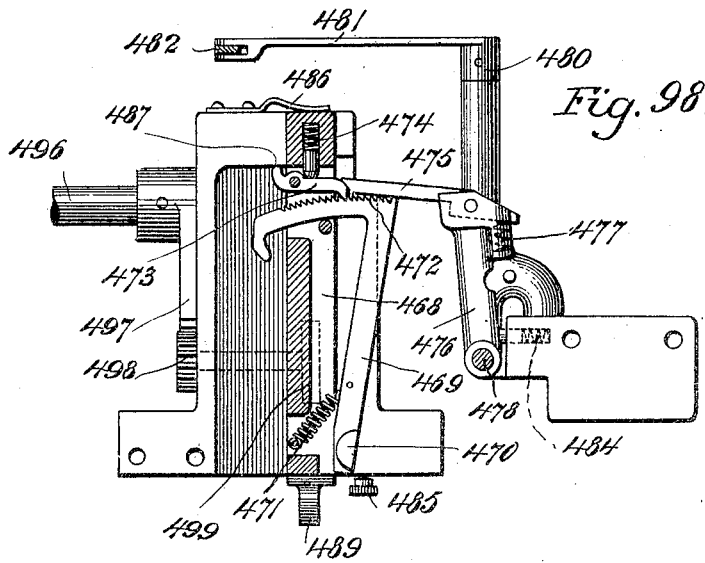

Fig. 98.

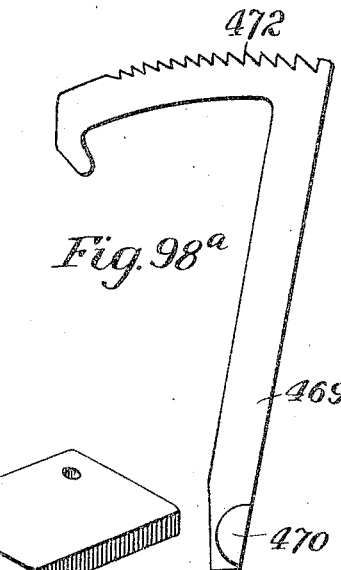

Fig. 98ª

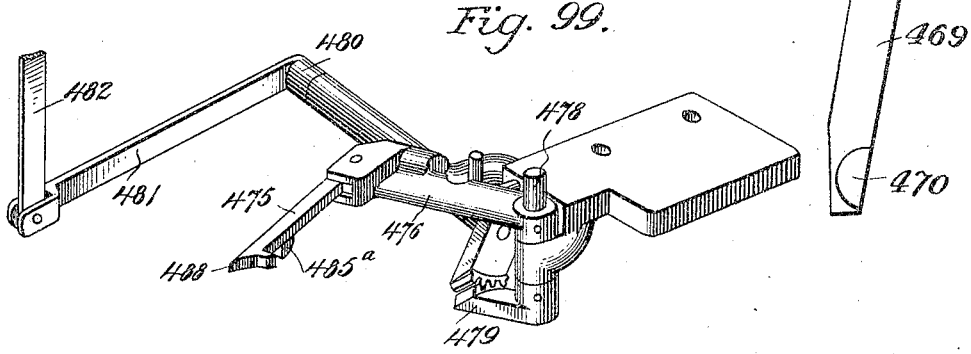

Fig. 99.

Witnesses
J. G. Hinkel
C. W. Clement.

INVENTORS: Safe Deposit and Trust Company of Baltimore, and Abner Greenleaf, Executors of OTTMAR MERGENTHALER, Deceased, and EMIL LAWRENZ, by J. A. Watson Attorney.

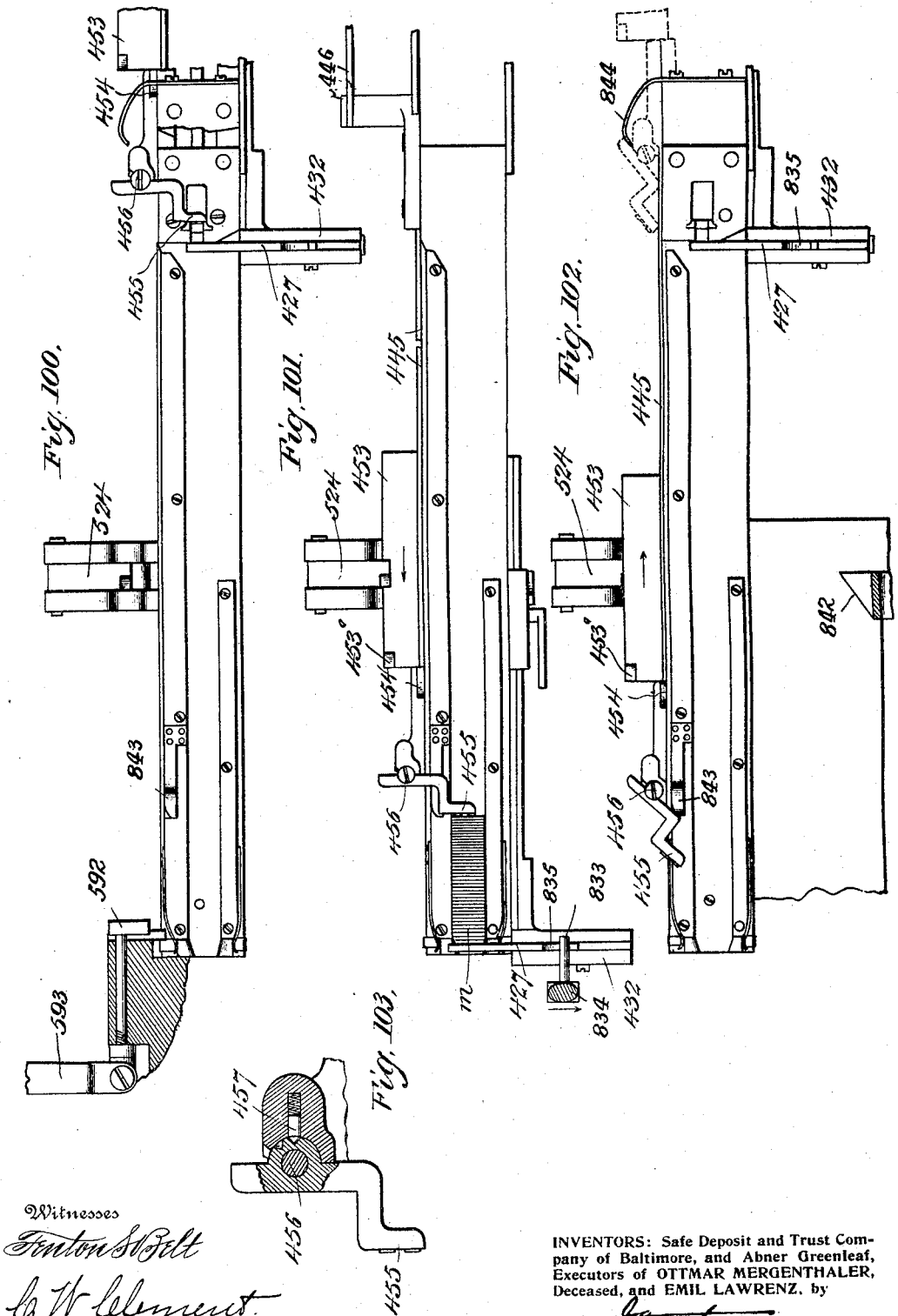

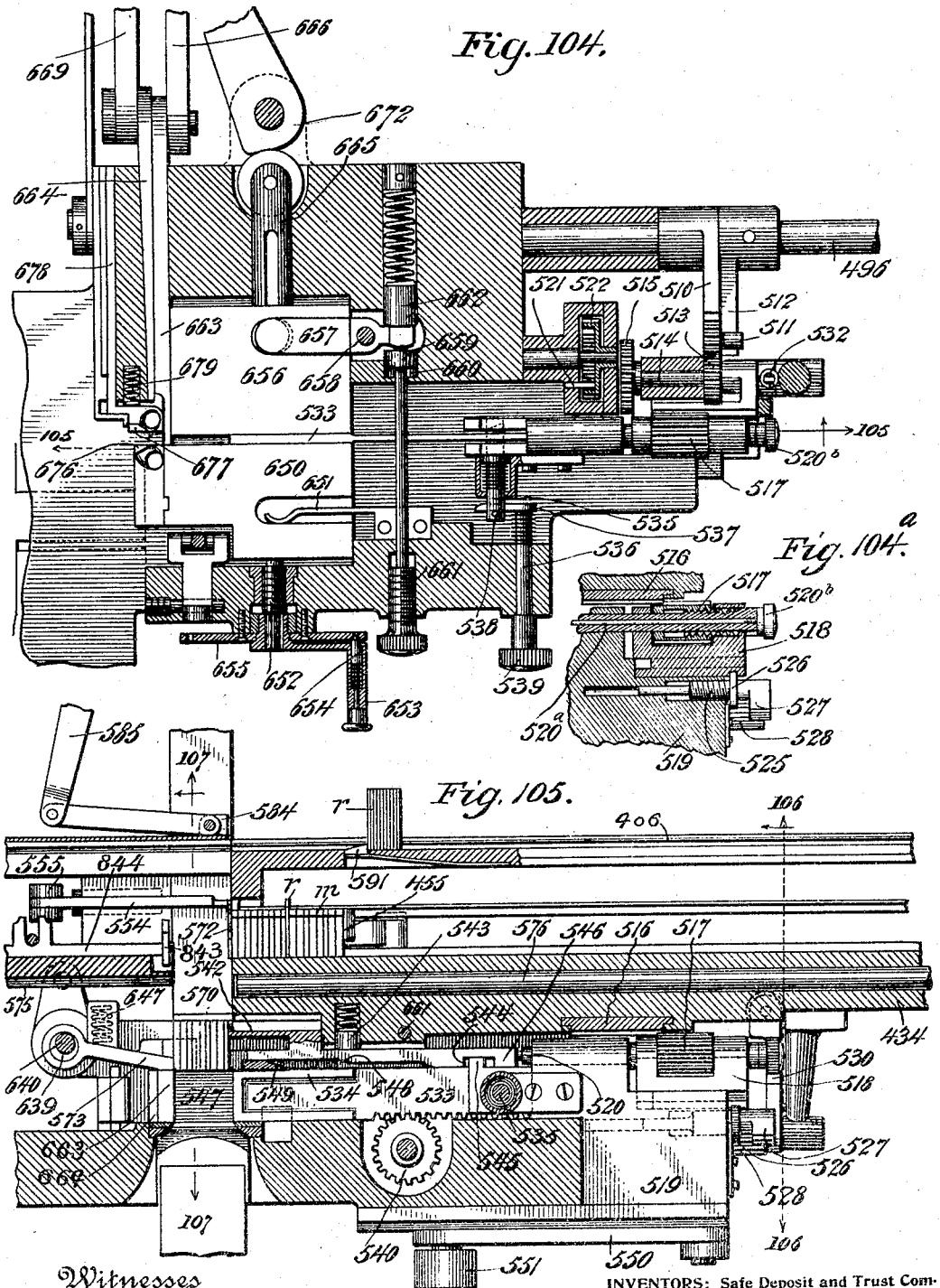

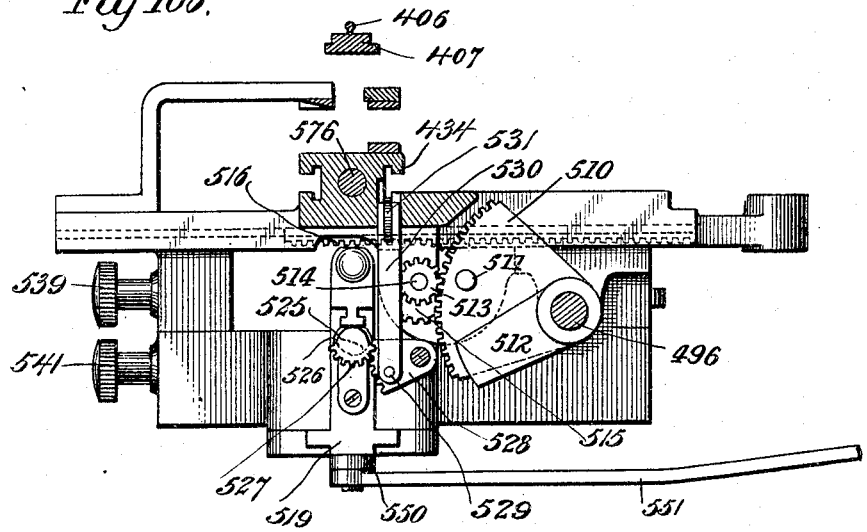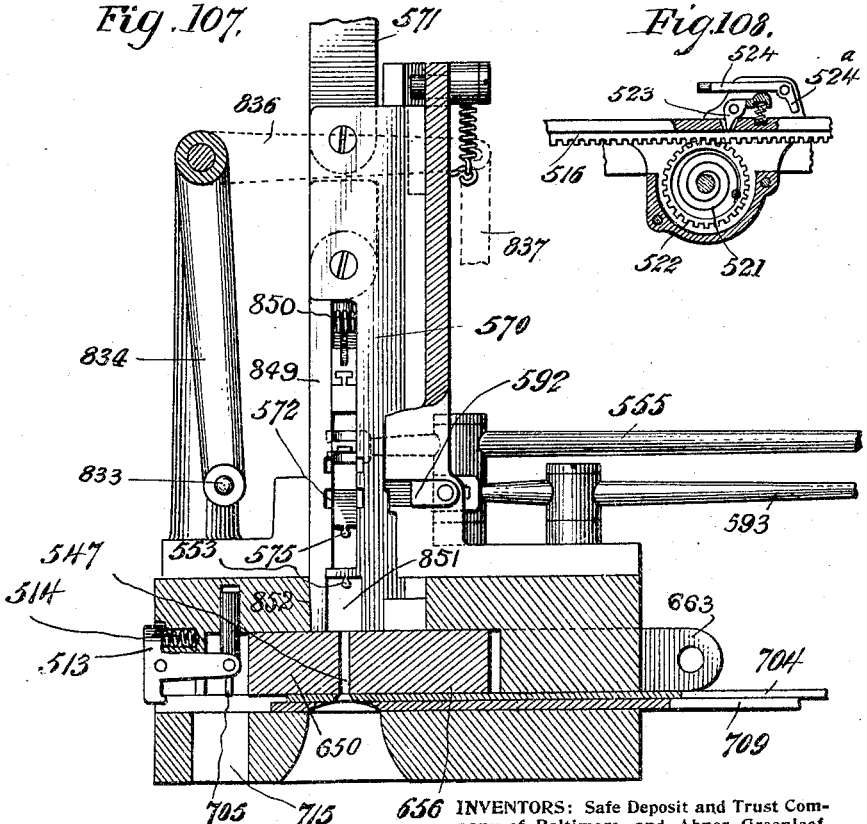

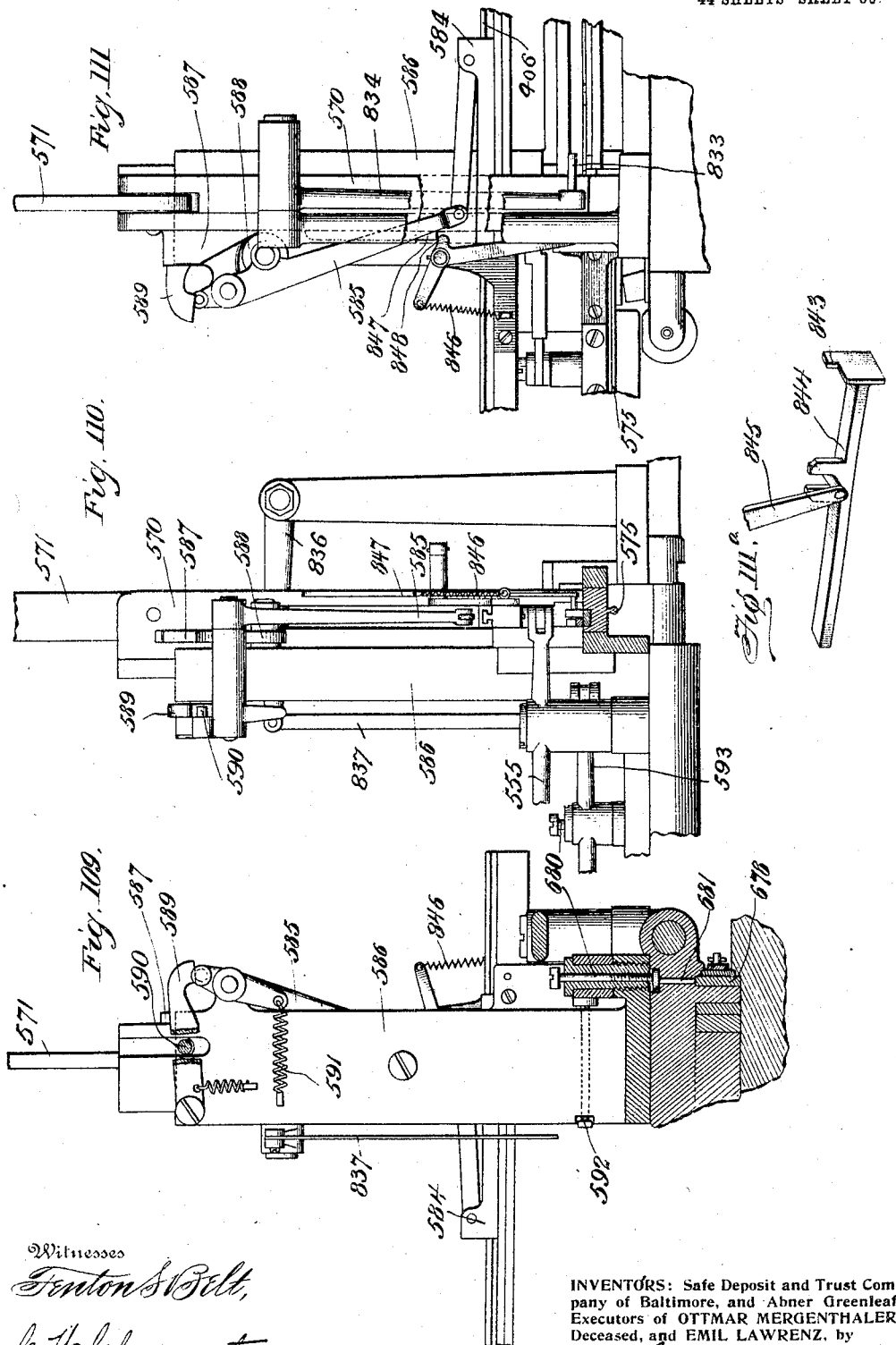

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.

44 SHEETS—SHEET 37.

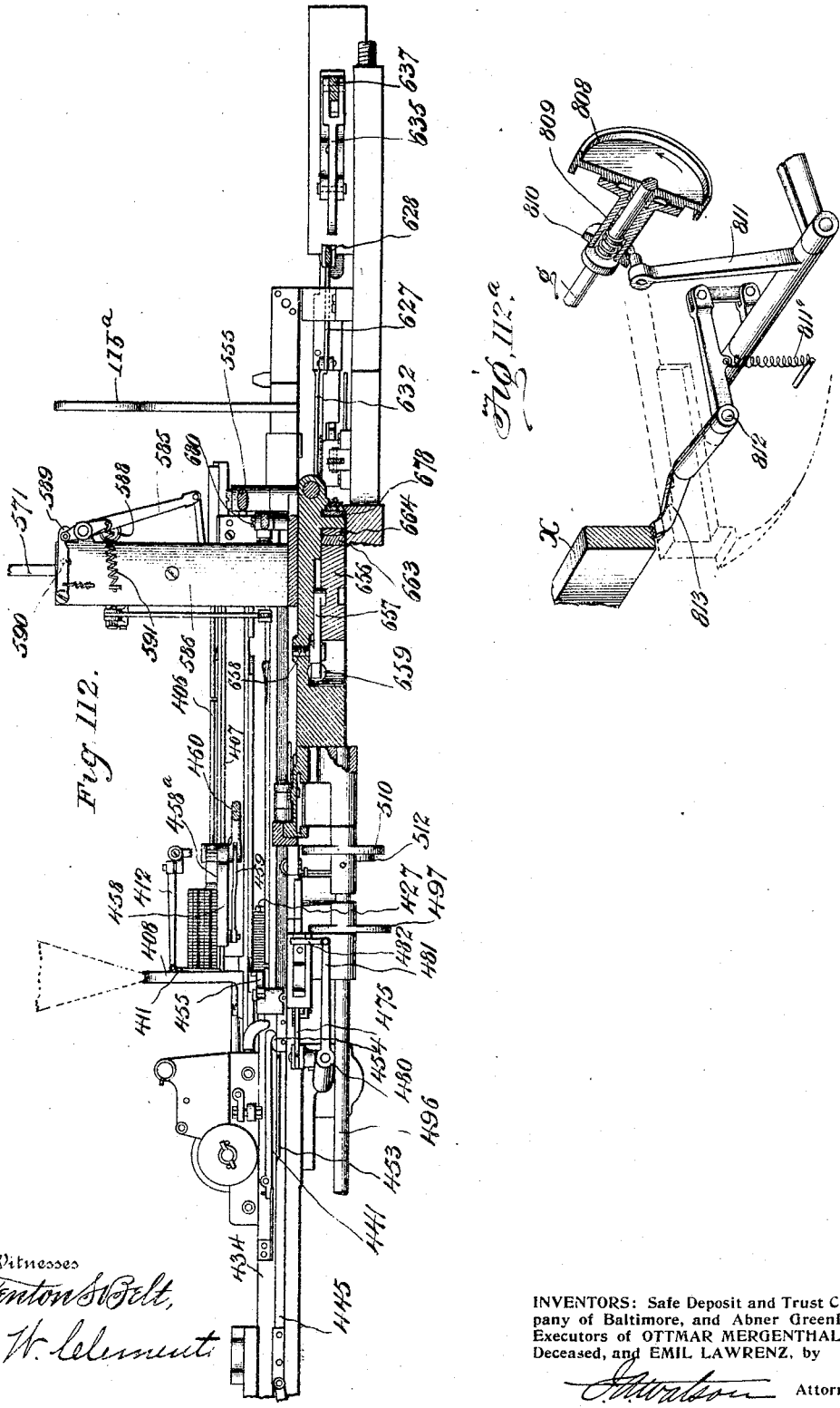

Witnesses
Fenton S. Belt,
C. W. Clement

INVENTORS: Safe Deposit and Trust Company of Baltimore, and Abner Greenleaf, Executors of OTTMAR MERGENTHALER, Deceased, and EMIL LAWRENZ, by J. A. Watson  Attorney.

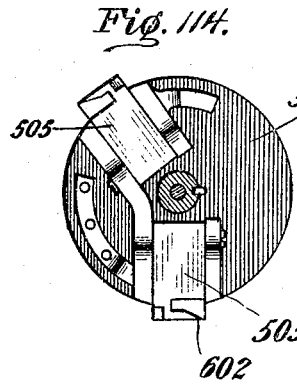
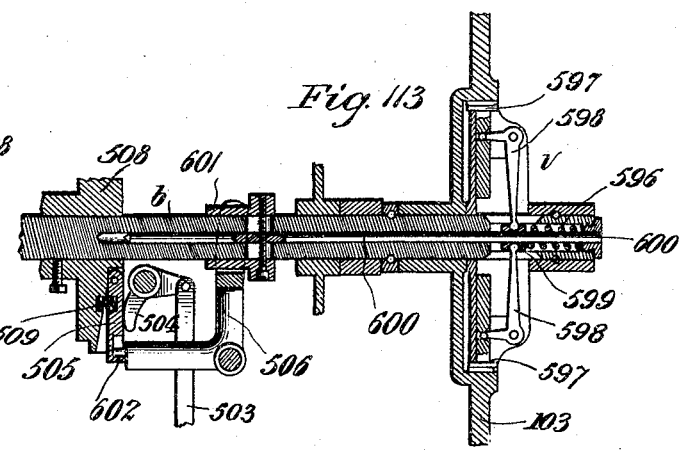
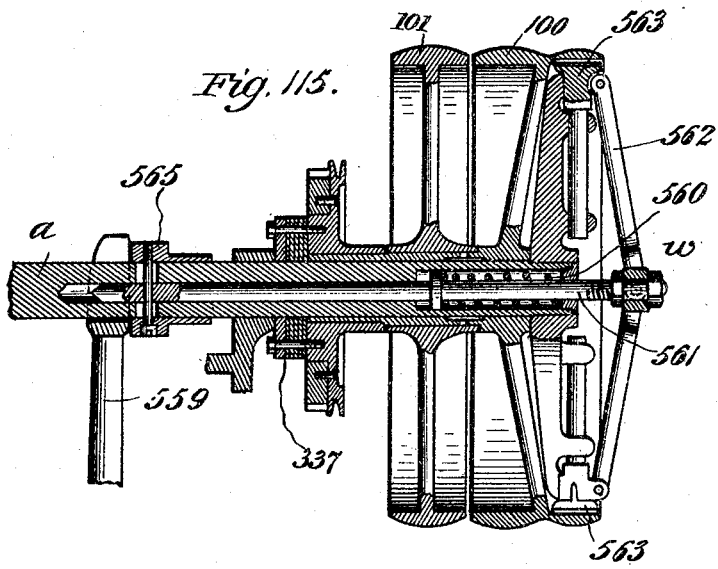

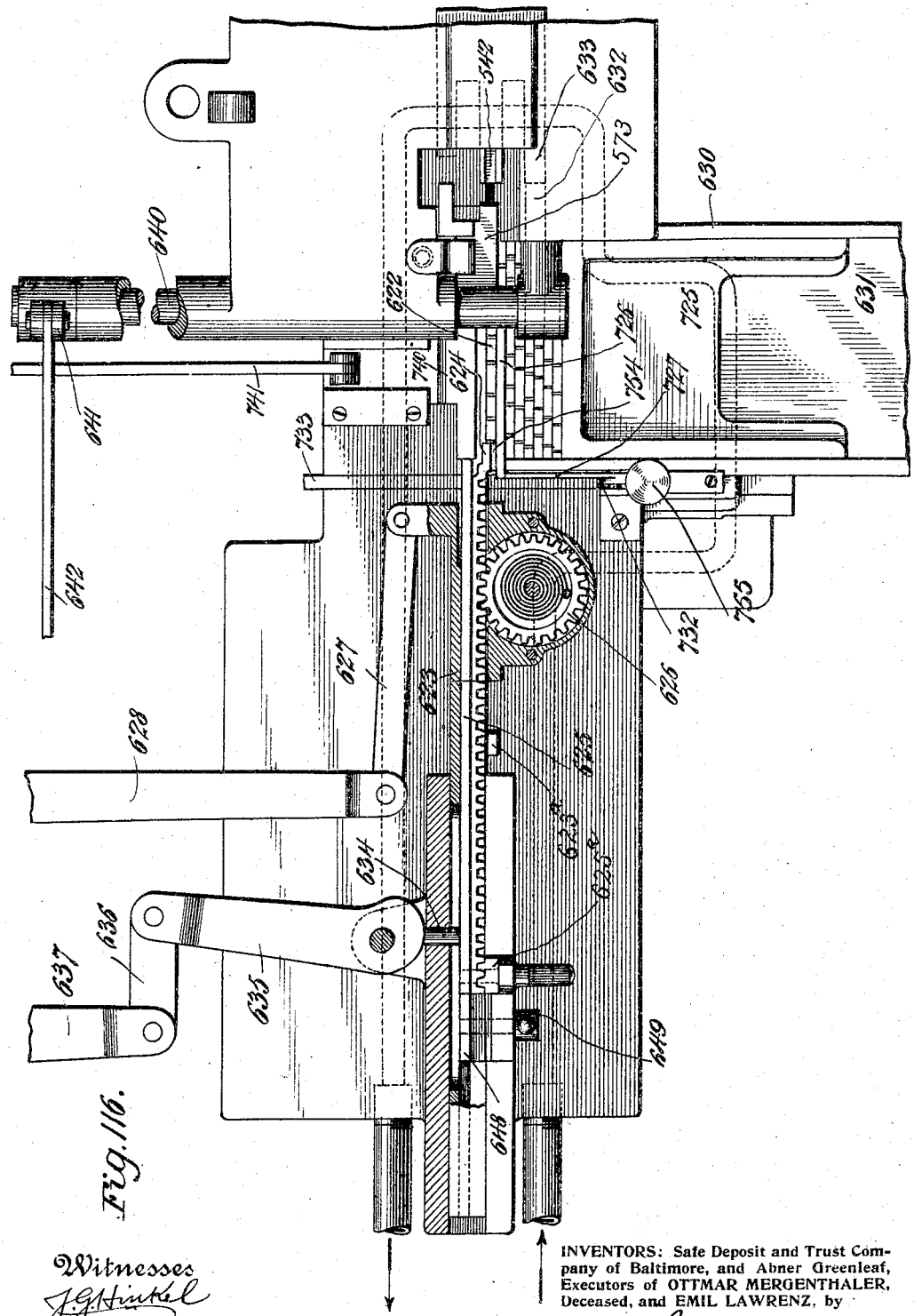

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.

44 SHEETS—SHEET 40.

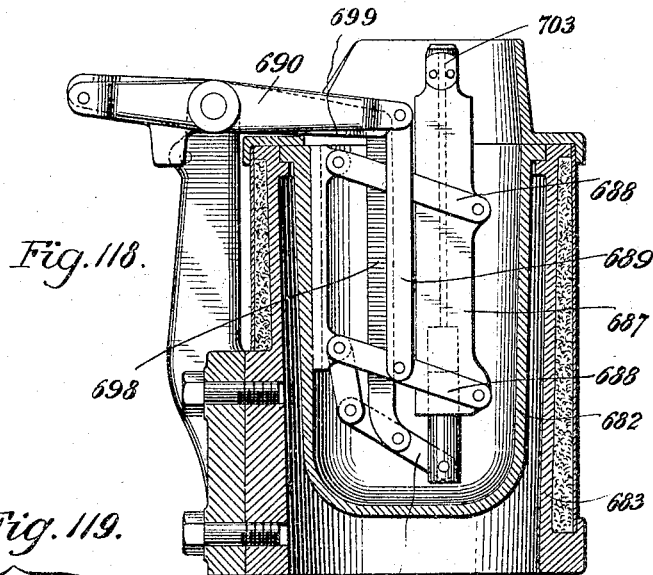

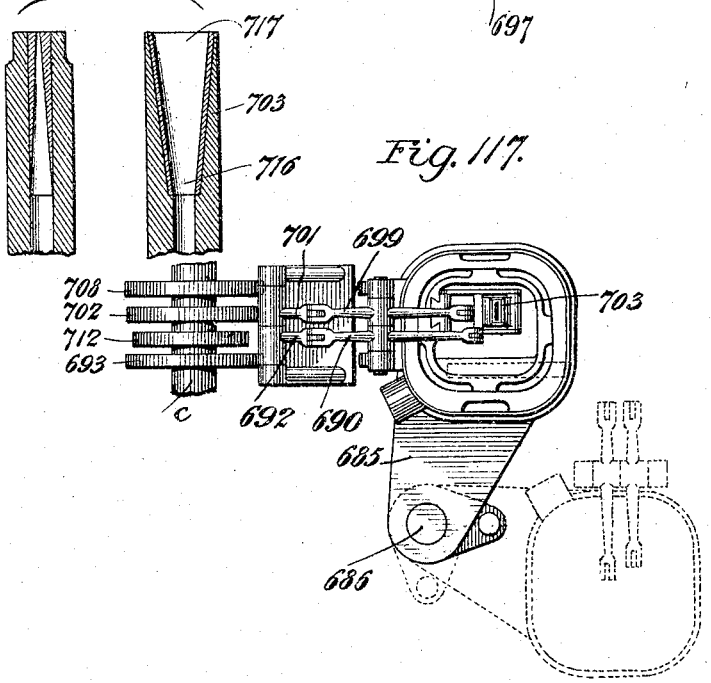

Witnesses
J. G. Hinkel
C. W. Clement.

INVENTORS: Safe Deposit and Trust Company of Baltimore, and Abner Greenleaf, Executors of OTTMAR MERGENTHALER, Deceased, and EMIL LAWRENZ, by
J. T. Watson Attorney.

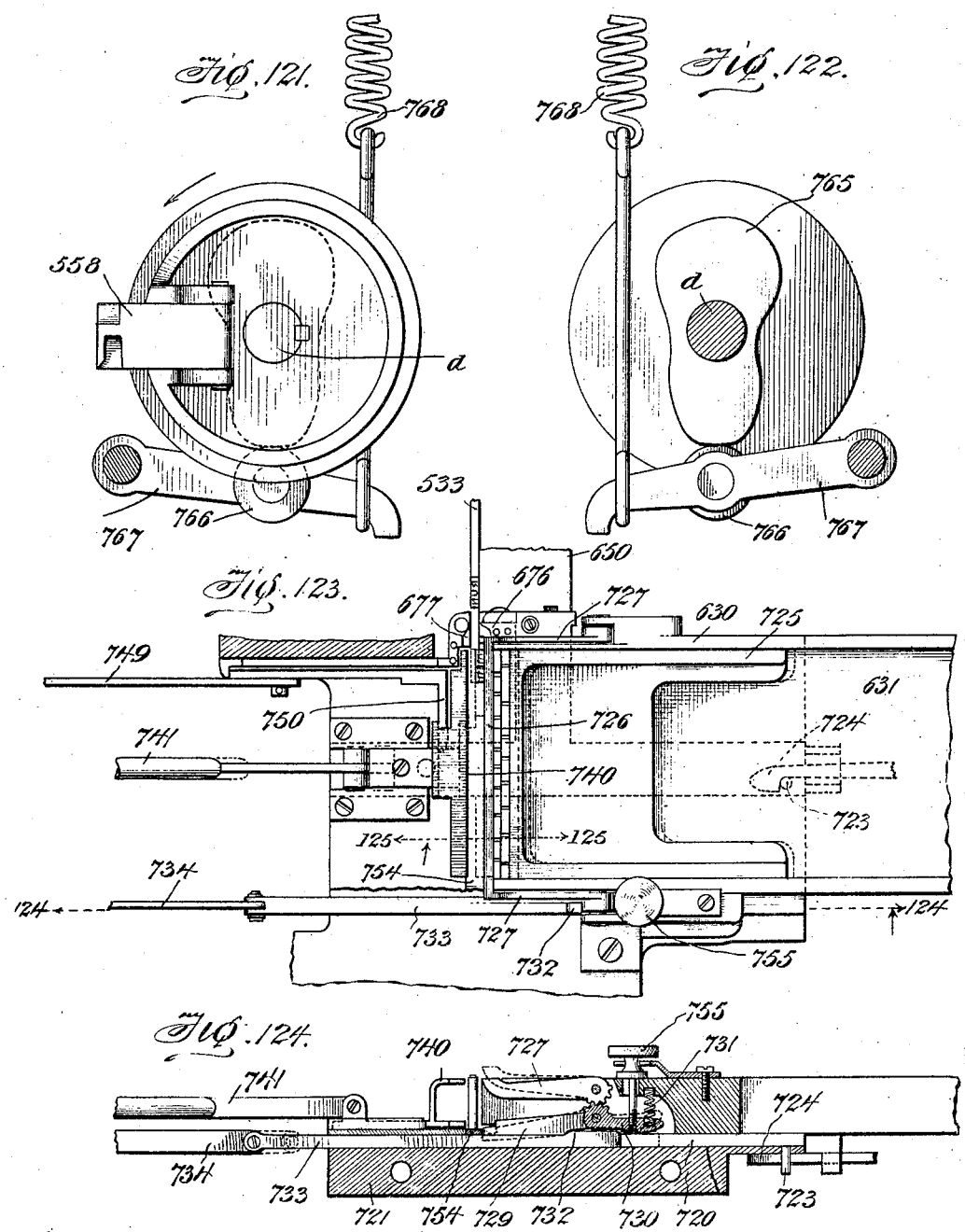

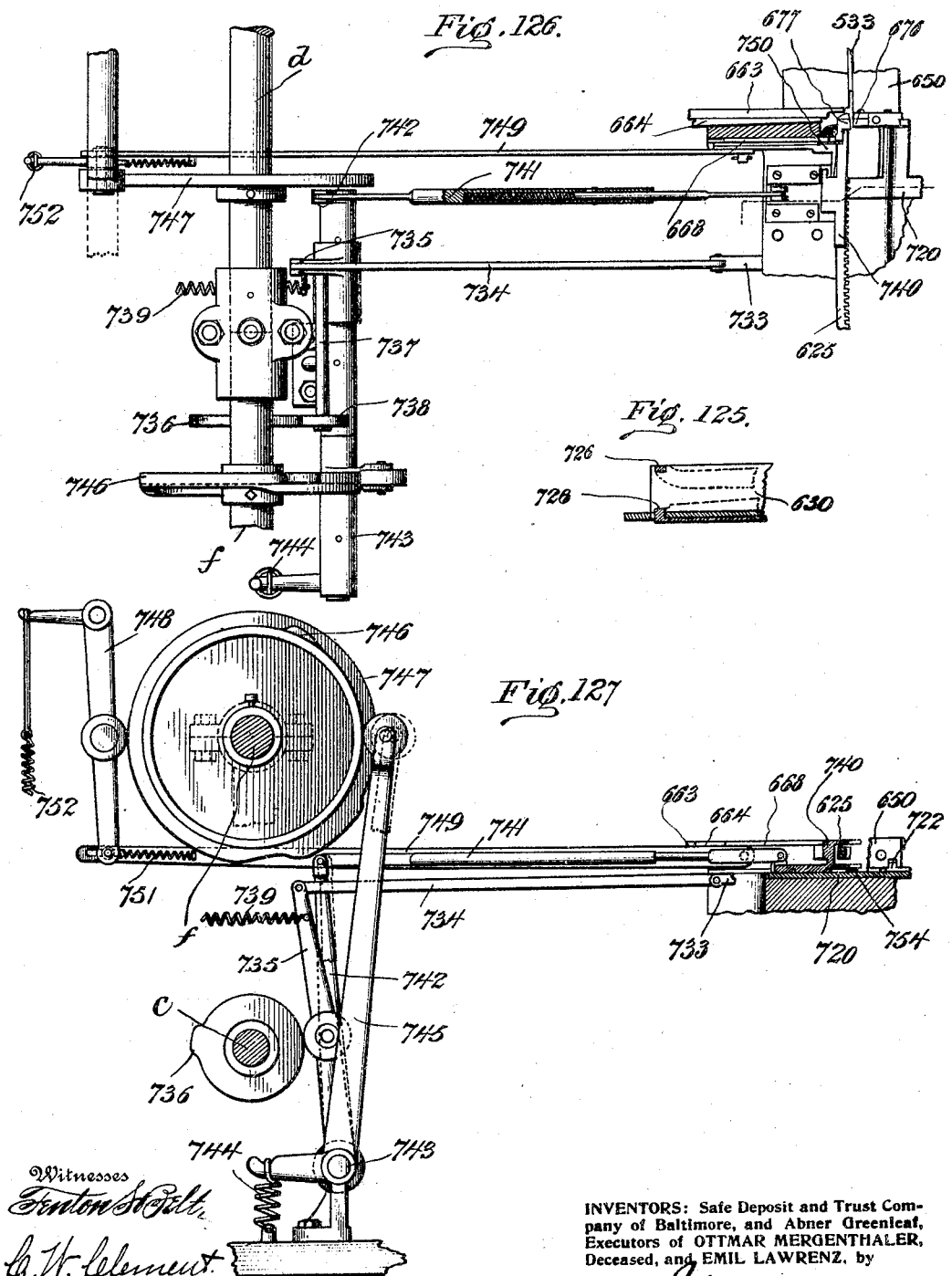

No. 794,628. PATENTED JULY 11, 1905.
O. MERGENTHALER & E. LAWRENZ.
SAFE DEPOSIT AND TRUST COMPANY OF BALTIMORE & A. GREENLEAF, EXECUTORS
OF O. MERGENTHALER, DEC'D.
TYPOGRAPHIC MACHINE.
APPLICATION FILED DEC. 14, 1901.
44 SHEETS—SHEET 44.
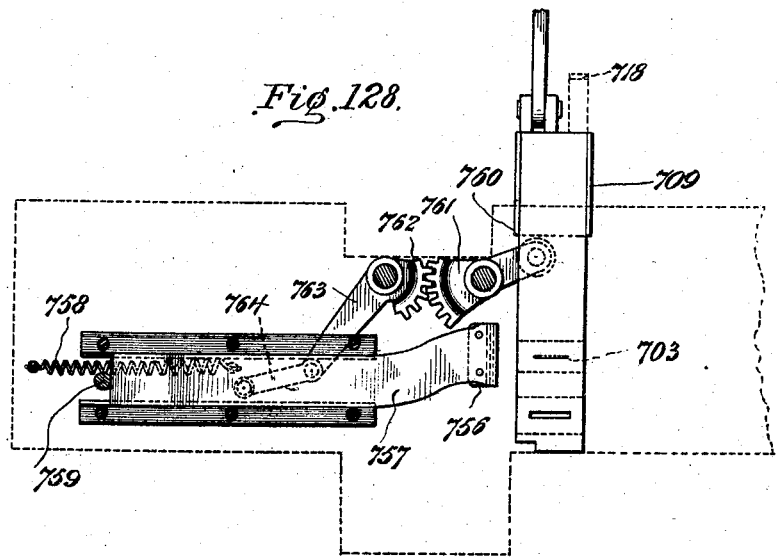
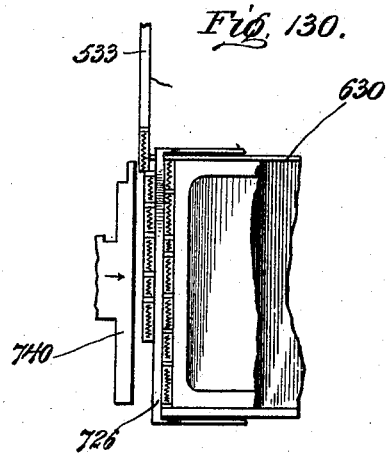
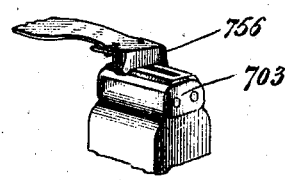
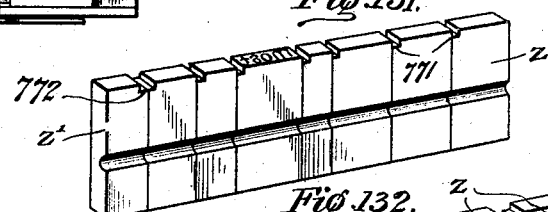
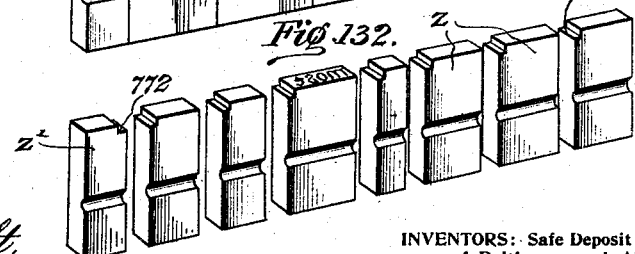
Witnesses
INVENTORS: Safe Deposit and Trust Company of Baltimore, and Abner Greenleaf, Executors of OTTMAR MERGENTHALER, Deceased, and EMIL LAWRENZ, by
Attorney.

No. 794,628.  
Patented July 11, 1905.

UNITED STATES PATENT OFFICE.

SAFE DEPOSIT AND TRUST COMPANY OF BALTIMORE AND ABNER GREENLEAF, EXECUTORS OF OTTMAR MERGENTHALER, DECEASED, AND EMIL LAWRENZ, OF BALTIMORE, MARYLAND, ASSIGNORS, BY MESNE ASSIGNMENTS, TO MERGENTHALER LINOTYPE COMPANY, OF NEW YORK, N. Y., A CORPORATION OF NEW YORK.

TYPOGRAPHIC MACHINE.

SPECIFICATION forming part of Letters Patent No. 794,628, dated July 11, 1905.

Application filed December 14, 1901. Serial No. 85,955.

*To all whom it may concern:*

Be it known that OTTMAR MERGENTHALER, deceased, and EMIL LAWRENZ, both of the city of Baltimore, State of Maryland, did jointly invent new and useful Improvements in Typographic Machines; and that the SAFE DEPOSIT AND TRUST COMPANY OF BALTIMORE and ABNER GREENLEAF, executors of the said OTTMAR MERGENTHALER, deceased, and the said EMIL LAWRENZ, do hereby declare the following to be a full, clear, and exact specification of the same.

This invention relates to mechanism for producing a justified printing surface or form. The machine chiefly employed for this purpose heretofore has been the well-known linotype-machine, which produces printing bars or slugs each equivalent to a justified line of type. The linotype-bars are formed by assembling lines of matrices and spacers and casting the slugs against said matrices in a mold of the desired length and width. While the linotype-machine has been to a large extent satisfactory to the printing trade, it has certain features which are open to criticism and which it is the object of the present invention to remedy.

The product of the machine which is the subject of the present invention is a line composed of logotypes, each logotype, with one exception, in each line having cast therewith and thereon a justifying-space. There being one word more in each line than there are spaces, it is manifest that a justifying-space may be omitted from one of the logotypes. Advantage is taken of this fact to make the justification of each line absolutely perfect regardless of defects in the ordinary justifying-spaces which may be due to wear or improper adjustment of the justifying devices. The method pursued to obtain this result is to cast the justifying-spaces on all of the logotypes of the line save the last one slightly too thin or in any event not thicker than they should be. After all of the logotypes of the line save the last one have been cast said logotypes are measured and the mold adjusted to cast the last logotype of exactly the length required to fill out the line, any deficiency in the line being supplied by creating an additional or "correcting" space on the inner end of the final word or logotype. By this means all danger of incorrect justification is practically eliminated. The mechanism for performing these operations is of course automatic.

It will be understood that the mechanism for supplying each line with a correcting-space is supplemental to the ordinary justifying mechanism and does not produce any result when the justifying mechanism is working perfectly. The machine hereinafter described is capable of producing a perfectly-justified line having a justifying-space upon each logotype excepting one.

In the present machine, as in the linotype-machine, the matrices circulate automatically from the magazine to the casting mechanism and from the casting mechanism back to the magazine. In the present machine, however, a much larger number and variety of matrices are utilized, enabling a greater variety of work to be performed, and provision is made for a primary and secondary distribution of the matrices. The first distribution, which is effected by the "font-separator," divides the matrices by fonts, sending the matrices of the different fonts into different channels. The distributer proper then distributes the matrices into the channels of their respective font-magazines.

Suitable mechanism operated in conjunction with the keyboard releases the matrices from the magazine and assembles them a line at a time, the words being separated by thin plates termed "separators." When a line of matrices is completed, a "starting-lever" is operated and the line is automatically transferred from the assembler to the casting mechanism.

A suitable justifying mechanism takes account of the number of word spaces or separators in the line and the length of the line, and the mold is adjusted by said mechanism to cast word-spaces on the logotypes, with the exception of the last logotype, upon which a correcting-space is cast, if necessary.

The invention will now be described in detail, reference being had to the accompanying drawings, in which—

Figure 5:
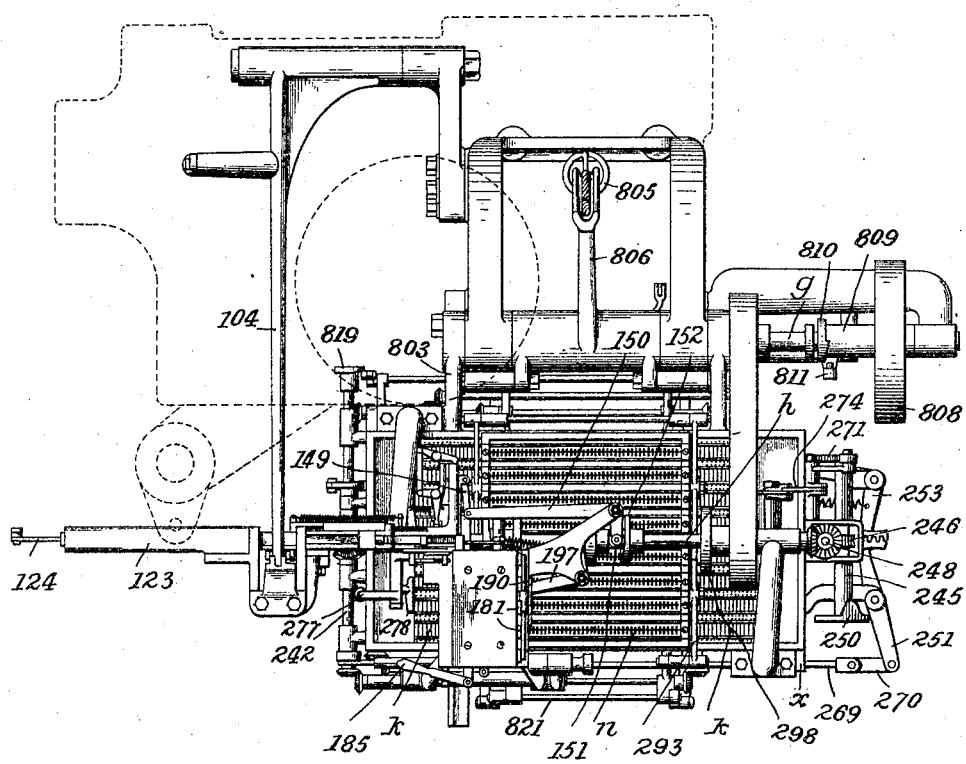
Figure 6:
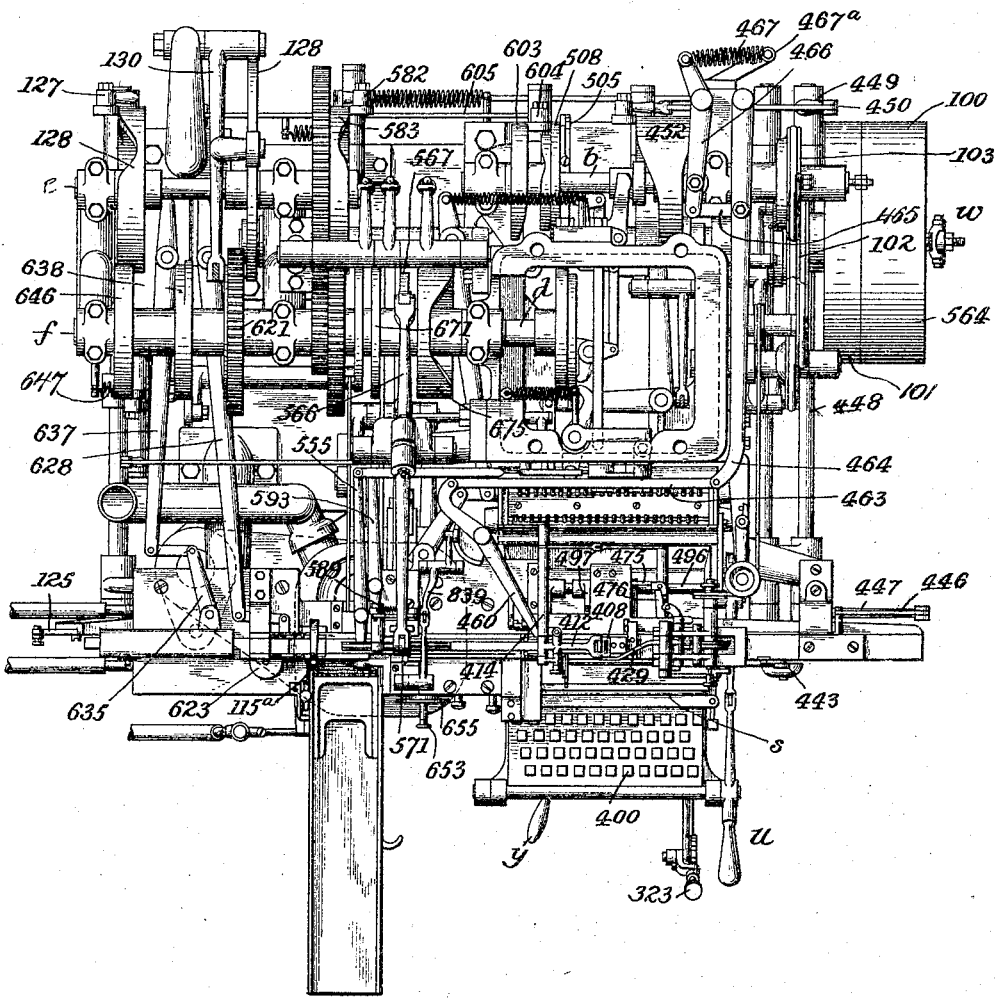
Figure 25:
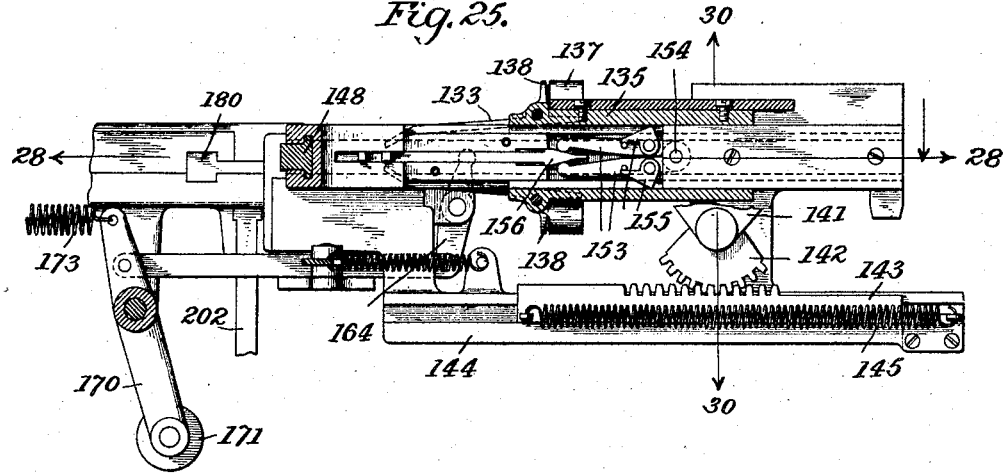
Figure 26:
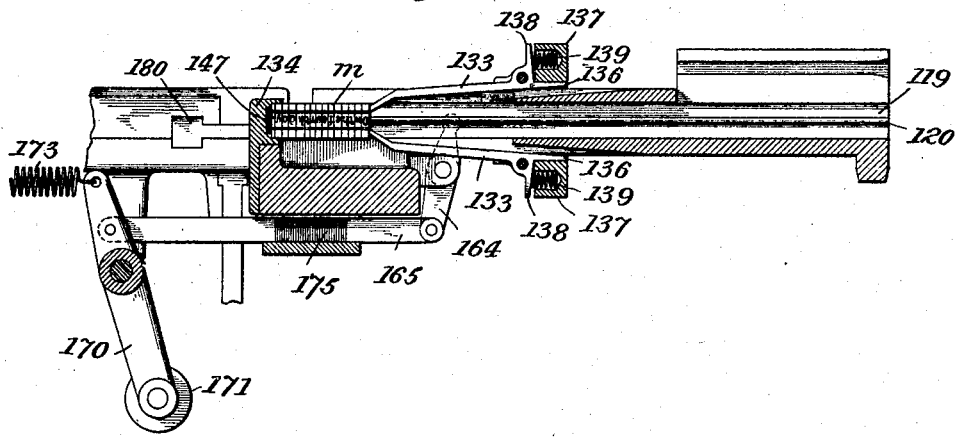
Figure 27:
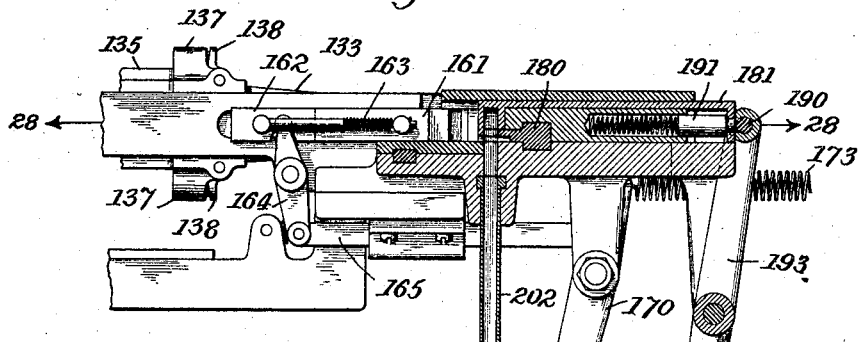
Figure 80:
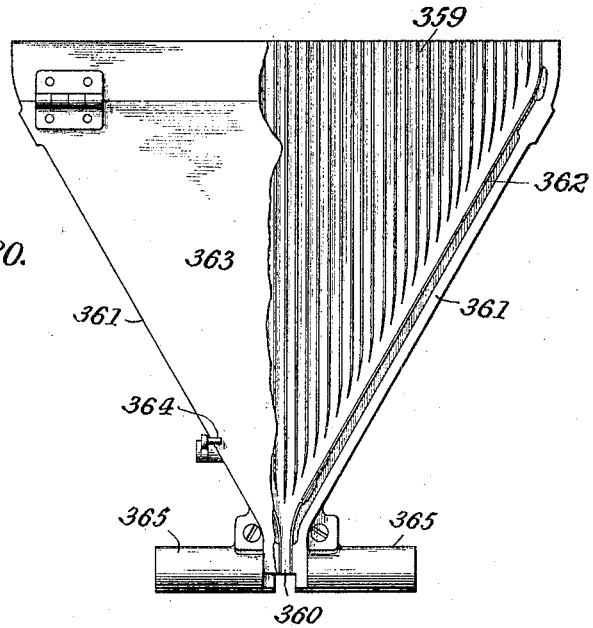
Figure 81:
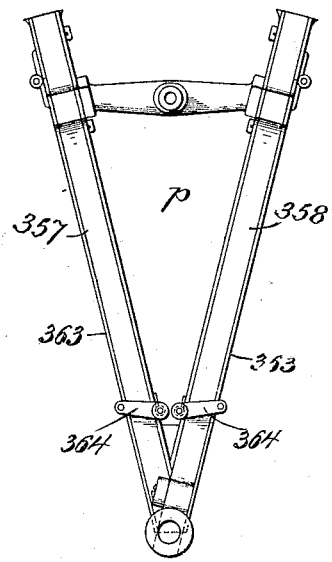
Figure 82:
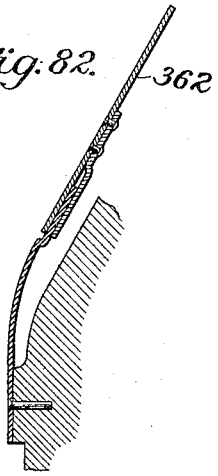
Figure 120:
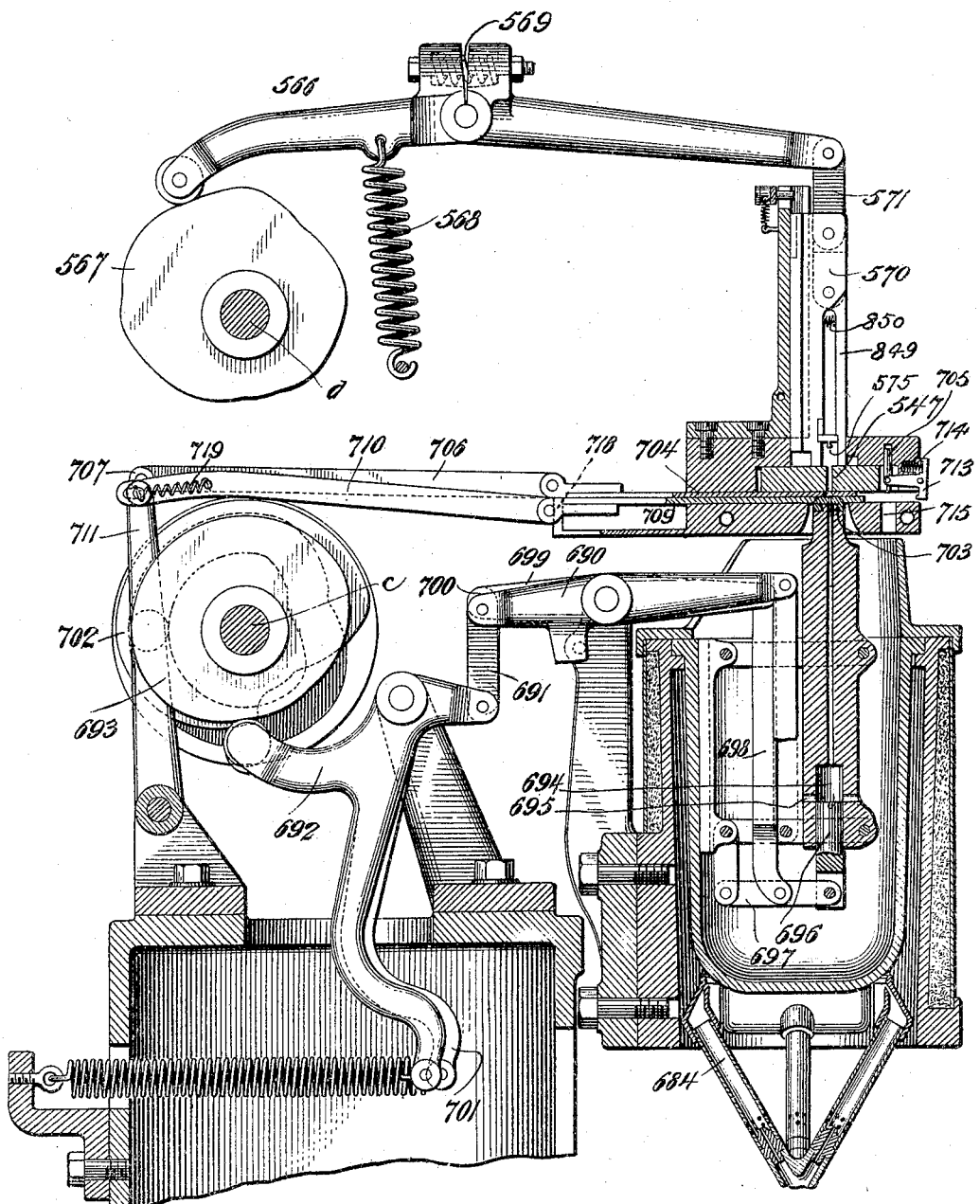

Figures 1, 2, 3, and 4 are respectively front, rear, right-side, and left-side elevations of the entire machine. Fig. 5 is a plan view of the parts above the line 5 of Figs. 2, 3, and 7. Fig. 6 is a plan view of the parts below the line 5 of Figs. 2, 3, and 7. Fig. 7 is a central vertical section looking to the right, taken approximately on the line 7 of Fig. 1. Fig. 8 is a front elevation of the driving and cam shafts. Fig. 9 is a plan view of the driving and cam shafts, including the starting and stopping devices. Fig. 10 is a section on line 10 of Fig. 9. Fig. 11 is a section on the line 11, Fig. 8. Fig. 12 is a section on the line 12, Fig. 11. Fig. 13 is a detail. Fig. 14 is a side view of the elevator, showing the position of the parts at the distributing-station, which is its uppermost position. Fig. 15 is a plan view of parts illustrated in Fig. 14, the top plate being removed. Fig. 16 illustrates the position assumed by the elevator parts as the elevator travels between stations. Fig. 17 illustrates the elevator at the mold-station, which is its lowest position. Fig. 18 is a plan view of the lower elevator-station. Fig. 19 is a side elevation of the elevator and its operating-cam. Fig. 20 is a side view of one of the matrices. Fig. 21 is a rear elevation illustrating the distributer-shifter. Fig. 22 is a plan view, partly in section, on the line 22 of Fig. 14. Fig. 23 is a section on the line 23, Fig. 21. Fig. 24 is a perspective view of a portion of the elevator. Fig. 25 is a rear view of the line-shifting and font-separating devices, partly in section, on the line 25 of Fig. 28. Fig. 26 is a similar view on the line 26 of Fig. 28. Fig. 27 is a front view, partly in section, on the line 27 of Fig. 28. Fig. 28 is a plan view, partly in section, on the line 28 of Fig. 25. Fig. 29 is a detail view of the gate-brake. Fig. 30 is a section on the line 30, Fig. 25. Fig. 31 is a section on the line 31, Fig. 28. Fig. 32 is a top plan view of the matrix-distributer. Fig. 33 is a bottom plan view of the distributer. Fig. 34 is a front elevation of the distributer-driving mechanism. Fig. 35 is a section on the line 35 of Fig. 32. Fig. 36 is a rear elevation of the mechanism of the font-separator and its operating-cams. Fig. 37 is a plan of the font-separator. Fig. 38 is a detail of the font-feeler locking-slide. Figs. 39 and 40 are sections on the line 39 of Fig. 37, showing the parts in different positions. Fig. 41 is a section on the line 41, Fig. 37. Fig. 42 is a view of one of the font-feelers. Fig. 43 is a view of one of the font-slides. Fig. 43$^a$ is a view of the font-slide next to the gate. Fig. 44 is a view of the transfer-slide. Fig. 45 is a vertical section on the line 45 of Fig. 40. Fig. 46 is a section on line 46 of Fig. 45. Fig. 47 is a perspective view of one of the carriers of the distributer. Fig. 48 is a view of one of the carrier-pawls. Fig. 49 is a side view of one of the carriers, partly broken away to show the interior construction. Fig. 50 is a plan view of a complete carrier. Fig. 51 illustrates the relative positions of the distributer feelers and carriers in operation. Fig. 52 is a perspective view of one of the feeler-bars. Fig. 53 is a similar view of one of the individual feelers. Figs. 54, 55, and 56 are sectional views through a feeler-bar and one of the carrier-cells, showing the parts in different positions. Fig. 57 is a section on the line 57 of Fig. 33. Fig. 58 is a detail of the device for restoring the releasing-pins of the carriers. Figs. 59 and 60 are details of the devices for intermittently moving the carriers. Figs. 61 and 62 are plan views of the slides for moving the carriers transversely. Fig. 63 is a front view of one of the magazine-sections. Figs. 64 and 65 are views of opposite ends of one of the magazine-sections. Figs. 66 and 67 are end and side views of the devices for retaining matrices in the magazine. Fig. 68 is a vertical section through the magazine on the line 68 of Fig. 69. Fig. 69 is a horizontal section on the line 69 of Fig. 68. Fig. 70 is a perspective view of one of the matrix-retaining bars. Fig. 71 is a vertical section through the magazine and the funnel, showing the mechanisms for operating the same. Figs. 72 and 73 illustrate details of the mechanism for shifting the magazine-slide and the funnel. Fig. 74 is a section through the magazine on a larger scale than Fig. 71. Fig. 75 is a plan view illustrating the escapement-slides. Figs. 76 and 77 are enlarged sectional views illustrating the operation of the escapements. Fig. 78 is a detail of the magazine-locking slide. Fig. 79 is a perspective view of one of the escapement-slides. Fig. 80 is a front elevation of the magazine-funnel, partly broken away. Fig. 81 is a side view of the same. Fig. 82 is a detail of the same. Fig. 83 is a vertical sectional view illustrating the connections between the keyboard and the escapements. Figs. 84 and 85 are sectional views illustrating two positions of the escapement-operating cams. Fig. 86 is a plan view of a portion of the cams. Fig. 87 is an edge view of one of the cams in its mounting. Fig. 88 is a plan view of the same, partly in section on the line 88 of Fig. 87. Fig. 89 is a front elevation illustrating the mechanism for assembling matrices in line and transferring them to the casting mechanism. Fig. 90 is a plan view of the separator collecting-slide. Fig. 91 is a view of part of the devices shown in Fig. 89 on an enlarged scale and partly in section. Fig. 92 is an enlargement of a portion of Fig. 89. Fig. 93 is a plan view of some of the parts shown in Fig. 89. Fig. 94 is a vertical section about on the line 94 of Fig. 93. Fig. 95 is an enlargement of part of Fig. 94. Fig. 96 is a plan view of part of the mechanism illustrated in Figs. 93 and 94. Fig. 97 is a diagram of one of the separators. Fig. 98 is a plan view of the justifier angle-bar and its operating-pawls. Fig. 98ª is a detail of the segment shown in Fig. 98. Fig. 99 is a perspective view of the moving pawl of the angle-bar and its connections. Figs. 100, 101, and 102 are plan views of the assembling-rail, showing the line-forwarder in its different positions. Fig. 103 is a detail of the line-forwarder. Fig. 104 is a plan view of the mold and its adjusting devices, parts being shown in section approximately on a plan coincident with the upper surface of the mold. Fig. 104ª is a partial section on the line 105 of Fig. 104. Fig. 105 is a section approximately on the line 105 of Fig. 104. Fig. 106 is a section on the line 106 of Fig. 105. Fig. 107 is a section partially on line 107 of Fig. 105. Fig. 108 is a detail. Figs. 109, 110, and 111 are rear, left-side, and front elevations, respectively, of the presentation-slide and adjacent parts. Fig. 111ª is a detail of a part shown in Fig. 111. Fig. 112 is a rear elevation of parts shown in Fig. 89. Fig. 112ª is a perspective view illustrating the distributer-clutch and its operating mechanism. Fig. 113 is a sectional view illustrating the clutch for starting and stopping the final justification mechanism. Fig. 114 is a detail of part of Fig. 113. Fig. 115 is a sectional view of the main clutch and the driving-pulleys. Fig. 116 is a plan view, partly in section, of the measuring devices for controlling the final justification. Fig. 117 is a plan view of the melting-pot and pump. Fig. 118 is a sectional elevation of the melting-pot and pump. Fig. 119 illustrates the throat of the nozzle of the pump in section. Fig. 120 is a vertical section through the mold and pump, illustrating the operating devices. Figs. 121 and 122 are right and left views of one of the compensating cams. Fig. 123 is a plan view of the devices for assembling the logotypes and transferring them to the galley. Fig. 124 is a section on the line 124 of Fig. 123. Fig. 125 is a section on the line 125 of Fig. 123. Fig. 126 is a plan view, and Fig. 127 a left-side elevation, of the mechanism for transferring logotypes to the galley. Fig. 128 is a plan view of the jet-slide and the pump-nozzle wiper. Fig. 129 is a perspective view of the nozzle-wiper and nozzle. Fig. 130 illustrates the manner of assembling the logotypes into lines. Fig. 131 illustrates a justified line of logotypes, and Fig. 132 illustrates the same line separated to show the individual logotypes.

The various moving parts of the machine are supported on a frame of suitable construction, together with suitable standards and brackets attached to the frame. On the main drive-shaft $a$ is a drive-pulley 100 and a loose pulley 101. A cam-shaft $b$ is driven by means of pulleys 102 103. Four other cam-shafts $c$, $d$, $e$, and $f$ are driven from the power-shaft $a$ by suitable gearing, to be hereinafter referred to.

The elevator-arm 104 moves in a vertical plane about a fixed pivot 105, Figs. 14 to 24, inclusive. The devices for moving the elevator-arm will be described hereinafter. Pivotally carried on the forward end of the arm is a forked lever comprising two branches 106 and 107, to the outer or free end of which is pivoted the matrix holder or elevator proper $i$. The elevator $i$ comprises a base 108, having beveled edges 109, a right-angled flange 110, and an undercut rib 111. The elevator is normally held with the base 108 at right angles to the lever 106 107 by means of a coiled spring 112. Rigidly connected with the elevator is an arm 113. The lever 106 107 is held in its normal relation to the arm 104, as shown in Fig. 16, by a spring 114, attached at one end to the arm 104 and at the other end to a portion of lever 107, extending above the arm. The upward extension of lever 107 is provided with an antifriction-roll 115. The matrices $m$ are provided with undercut notches 116, which interlock with the elevator-rib 111. The elevator periodically rises and assumes the position shown in Figs. 14, 15, 19, and 21, and while in such position the matrices carried by the elevator are moved from it into a guide, which conducts them to the separator. As the elevator rises the roll 115 travels on a fixed cam 117, causing the lever 106 107 to assume a vertical position. At the same time the arm 113 of the elevator engages roll 118, which is on a fixed pivot, and the elevator-base 108 is caused to assume a vertical position, bringing the matrices into line with the channel or guide 119, Figs. 26 and 30, leading to the font-separator. This channel 119 is provided with an undercut rib 120, which registers with the elevator-rib 111.

While the elevator is in its uppermost position the matrices are shifted from it into the channel 119 by a shifter 121, carried on a slide 122, which travels in a suitable way in a fixed arm 123, Figs. 21 and 23. Slide 122 is moved by link 124 and arm 125, said arm being carried by a rock-shaft 126, which is periodically rocked by an arm 127, having a roll-engaging cam 128 on shaft $e$, Figs. 2 and 4. The elevator-arm is operated by a spring-link 129, connecting it to a cam-lever 130, having a cam-roll 131, which rests on cam 132 of cam-shaft $e$, Figs. 2, 4, and 19. Springs are used throughout the machine where necessary to hold the cam-rolls in engagement with their cams.

As the line of matrices is pushed from the elevator into channel 119 they are engaged by a pair of spring-pawls 133, Figs. 25 to 37, inclusive, and moved against an abutment 134 at the inner end of the channel. The pawls 133 are pivoted above and below the channel to a slide 135. The pawls have extensions 136, which abut against ears 137 on the slide to limit their inward movement. They are also provided with right-angled extensions or arms 138, against which springs 139 abut to throw the pawls into the channel. It will be evident that the pawls are easily separated to permit the matrices to pass between them. The slide 135 has an attached rack 140, which meshes with a sector-gear 141. This sector-gear is connected with a second sector-gear 142, which engages a rack 143, sliding in a fixed guide 144. Rack 143 is normally drawn toward its left-hand position by a spring 145, and the pawls 133 are thereby under spring tension to move to the right at all times. When the matrix-shifter 121 moves to the right to transfer a line of matrices into the separator-channel 119, a piece 146 engages the slide 143 and draws back the pawls or fingers 133 over the line of matrices which is being moved into the channel 119. When the shifter is withdrawn, spring 145 moves the pawls 133 to the right, pushing the line of matrices against the abutment 134. Pawls 133 thereafter continue to exert a spring pressure against the line of matrices, holding said line against the abutment 134. The line is thus held against the abutment excepting at intervals when the matrix is to be pushed from the line to the font-separator. At such times the pressure of the pawls 133 on the line is relieved, as will be presently explained.

The matrices are removed from the line one by one by a pusher 147, sliding in a fixed guideway 148. Pusher 147 is operated by link 149, cam-lever 150, cam-roll 151, and cam 152 of cam-shaft $h$, Figs. 28, 36, and 37, which is situated in the upper part of the machine. When the pusher is in its rearmost position, the pawls 133 are permitted to exert a pressure on the line of matrices to hold the same against the abutment. When, however, the pusher advances and engages the end matrix, it is desirable to relieve the pressure on the line. For this purpose the following devices are provided: A pair of blades 153 are mounted upon a common fixed pivot 154, Figs. 25 and 28. Upon these blades are pivoted a pair of angular pieces 155, mounted with freedom to have a limited movement on their pivots. The angular pieces 155 are adapted to engage the slide 135 when the blades 153 are moved apart. A slide 156 has a tapered end adapted to pass between and separate the blades 153. Slide 156 is operated by elbow-lever 157, link 158, and a lever 159, one end of said lever 159 being in the path of the pusher-slide 147. It will be seen that when the pusher is in its rearmost position it operates the lever 159 in the direction to withdraw the slide 156 from between the blades 153, thus permitting the line-forwarding pawls 133 to exert pressure freely on the line of matrices. When the pusher moves forward, however, the lever 159 is freed, and a spring 160, engaging lever 157, throws the pointed slide 156 in between the blades 153, spreading said blades. This movement of the blades causes the angular pieces 155 to engage and push back and hold the slide 135, which carries the forwarding-pawls. The backward movement of the slide is caused by the rotation of said angular pieces about the pivot 154. In the construction shown this movement is very slight, but sufficient for all practical purposes.

On the forward side of the channel 119, adjacent to the abutment 134, is a sliding gate 161, Figs. 27 and 28. The gate 161 forms part of a two-part slide, it being arranged to slide upon a part 162, which moves in ways upon the frame. The parts 161 162 are normally pressed away from each other by a light spring 163. The gate-slide is operated by a lever 164, link 165, cam-lever 170, cam-roll 171, and cam 172 on shaft $h$. Spring 173 holds the roll against the cam. In operation the gate is slowly opened and closed by the cam and connections specified. As the gate begins to open the pusher advances and tends to push out the foremost matrix. As soon as the gate is sufficiently open the matrix and pusher advance. At this moment a brake is applied to the gate mechanism to relieve the gate from the tension of spring 173. This brake comprises a brake-lever 174, having a short arm which engages a toothed or roughened surface 175 on the link 165, Figs. 26, 28, and 29. Spring 176 is connected to the brake-lever and tends to draw it in the direction to apply the brake. The lever is also connected by link 177 to an elbow-lever 178, one arm of which is in the path of the rear end of the pusher 147. It will be seen that when the pusher is in its rearmost position the brake is not applied to link 165. When the pusher has moved a matrix part way through the gate, however, the brake is applied by the spring 176 and the part 162 of the gate is held stationary. Part 161, however, may be pushed farther back by the matrix, compressing the spring 163. The rear corner of the gate is beveled, as shown at 179, to cause the matrix to advance gradually, which permits the brake to be applied and the forwarding-pawls to be withdrawn before the matrix is fully through the gate. The spring 163 exerts a slight pressure on the matrix to steady it as it is being ejected. The gate thus operates as a brake on the matrix and prevents the pusher from driving it too quickly into the font-separator.

*Font-separator.*—The term "font-separator" as used herein is to be understood as including means for separating one font, group, or series of matrices from another. The font-separator as illustrated makes provision for separating the matrices into four fonts and for transferring any matrices which do not belong in these channels to a pi-receptacle. Referring to Figs. 37 to 45, inclusive, the font-separator *j* comprises a transfer-slide 180, which moves the matrices step by step to bring them opposite the several font channels or receptacles successively, a series of testing-slides 181, and a series of font-feelers 182. The feelers are on slides 183, which are interchangeable. When in position, they are locked by a notched slide 184, operated by a lever 185. The testing-slides 181 are provided at their forward ends with two depending flanges 186 187, between which is a space 188, forming a temporary receptacle for the matrix. At the opposite end of the font-slide is a depending flange 189, which is engaged on one side by the slide-operating rod 190 and on the opposite side by a sliding pin or plunger 191, which is constantly pushed to the rear by a spring 192. The testing-slides are intermittently pushed forward against the pressure of the springs 192 by the rod 190, which is carried on the upper end of a cam-lever 193, having a roll in contact with a cam 194 on shaft *h*, Figs. 36 and 37.

The transfer-slide 180 has a series of matrix-transfer devices 195, which transfer the matrices step by step to the successive font-slides, carrying them to a position opposite their respective channels or to the pi-channel. The transfer-slide is operated by a link 196, elbow-lever 197, and cam 198 on shaft *h*.

The testing-slides move right and left on a fixed block 199. The transfer-slide moves forward and backward in guides between said block 199 and a bracket 200, Figs. 39 to 41. The feelers 182 are adjacent to throats or openings 201, which receive the matrices which pass the feelers. These throats lead to the font-tubes 202 and a pi-tube 203, Fig. 45. The testing-slide 181, which is nearest to the gate, is provided with a guard 204, which closes the gate-opening at all times excepting when the space or channel 188 of the testing-slide is opposite the gate.

The operation of the font-separating devices is as follows: The testing-slides are moved forward into the position shown in Fig. 39, in which position the channels 188 of said slides are in line with the gate-opening through which the matrices are delivered to the separator. At this moment the matrix is pushed through the gate by the pusher 147, the gate being open. The common bar 190, which operates all of the testing-slides, then permits the springs 192 to move said slides to the right and the matrix which is in the channel of the first slide has its lower edge presented to and pressed yieldingly against the feelers 182 opposite the first font-chute 202. If the notches in the lower edge of the matrix are the same combination as the feelers, the matrix will pass the feelers and drop into the channel. If, however, the matrix does not belong in the first channel, it will be stopped by the feelers, as shown in Fig. 40. The testing-slides are then moved to a position between the positions illustrated in Figs. 39 and 40 and stopped. In this position the guards or tongues 195 of the transfer-slide 180 register with the matrix-channels 188 in the testing-slides. The transfer-slide then moves forward, carrying the matrix which is retained by the first testing-slide over to the second testing-slide. The transfer-slide stops after the matrix has been transferred and the testing-slides move to the extreme position shown in Fig. 39 and another matrix is passed into the first slide from the gate. While this is taking place the transfer-slide is returned to its original position, flanges 195 passing to the right of the projections 187 of the testing-slides. The first and second testing-slides are now provided with matrices and they are moved to the right, as before, to bring the matrices against their respective feelers 182. In like manner each matrix is passed along from one testing-slide to the next until it finds the proper font-tube or is deposited in the pi-channel. The matrices are provided with notches 205 on one side, by means of which they are separated into fonts, and notches 206 on the opposite side, by means of which they are deposited in the magazine. The type or letter 207 is preferably arranged on the end of the matrix opposite the undercut notch 116.

Each set of feelers 182 corresponds to a font of type, and when it is desired to change a font of type the feeler-slide 183 corresponding to the font which is taken out is removed and a new feeler-slide having a proper combination of feelers is inserted in its place. The feelers are removably locked in place by the slide 184, operated by handle 185, Fig. 37. The font-chutes 202 and the pi-channel 203 have a sliding connection with the bracket 200. As shown in Figs. 39 and 40, this connection comprises flanges 208 at the upper ends of the chutes which engage corresponding grooves in the bracket. Should a matrix stick in any of the chutes the latter may be taken out by hand and the matrix dislodged. The font-chutes are preferably made or united in a single piece, as illustrated in Fig. 45. Near the bottom of each chute is a very light flat spring 209, Fig. 46, adapted to direct the matrices to one side of the chute and deposit them accurately in the carriers of the distributer.

The various parts of the font-separator are carried on a swinging frame 800, which is pivoted in bearings 801 on the front of the machine, Figs. 1, 3, 36, and 37. The frame 800 is locked in its normal position by a spring-bolt 802. By swinging the frame upward the lower ends of the chutes 202 are exposed and any matrices which may become lodged in the chutes can be withdrawn.

*The distributer.*—The distributer, Figs. 45 to 62, comprises a series of matrix-carriers $k$, which receive the matrices from the font-separator and transport them step by step over the magazine until they are released and dropped into their proper magazine-tubes. One of the carriers $k$ will first be described. Referring to Figs. 45 to 50, inclusive, it will be seen that the carrier $k$ comprises a series of pockets 210, into which the matrices are discharged from the chutes 202 of the separator. These pockets, as shown, are in four rows of fourteen each, the positions of the rows corresponding to the separator-chutes or font-chutes, as shown in Fig. 45. The pockets or cells are inclosed by longitudinal plates 211 and transverse plates 212, the parts being held together by rivets 213. Each pocket is provided with a pair of pawls 214, pivoted outside of the pocket at 215 and normally extending into the pocket. The matrices are dropped into the pockets from the chutes 202 and rest with their corners upon these pawls. The pawls are held in their retaining positions, as shown at the left in Fig. 49, and in their releasing positions, as shown in the middle pocket of Fig. 49, by toggle-levers 216, which depend from pivots 217 in vertically-moving slides 218. The slides are normally pressed down by springs 219, and by reason of the toggle action between the levers 216 and the pawls 214 the pawls are spring-pressed into both their operative and inoperative positions. The pawls 214 have rearwardly-extending arms 220, upon which rest pins 221, which extend above the carrier-frame. When the pins 221 are pressed down, the pawls are thrown out of the pockets, as shown in Fig. 49, and the matrix sustained on the pawls is permitted to drop. This condition prevails when the matrix is above its proper magazine-tube, as will be explained hereinafter. The pawls are prevented from swinging too far inward by the walls of the pockets or cells, and they are prevented from swinging too far outward by pins 222. Lower extensions 223 of the pawls swing into line with the pocket-walls when the pawls are thrown out and assist in guiding the matrices properly into their magazine-tubes.

The magazine shown in the drawings comprises eight sections, each capable of holding either a lower-case or an upper-case font. In other words, the magazine is capable of holding four complete fonts of upper and lower case characters. We will assume that the four sections in the forward part of the magazine are the lower-case sections $l$, and those in the rear part of the magazine are the four upper-case sections $l'$, Fig. 74. The carriers first pass over the lower-case sections and deposit the lower-case matrices therein and then over the upper-case sections to deposit the upper-case matrices. The magazine-sections together form a rectangle over which the carriers $k$ travel in a rectangular path in a manner to be now described.

Referring to Fig. 32, which is a partial plan view of the distributer, and to Figs. 35 and 57, it will be seen that the carriers $k$ travel in a rectangular path on suitable ways 224, situated above the magazine-mouths, the direction of motion being indicated by arrows, Fig. 32. Each carrier is carried along the front half of the magazine by the engagement of gears 225 with the lower edges of the plates 211 of the rearmost carrier in each train. The carriers in engagement with the gears 225 push forward the carriers in advance and the foremost carrier in each train or the one next in rear of it is in engagement with gears $225^a$. The gears $225^a$ serve to prevent any overmotion of the carriers which might throw them out of register with the magazine. The gears 225 $225^a$ are on shafts 226, which are connected together by shafts 227 and bevel-gearing. There are four of the shafts 226, two extending from the front of the distributer to the middle and two extending from the rear of the distributer to the middle thereof. Those in front are moved step by step in one direction and those in the rear are moved step by step in the opposite direction. The shafts 227 are connected by a shaft 228 at the left end of the machine, as shown in Figs. 32, 33, and 34.

The gears 225 and $225^a$ are operated step by step by the following means: On the front end of the left-hand shaft 226, Figs. 1 and 59, is a ratchet-wheel 229. Adjacent to the ratchet-wheel is a two-armed rocker 230. To the upper arm 231 of this rocker is pivoted a spring-pressed moving pawl 232 and an operating link or pitman 233. Pivoted to a fixed support is a spring-pressed holding-pawl 234, to prevent backward movement of the ratchet-wheel. The pawls 232 and 234 engage rearwardly-projecting teeth 235 on one-half of the ratchet-wheel. On the rear half of the ratchet-wheel are a series of forwardly-projecting teeth 236, Fig. 60, which coöperate with a stop-pawl 237 to prevent the ratchet-wheel from overthrow. It will be seen that the pawls 234 and 237 are adapted to lock the wheel against movement in either direction when they are both operative. On the lower arm 238 of the rocker 230 is a roller 239, which engages an arm 240 of the pawl 237 and throws said pawl out of engagement with the ratchet-wheel when the pawl 232 is drawn to the rear to engage another tooth. As the pawl 232 is again moved forward the roller 239 permits the pawl 237 to drop in front of a tooth 236 and stop the ratchet-wheel at the proper point in its travel. The pitman 233 is reciprocated by a crank 241, Figs. 1 and 32, on a shaft 242 at the left end of the machine. The pitman is made in two parts, one part carrying a casing 243, Figs. 32 and 34, in which the other part slides. The two parts are normally pressed apart by a spring within the casing. This construction affords a yielding joint, which will prevent positive movement of the ratchet-wheel in case of an obstruction in the distributing mechanism. The shaft 242 is connected by bevel-gears with a vertical shaft 244, which latter shaft is driven by the cam-shaft $h$. By the mechanism above described the gears 225 and $225^a$ are given a regular step-by-step movement, which movement is imparted to the matrix-carriers to bring the pockets of the carriers successively under the chutes 202 of the separator and successively over the tubes of the magazine. The matrix-separator chutes deliver the matrices to the carriers, and the carriers deliver them in turn to the magazine.

As previously stated, the matrix-carriers move in a substantially rectangular path over the rectangular magazine. The movement from left to right at the front of the machine and from right to left at the rear of the machine is accomplished, as described, by the gears 225 and $225^a$. As the carriers approach the right end of the magazine they are moved to the rear and as they approach the left end of the magazine they are moved to the front by mechanism now to be described. Referring to Figs. 32, 33, 34, 35, 57, 61, and 62, 245 indicates a cam-shaft which is driven by means of a worm-gear 246, worm 247, vertical shaft 248, and bevel-gears 249, connecting said shaft with the cam-shaft $h$. On the forward end of shaft 245 is a cam 250, which operates a horizontally-arranged three-armed lever 251. This lever is connected by segmental gears 252 with an elbow-lever 253. On the levers 251 and 253 are arms connected by links 254 255 with slides 256 257. The forward slide 256 has a rib 258, which engages with the forward end of the carrier—that is, the carrier moves in rear of the rib. This engagement of the carrier with the rib 258 takes place as the carrier passes to the right of the magazine. The levers 251 253 are then rocked, and the slide 256 moves to the rear, carrying with it the engaged carrier. Simultaneously the slide 257 moves forward and meets the slide 256. On the slide 257 is a beveled rib 260, which is gently spring-pressed upward. The carrier moves across this rib, depressing it, until the rib engages one of the transverse series of notches 259, Figs. 47 and 49. The slide 257 then moves to the rear, and the carrier is moved with it by engagement with said rib 260. At the left end of the magazine are a pair of slides 261 262, which operate in a similar manner to transfer the carriers from the rear to the front. These slides are connected by links 263 to arms 264, which arms are connected to intermeshing segment-gears 265. The forward arm 264 is also connected to the segment-gear 266, which meshes with the segment-gear 267, connected by the link 268, sliding rod 269, and link 270 with the three-arm lever 251, Fig. 33. By means of these connections the slides at both ends of the magazine operate simultaneously, being moved in one direction by cam 250 and in the opposite direction by spring $250^a$.

While the carriers are being transferred from front to rear, and vice versa, they are out of engagement with the gears 225 and $225^a$, and it becomes necessary to reëngage them with the gears. This is accomplished by mechanism particularly shown in Figs. 32 to 35, inclusive. Upon the rear end of the shaft 245 is a cam 271, on top of which operates an elbow-lever having a horizontal arm 272 and a vertical arm 273. The arm 273 is connected by a link 274 with a lever 275, and on the lower end of the lever 275 is a transverse bar 276, adapted to engage and forward the carriers to the gears 225. In order to follow the carrier properly as it engages with the gears, the lever 275 is given a step-by-step movement by means of certain irregularities in the cam 271. At the left end of the magazine is a lever 277, having a similar but opposite movement to the lever 275 and having a transverse portion 278 at its lower end adapted to engage with carriers and start them to the right. The lever 277 is connected by segment-gears 279 and an arm 280 with a link 281, the opposite end of which is connected to the lever 275. The levers 275 277 are operated in one direction by a spring 282, Figs. 34 and 35, and in the opposite direction by the cam 271.

It will be seen from the foregoing description that the carriers move in substantially rectangular paths, following each other in close succession. Each carrier is, for instance, started to the right by the lever 277, which moves it forward until it engages with the gears 225. It is then moved step by step across the magazine, and after passing beyond the right end of the magazine it engages with the slide 256. This slide then moves rearward and transfers the carrier to the slide 257, which moves the carrier to the rear of the magazine. The lever 275 then engages the carrier and moves it to the left into engagement with the gears 225, which gears carry it over the magazine until it passes beyond the left end thereof. It is then moved to the front, as described, and again comes in engagement with the lever 277. In passing over the magazine the carriers abut against each other and move in a solid procession, those in front being impelled by the one in the rear, which is in engagement with the gears 225. At each step the carriers stop with their cells over the tubes of the magazines, as shown in Figs. 35 and 57. While they are stopped, certain feelers descend on the carriers and test the matrices contained therein. Whenever a matrix is above its proper magazine-channel, the feeler releases it, and it is permitted to drop into the channel. The construction and operation of the feelers will now be described.

Referring to Figs. 51 to 56, inclusive, $n$ indicates one of the feeler-bars, the same being shown complete in Fig. 52. The frame of the feeler-bar consists of two side plates 283 and upper and lower plates 284. In each bar is mounted a series of vertically-movable feelers 285, each feeler comprising a shank 286, which slides in openings in the upper and lower plates 284, and a head 287, which carries the combination of feelers proper, 288. These are projections arranged to correspond to the notches in the several matrices. Each feeler is normally pressed into its lowest position by a spring 289, the downward movement of the feeler being limited by a wire 290, passing through the openings 291 in the shanks 286. There is a feeler-bar for each section of the magazine, and the entire series of bars are raised and lowered in unison with the step-by-step movement of the carriers, the feelers reaching their lowest positions while the carriers are stationary and being in their highest position while the carriers are in motion.

Referring to Figs. 32, 34, and 35, 292 indicates a rectangular frame on which the feeler-bars $n$ are carried. Pivoted to the ends of the feeler-bar frame are four levers 293. These levers are arranged in pairs, their inner ends being connected by segment-gears 294, Fig. 51. The outer ends of the levers 293 are carried on fixed bars 295. One lever of each pair carries an arm 296, which has a cam-roll 297 engaging a cam-groove in cam-wheel 298 on the shaft $h$. The cams 298 are so shaped as to give the feeler-bar frame and the feelers a short vertical reciprocation, causing the feelers to come into contact with the matrices in the carriers at the proper time.

The operation of the feelers upon the matrices is illustrated in Figs. 54, 55, and 56. In Fig. 54 the feeler is shown descending on a matrix which has corresponding notches, the matrix being sustained on the pawls 214. As the feeler projections enter the notches of the matrix the feeler is permitted to descend to its lowest level, and the ends of the feeler-head 287 push down the pins 221, causing the pawls to be thrown back, as shown in Fig. 55, and releasing the matrix, which drops by gravity into the magazine-tube. When the matrix is not over its proper tube, the feelers do not enter the notches, but engage the upper edge of the matrix, as shown in Fig. 56. This prevents the feeler-head from striking the pins 221, and the matrix is not released. The matrix is then carried to the next magazine-tube and tried by another feeler, and so on until it reaches its proper tube.

The distributer mechanism is carried on a frame $x$, supported on swinging arms 803, fixed on a rock-shaft 804. The distributer-frame is counterbalanced by a spring 805, the upper end of which is connected to an arm 806 on the rock-shaft 804, Figs. 2, 3, 4, 5, 7, and 32. The spring is sufficiently strong to nearly counterbalance the frame and the mechanism supported upon it. Beneath the frame is hinged a prop adapted to support it when raised.

In the lower part of the distributer-frame is a series of passages or channels 807 for guiding the matrices from the carriers to the magazine, Figs. 7 and 35. The channels 807 are supported by the distributer-frame $x$, as are also the various parts of the distributing mechanism. (Illustrated in Figs. 34 and 35.)

When the distributer-frame is raised for the purpose of inspecting the magazine-mouths, the distributing mechanism is automatically thrown out of operation. To effect this, the driving-pulley 808 is loose upon the distributer-shaft $g$ and is normally connected to said shaft by a clutch-disk carried on sleeve 809, which is arranged to slide upon and turn with the shaft, Figs. 2, 3, 5, 7, and 112$^a$. On the sleeve 809 is a cam 810. Adjacent to the cam, but normally out of contact with it, is a rocking arm 811. A spring 811$^a$ tends to throw the arm 811 into the path of the rotating cam 810, and when the arm enters the path of the cam the clutch-disk is disengaged from the pulley 808 and the distributing mechanism immediately stopped. Upon a rock-shaft 812 is an arm 813, Figs. 7 and 112$^a$, which is pressed constantly against the bottom of the distributer-frame by spring 811$^a$. When said frame is raised, the arm rocks upward, turning the shaft 812 and causing the arm 811, which is connected by intermediate parts to said shaft, to engage the cam 810. The distributer mechanism is thus thrown out of operation automatically when the distributer-supporting frame is raised.

Devices are also provided for stopping the distributing mechanism in case a matrix sticks in any of the magazine-mouths. To accomplish this, a series of bars 814 are reciprocated across the magazine-mouths, Figs. 7, 32, and 33. The bars 814 are connected to transverse bars 815, together forming a rigid frame, as best illustrated in Fig. 33. The rear ends of the bars 815 are connected to arms 816 upon a rock-shaft 817, having an arm 818 at its left end in contact with cam 819 on the shaft 242. The forward ends of the bars 815 are connected to arms 820 on a common rock-shaft 821. As the shaft 242 rotates the bars 814 are reciprocated transversely across the magazine-mouths. Should a matrix stick in one of the magazine-mouths, the frame 814 815 would be stopped, preventing the rotation of cam 819, and thus stopping the distributing mechanism, the frictional connection between the clutch and the pulley 808 being sufficiently light for this purpose.

Referring to Figs. 32 and 33, 57, and 58, the numeral 822 indicates a blade, which reciprocates vertically under the matrix-carriers at the left end and rear of the machine and restores the pins 221 and pawls 214 to their normal positions. Blade 822 is carried by a lever 823, rocking on shaft 824. The lever is provided with a spring or yielding joint 825, which permits it to yield if a pawl should stick, and thus prevent breakage of the parts. Lever 823 is rocked in one direction by the spring 826 and in the other direction by a cam 827 on shaft 242. The parts are so timed that the upward movement of the blade 822 takes place while the carriers are at rest.

*The magazine.*—The magazine comprises a series of sections, each preferably adapted to hold a font of lower-case or upper-case type. As shown in Fig. 71, there are eight of these sections in the present machine, four for lower-case and four for upper-case type or matrices. One object of the invention is to provide a magazine which will hold a very large number and variety of characters and assembling mechanism adapted to select any character from any one of the magazine-sections. A single magazine-section adapted to hold a font of characters is illustrated in Figs. 63 to 70, inclusive. Referring to these figures, $o$ indicates a magazine-section, the same being shown in side elevation in Fig. 63 and in end views in Figs. 64 and 65. Each section $o$ consists of a frame and a channel member within the frame. The channel member comprises two side plates 299, between which are two series of partition-plates 300 301. The partition-plates 300 have perforated ears which extend through openings in the side plates, and plates 301 abut against the inner faces of the plates 299. Wires 303 pass through the lugs 302 and lock the side plates and partition-plates together. The partition-plates are preferably corrugated, as shown at 304, and the upper ends of the partition-plates converge, as shown in Fig. 68, to form throats 305 to facilitate the entrance of the matrices.

The magazine-frames consist of end plates 306, channel-plates 307, connecting the upper portions of the end plates, and bars 307$^a$, connecting their lower portions. The channel-plates coöperate with fixed bars 308, Figs. 3 and 7, which serve to support and guide the magazine-sections. The channel members are removably held in the frames by locking devices, which, as shown, consist of threaded blocks 300$^a$, which interlock with lugs 300$^b$ on the channel member, the blocks being carried by a rod 300$^c$, having right and left screw-threads, Figs. 63, 64, and 65. By turning the rod 300$^c$ forward or backward the blocks 300$^a$ may be engaged or disengaged with the lugs or projections 300$^b$, thus locking or unlocking the channel member. When the channel member is unlocked, it may be lifted out of the frame.

Each magazine-section is provided with a matrix-retainer, the same consisting of an angle-bar 309, carried by two pivoted arms 310. These bars 309 support the matrices in their respective magazine-sections when the sections are inoperative, as will be hereinafter explained. Arms 310 have slotted openings through which pass pins 311, fixed on the frame. They are also connected by links 312 with cranks 313 on a rock-shaft 314, mounted in bearings at one side of the magazine-frame. One of the cranks 313 is connected by a link 315 with one arm of a hand-lever 316. A spring 317 tends at all times to draw the angle-bar 309 into engagement with the lowest matrices in the magazine-section and into position to support and retain all of the matrices in the section.

The slots in the arm 310 permit the matrix-retaining bar 309 to move downward as well as outward, when the cranks 313 are permitted to rock downward, and, vice versa, when the cranks 313 are raised, the retaining-bar 309 is first drawn inward and then upward, the latter movement effecting the raising of the matrices in the magazine, thus rendering the magazine operative and inoperative, respectively. When a retaining-bar is withdrawn from the matrices in a magazine-section, the matrices are lowered to rest on the escapement-bar 369, as hereinafter described. (See Fig. 76.) To permit of the free movement of the escapement-bar under inoperative magazine-sections and to permit of the withdrawal of the magazine-sections laterally across the escapement-bars, it is necessary that the matrices be raised, so as not to rest upon or interfere with the escapement-bars. For this purpose the arms 310 have pin-and-slot connections with the magazine-sections, as described. Any equivalent connection which would move the retaining-bars both inward and upward might of course be substituted.

To the left of the magazine is a sliding bar 318, provided with a track or way 319, upon which rollers 320 rest. These rollers are carried by the crank-arms 313 on the left ends of the rock-shafts 314. In the track 319 are two depressions 321. Springs 322 connect the crank-arms on the right ends of the magazines with fixed points, tending to rock the shafts 314 and causing the rollers 320 to bear down upon the tracks 319. The depressions 321 are spaced apart nearly equal to the distance between corresponding sections in the upper-case and lower-case halves of the magazine. If they were spaced exactly equal to the distance between corresponding sections of the magazine—that is, the distance between the first and fifth sections, the second and sixth sections, &c.—two sections would be rendered operative simultaneously. It is desirable, however, to only render operative one magazine-section at a time to prevent any possibility of matrices from two sections interfering in the assembler. This is accomplished by spacing the depressions 321 slightly different from the spacing of the corresponding magazine-sections. By one movement the bar 318 is shifted to set the machine for using a given font, and by another movement the bar is shifted back and forth to render either the upper-case or the lower-case section carrying said font operative. The object of the depressions is to render the magazine-sections operative by permitting the shafts 314 to rock and throw the matrix-retaining bar out from under the matrices, as indicated in dotted lines in Fig. 66.

The track-bar 318 is adjusted to render different sections operative by devices illustrated in Figs. 71 and 73. Adjacent to the keyboard is a lever 323, pivoted at 324 and carrying a spring-latch 325, which engages the notches in a sector 326. To the lever 323 is connected a rod 327, and the sector 326 is connected to a parallel rod 328, hung on a link 329, which is pivoted to the frame at 330. The rod 327 is connected to the sliding bar 318 by an elbow-lever 331, link 332, arm 332$^a$, shaft 332$^b$, arm 333, and link 334. When the lever 323 is shifted, the sliding bar 318 is simultaneously shifted to render available different font-sections of the magazine. When in its forward position, the first and fifth sections are available, and when in its rearmost position the fourth and eighth sections are available, &c., Figs. 1, 2, 3, 4, 71, and 73.

The shifting of the rod 318 to render either upper or lower case magazine-sections operative for any font is accomplished by the following means: Referring to Figs. 71 to 73, inclusive, 335 indicates a cam-shaped roll pivotally carried on the rear end of a lever 336. Cam-roller 335 normally stands above and free from a constantly-running roll 337. It is counterweighted and has a tendency to rotate into contact with roll 337, but is normally prevented from engaging said roll by a latch 338, on which a projection 339 of the cam-roll rests. Latch 338 forms one arm of an elbow-lever, the other arm 340 of which is connected by a link 341 to the case key-lever 342. It will be evident that when the key-lever 342 is operated the latch 338 will be withdrawn from the pin 339 and the cam-roll 335 permitted to engage the running roll 337. This will cause the cam-roll to make one revolution and rock the lever 336. On the completion of a revolution it is again caught by the latch 338, and it is prevented from rebounding by the stop-pawl 343. The lever 336 is connected to a stop-lever 344, and when it is rocked it withdraws the stop 345 from the projection 346 on cam-wheel 347, permitting said cam to make half a revolution. There are two of the projections 346 diametrically opposite, and when the stop 345 is withdrawn from one it is immediately thrown back into the path of the other by spring 348. As cam 347 makes half a revolution it rocks cam-lever 349, which cam-lever is connected to the rod 328. The rod 328 is thus reciprocated to a small extent, and the parts 323 to 334, inclusive, are given a corresponding movement. When the key-lever 342 is again depressed, the cam 347 makes another half-revolution, restoring all the parts to their original positions. By the means described the bar 318 is shifted to render either upper or lower case of any font available, it only being necessary to touch the key 342 to release the weighted cam 335.

Referring again to Figs. 63 to 67, inclusive, 350 indicates a locking-lever on the end of each magazine-section. When the section is pushed into place in the magazine, as indicated in Fig. 63, the upper arm of the lever 350 strikes rail 318 and is thrown out of engagement with the arm 313. A hook-shaped lower extension of the lever 350 engages a flange 351, depending from rail 318. When, however, a section is withdrawn from the magazine, the lever 350 locks the rock-shaft 314 and matrix-retaining bar 309, so that the section can be handled independently without spilling the matrices. Thus when it is desired to remove a magazine-section it is drawn out by means of the hand-lever 316. The first effect of pulling the hand-lever is to rock the shaft 314 and raise the cranks. The lever 350 is then moved out positively by the flange 351 until its upper arm stands under the crank, as shown in Fig. 65, thus preventing the rock-shaft from moving backward. The rock-shaft thus holds the retaining-bar 309 in position under the matrices, as shown in Fig. 66. A spring 352 is provided to hold the lever 350 under crank 313 when the magazine-section is removed. The magazine-sections may thus be removed by simply pulling on the hand-levers 316, and they may be replaced by simply pushing them into position in the magazine. It is preferable, however, to have a positive lock for holding the magazine-sections in place, and this is provided in the form of a locking-bar 353, operated by a lever 354, Figs. 74 and 78.

Beneath the magazine is a series of fixed channels 355, through which the matrices pass when released by the escapement devices to be hereinafter described. In the magazine the matrices are deposited one above another on their sides. The characters being in the ends of the matrices, it becomes necessary to give them a quarter-turn on their way from the magazine to the assembler. This is accomplished in the channels 355. Referring to Figs. 74 to 77, inclusive, it will be seen that in each of these channels there is a bar or abutment 356, against which one corner of the matrix strikes as it falls from the magazine, and opposite said bar or abutment is an enlargement of the channel sufficient to permit the matrix to turn. Fig. 76 shows a matrix in the position in which it strikes the turning-bar 356, and Fig. 77 shows the matrix partly turned thereon. The turning-bars 356 are preferably steel rods extending through the entire series of channels 355.

Below the turning-channels 355 is a funnel $p$. (Illustrated in Figs. 71, 80, 81, and 82.) The funnel consists of two branches 357, 358, each comprising front and back plates and a series of partition-plates 359. The two branches of the funnel discharge at a common point 360. The partition-plates form channels which convey the matrices from the turning-channels 355 to the inclined edges 361 of the funnels. Supported within each edge is a thin flexible strip of metal 362, forming an elastic or yielding abutment against which the matrices strike. This prevents injury to the funnel and to the matrices due to their fall from the magazine. The strips 362 guide the matrices to the discharge-point 360. The funnel-sections are provided with hinged covers 363, which are normally closed by latches 364 and may be raised to permit of access to the channels. The outlet 360 is situated at or about the axis of trunnions 365, upon which the funnel is supported and about which it rocks. The funnel is connected by a link 366 and elbow-lever 367, rod $367^a$, and arm $367^b$ with the shaft $332^b$, which moves the bar 318, Figs. 2, 3, and 71. The funnel is thus shifted from one section to the other of the magazine as said sections are rendered operative by the bar 318, one branch of the funnel always standing under the operative section and the other branch of the funnel standing nearly under the section containing the other half of the same font.

While we prefer to locate the upper and lower case matrices of each font in separate magazines, it is obvious that the matrices may be apportioned to the different magazines by groups or series which are not divided on the lines between upper and lower case or between fonts. We desire it understood, therefore, that the term "font" is used herein as a convenient term to indicate a primary group of matrices and the terms "upper case" and "lower case" as convenient terms to indicate subgroups thereof.

*The assembling mechanism.*—Beneath the magazine are a series of escapement-bars $q$, Figs. 74 to 79, inclusive. Each of these bars, as shown, comprises two side strips 368 and a series of intermediate blocks 369, the said strips and blocks being so spaced as to provide channel-openings 370 between them, through which the matrices may fall. The blocks 369 have projections 371 upon their forward ends, which form shelves upon which the rear ends of the lowest matrices in the operative magazine-section rest, as shown in Figs. 74 and 76. As previously described, the matrices in inoperative magazine-sections rest on the angle-bars 309. When the escapement-bar $q$ is drawn to the rear, the supports or shelves 371 are withdrawn from all of the matrices above the bar. The matrices in the several channels are supported and prevented from falling by the angle-bar retainers 309, excepting in the magazine-section which happens to be operative. The lowest matrix in this section drops into the cell or opening 370 in the escapement-bar and assumes the position shown in Fig. 77, the said lowest matrix resting on the fixed wall $355^a$ of its turning-channel and supporting the matrices above it. As the escapement-bar moves forward the shelf 371 moves under and supports the matrices in the magazine-section and the matrix previously deposited in the bar is dropped into the turning-channel, as shown in Fig. 76. It will be seen that a single escapement-bar answers for the corresponding channels of all of the magazine-sections. The escapement-bars are normally held in their forward positions by springs 372, which bear upon elbow-levers 373, the vertical arms of which engage notches 374 in the rear ends of the bars. The bars lie close together, as shown in plan in Fig. 75, their forward ends extending under a flange or cap-plate 375.

Figure 3:
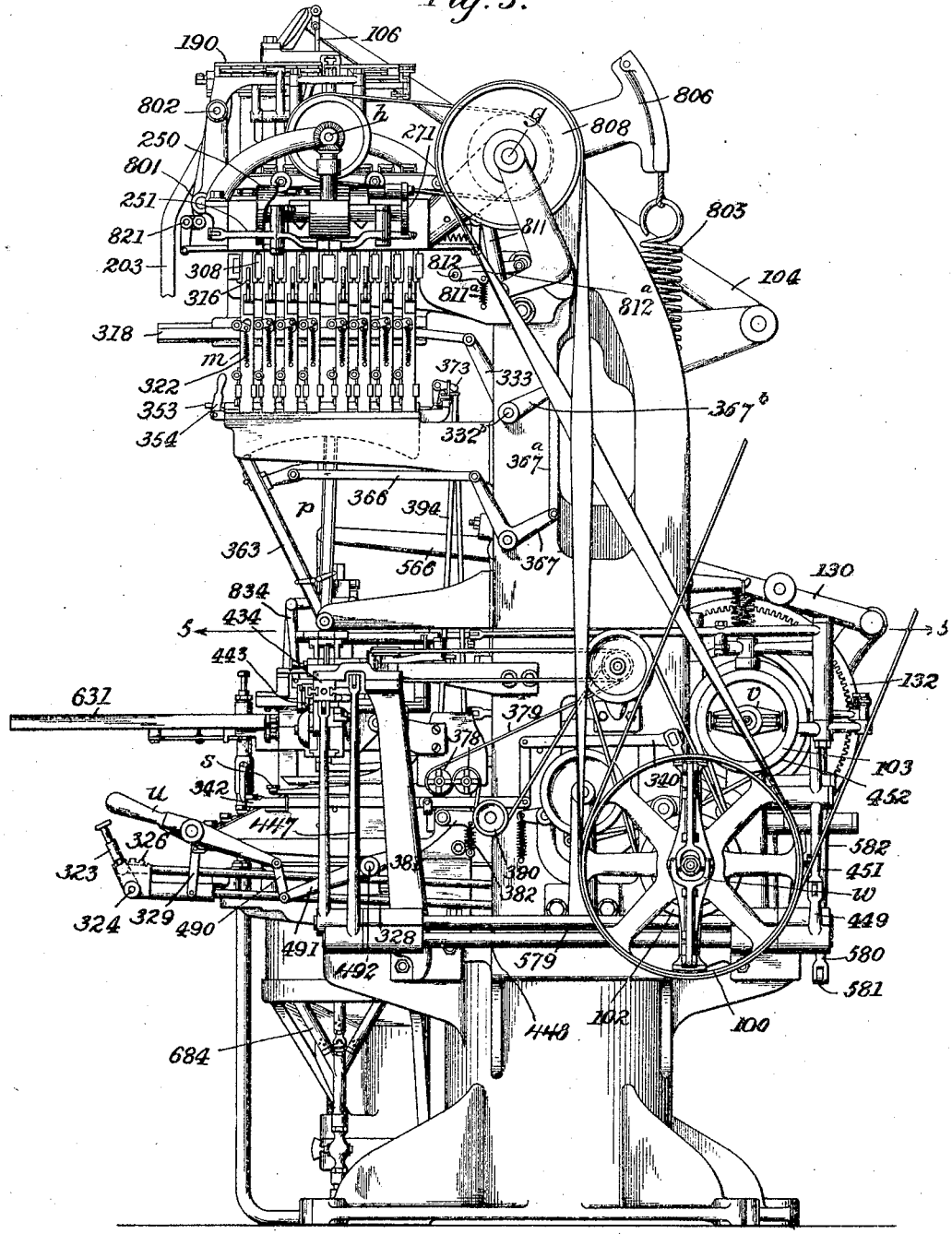
Figure 4:
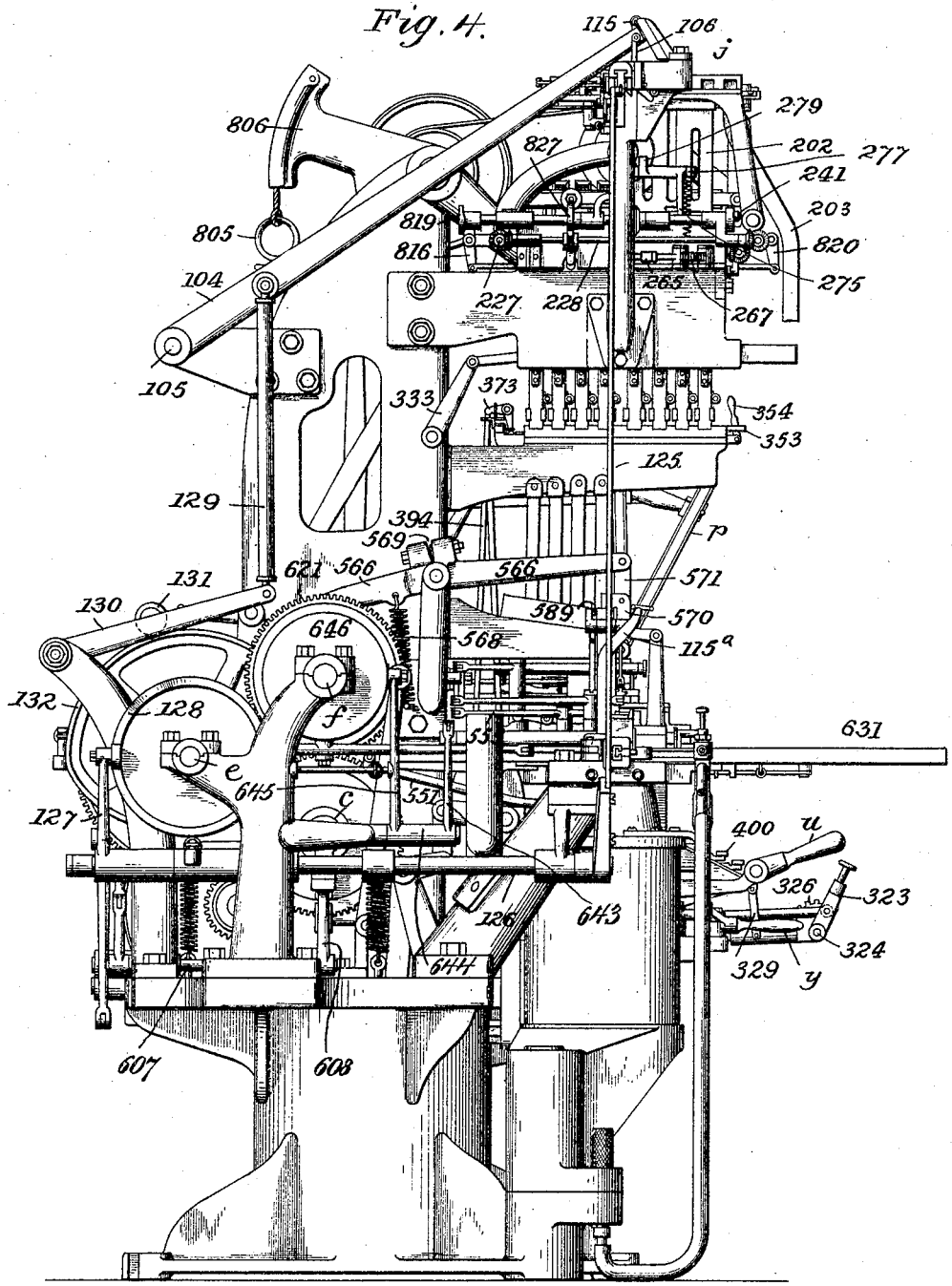

The escapement-bars are operated by a pair of continuously-rotating rolls 376 377, said rolls being provided with pulleys 378 and driven by a belt 379, Fig. 3. Said belt passes around a pulley 380, carried on a pivoted arm 381, which is under tension of a spring 382 to keep the belt constantly tight. Above the rolls 376 377 are two series of cams 383, each cam being supported in a vertically-sliding cam-carrier 384, Figs. 83 to 88, inclusive. Each cam-carrier consists of two side plates 385 386, suitably spaced apart. Between these plates is a short slide 387, held in place, with freedom for vertical movement, by means of a U-shaped key 388, Fig. 87. The slide 387 rests upon a spring 389, which spring is supported in the cam-carrier. The upper ends of the carriers slide in a suitable guide or comb 390, which is removable to permit of the easy removal of the carriers. The lower end of each side plate 385 has two branches which slide vertically in grooves in guide-strips 391. These branches have right-angled portions 392, which slide in the grooves, and one of these right-angled portions on each carrier is provided with a shoulder 393, Fig. 87, to limit the downward movement of the carrier and support it when it is inactive. The lower ends of the escapement-rods 394 rest within the carriers and upon the slides 387. The upper ends slide in openings in a plate 395 and stand beneath the horizontal arms of the elbow-levers 373, which operate the escapements.

Each cam-carrier is provided with a pivoted stop-arm 396, which has a projection or shoulder 397, adapted to intercept a projection 398 on its respective cam to stop the revolution of the latter. Beneath the free end of each stop-lever is a key-bar 399, adapted to be vertically reciprocated by one of the key-levers 400 of the keyboard. As shown, the key-lever has a projection 401, which engages a notch 402 in its key-bar. Each of the key-bars is provided with a shoulder 403, by means of which the bar is supported on the fixed rod 404. A second shoulder 405 prevents the key-bar from being raised abnormally. It will be understood that for each key-lever there is one key-bar, one cam-carrier, one escapement-rod 394, and one of the escapement-bars q.

The operation of the devices above described is as follows: Upon pressing the key the key-bar is raised and the free end of the stop-lever, which normally rests upon the key-bar, is raised sufficiently to carry the shoulder 397 above the projection 398 on the cam. The cam or eccentric is unequally weighted, and as soon as released it begins to revolve and immediately it engages one of the rolls 376 377 and is rapidly rotated. To facilitate this engagement, the roll is preferably covered with soft material, such as rubber, and the cam is provided with a roughened or serrated surface. The rotation of the cam raises the cam-carrier to which it is attached a slight distance and then permits it to fall again. At the end of a single rotation the cam is again detained by the stop 397, the stop-lever having been lowered in the meantime. The upward movement of the cam-carrier is communicated to the slide 387 through the spring 389 and then to the escapement-rod 394, which rests on slide 387. The spring takes up the shock of sudden starting and stopping and also provides relief in case the escapement-bars should for any reason stick or refuse to operate. It will thus be seen that each time a key-lever is operated the corresponding escapement-bar is quickly reciprocated by power and returned to its normal position, a matrix bearing the desired character being thereby delivered to the assembling mechanism.

The machine is provided with a series of separators r, which are used to separate the words in the assembled line of matrices and which are automatically circulated from the assembled line back to the point at which they are introduced into the line. A series of the separators in their magazine and in position to be dropped into the assembler are illustrated in Fig. 89. The separators are preferably of the form illustrated in Fig. 97 and are provided with undercut notches, which engage a rib 406 on the separator magazine-rail 407. Referring to Figs. 89 to 92, inclusive, 408 indicates a common tube, through which the matrices and separators pass to the assembler. The matrices enter the upper end of the tube, which is directly under the funnel p. In the left side of the tube 408 is an opening 409 in line with, but slightly above, the separators on the magazine-rail. All of the separators in the magazine are under tension to move to the right—that is, they are constantly spring-pressed against the tube 408 by devices to be hereinafter described. An escapement is provided for permitting the end separators to enter the tube by the opening 409 when desired, constructed as follows: Beneath the separators adjacent to the tube is a blade 410, having its upper edge beveled, as shown in Figs. 93, 94, and 95. This blade is part of the yoke 411, which is pivotally hung on an arm 412, which arm is pivoted on rock-shaft 413, mounted in a fixed bearing 414. On the forward end of the rock-shaft is an arm 415, carrying a spring-plunger 416, which is normally engaged with a socket 417 on the arm 412, causing said arm to rock with the shaft 413. It is sometimes desirable to permit the shaft 413 to rock without inserting a separator, and in such case the plunger 416 is temporarily withdrawn from the arm 412 by hand. The rock-shaft 413 has an arm 418, which is connected with one of the escapement-rods 394. This particular escapement-rod is operated from a space-key s, Figs. 1, 3, and 6, exactly as the other escapement-rods are operated from the character-keys. When the space-key is depressed, the shaft 413 is rocked and the end separator raised until it registers with the opening 409, when it is pushed forward by the line of separators and enters the channel or tube 408 and drops by gravity to the assembling-point.

The assembler which arranges the matrices and separators in line is constructed as follows: The matrices and separators drop to the assembling-point t, Figs. 94 and 96, in front of a pusher 419, having four motions—that is, said pusher moves downward, then rearward, then upward, and then forward, thus pushing forward a matrix and passing under the following matrix. The pusher 419 is one arm of an elbow-lever, the other arm 420 being pivoted to the extremity of a pivotally-mounted arm 421 with freedom for slight movement thereon.

The elbow-lever 419 420 is connected by link 422 to a cam-lever 423, having a cam-roll 424, which runs in a groove 425 in a cam-wheel 426. The cam vibrates the arm 423 continuously. As the cam-lever starts forward to the left the elbow-lever is rocked on its pivot and the pusher 419 raised. The arm 421 is under some frictional restraint, and the elbow-lever is permitted a slight movement independently of the arm, after which it carries said arm with it. The pusher 419 is thus moved first upward and then forward. If a matrix or separator be at the assembling-point, it will be pushed out of the space t and against a yielding abutment 427. As the cam-lever 423 starts on its rearward movement the pusher 419 is first lowered and then drawn back, the operations being the reverse of the upward and forward movements.

Adjacent to the lower end of tube 408 is a vibrating packer 428, carried by cam-lever 429, which is rapidly rocked by a series of projections 430 on the cam 426. Packer 428 strikes each matrix in turn and seats them all properly on the assembling-way 431.

The yielding abutment 427 is in the form of a slide movable back and forth in a groove in the head 432 of a slide 433, Figs. 89, 91, and 96. Slide 433 is mounted in a groove in the front face of a fixed rail 434. On the under side of said slide is a rack meshing with a gear 435, to which is connected a coil-spring 436. The tendency of the spring is to keep the slide 433 in its right-hand position, holding abutment 427 close to the assembling-point. As matrices are added to the line, however, the slide is forced to the left by the pusher 419.

On the slide 433 is an adjustable block 437, which can be clamped in any desired position by means of a clamping-screw 438 to limit the length of the assembled line. The line is limited by the block 437 coming in contact with the latch 439, which is carried on rock-shaft 440, Figs. 89, 94, 96, and 112. On the rear end of the shaft 440 is a lever 441, which is moved in a manner to be presently described to effect the release of the line when the latter is filled and ready to move to the casting mechanism. On the block 437 is an incline 442, which operates a bell-hammer 443 to give warning when the line is nearly completed. When it is desired to make any correction in a line wholly or partially assembled, the abutment 427 is moved slightly to the left to release the matrices and is held in such position so long as desired by a clamp 444, Fig. 89.

Figure 2:
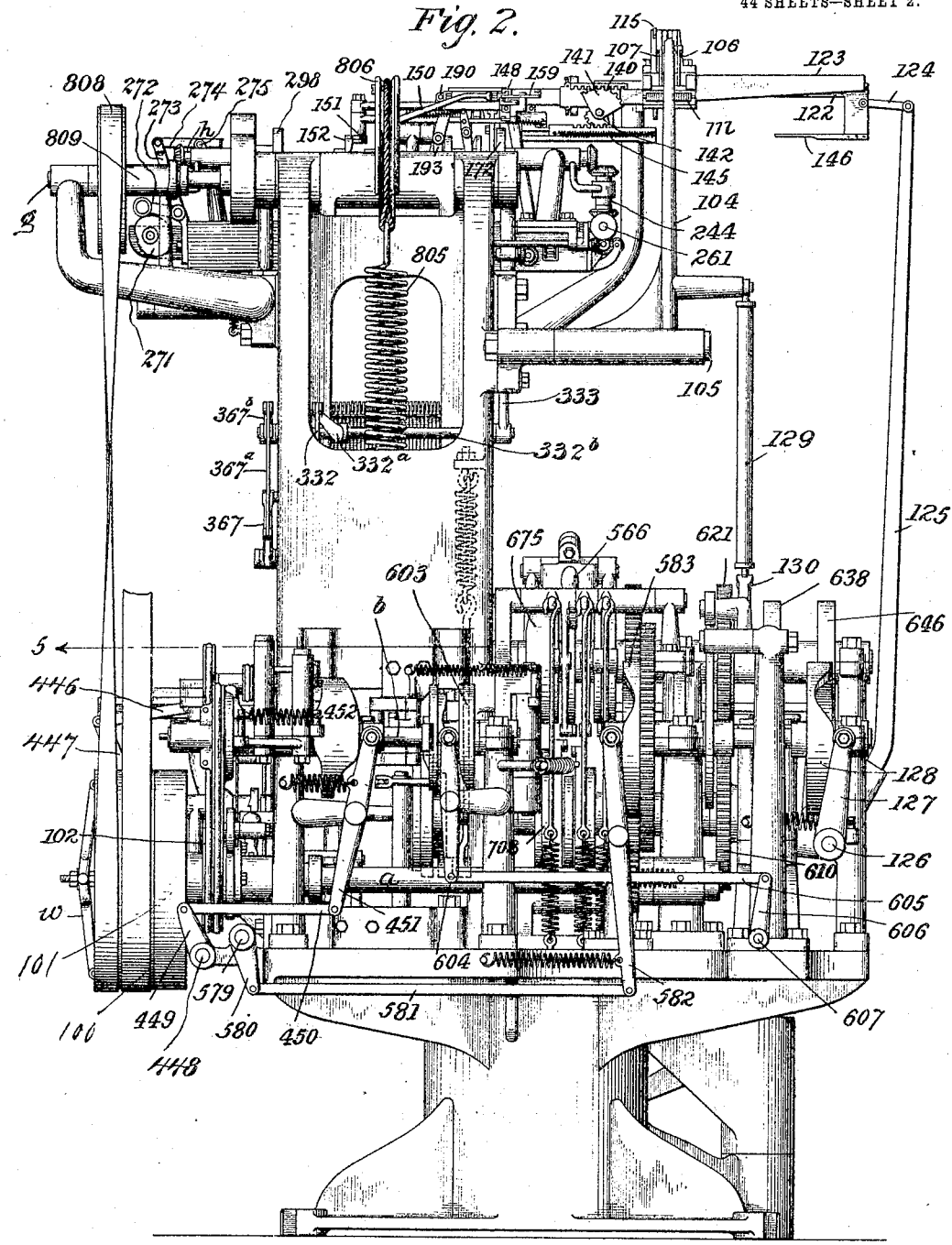

Sliding in a groove in the rear side of the rail 434 is a slide 445, operated by link 446, lever 447, rock-shaft 448, arm 449, link 450, cam-lever 451, and cam 452, Figs. 1, 2, and 6, on shaft $b$. The slide 445 carries a plate 453, having a cam-surface 454, which raises the arm 441 when the slide is moved to the left, thus raising the latch 439 and releasing the abutment 437 from control of said latch, Figs. 89, 96, and 112. This permits said abutment to move to the left in advance of the line. The line is moved to the left by the line-forwarder 455, Figs. 100, 101, 102, and 103, said forwarder being pivotally mounted on the left end of the slide 445. The line-forwarder normally stands in position shown in Figs. 93, 100, and 103—that is, to the right of the assembling-point and in position to forward the line to the mold. It is arranged to turn upon a pivot 456 and provided with notches which engage with a spring-bolt 457 to hold it in either one of two positions. One of these positions is that shown in Figs. 93 and 100, while in the other position the forwarder is out of line with the assembling-rail and adapted to be moved to the right in the rear of said rail, as shown in Fig. 102.

On the under side of the separator magazine-rail 407 slides a head 458, carrying a pair of spring-pawls $458^a$, which normally press the separators in the magazine against the tube 408. The slide 458 is operated by link 459, arm 460, rock-shaft 461, arm 462, link 463, lever 464, Figs. 2, 6, 89, 90, and 93, link 465, and cam-lever 466, having a roll bearing on the right edge of the cam 452. The spring 467, connecting lever 466 with a fixed arm $467^a$, tends to hold the cam-roller against the cam. Said cam is so shaped that the spring acting through the parts mentioned causes pawls $458^a$ to follow the line of separators and constantly press them against the tube 408.

In assembling a line of matrices a device to control the justification of the line is adjusted each time a separator is introduced, the maximum adjustment for each line being in proportion to the number of separators in the line. In the present instance the device which controls the justification is a pivoted bar adjustable angularly in proportion to the number of separators. After the bar is adjusted for a line it is, in effect, a wedge, and it is given a bodily movement which is limited by the shortage of the line. This bodily movement in any case is in proportion to the quotient of the shortage of the line divided by the number of word-spaces, and it determines the width of the justifying-spaces. The construction of this justifying-controller and its operation will now be described in detail.

Referring to Figs. 89, 94, 96, 98, and 99, 468 indicates a slide which moves back and forth beneath the rail 434. An angle-bar 469 is pivoted to the slide 468 in such manner that one of its edges is radial to and passes through the pivotal point 470. A spring 471 tends to bring the angle-bar into parallelism with the slide. On its free end the bar is provided with a curved series of ratchet-teeth 472. The ratchet-teeth 472 are unequally spaced, the spaces between teeth gradually decreasing from the radial edge. The spacing of the teeth is such that radial lines passing through them divide a tangential line perpendicular to the radial edge into equal parts. A pawl 473, pressed into engagement with said rack by a spring 474, tends to hold the rack and angle-bar in any position in which they may be placed. The moving pawl 475 of the angle-bar is pivoted to the end of an arm 476. A spring 477 holds the pawl in engagement with the ratchet 472. Arm 476 is mounted on rock-shaft 478, driven by bevel-gear segments 479 from rock-shaft 480. On said rock-shaft is an arm 481, connected by link 482 with an arm 483, Figs. 93, 99, on the rock-shaft 413, which operates the separator-escapement. Spring 484, Fig. 98, tends to move the pawl 475 to the left, and it is moved positively to the right by means of the described connections with the separator mechanism and the space-key. When it is desired to introduce a separator into the line without moving the angle-bar, the push-pin 485 is pushed in while the space-key is being operated. The inner end of this pin abuts against a projection 485$^a$ on the moving pawl 475. To throw out both pawls 473 and 475, the slide 468 is moved rearward against the action of the spring 486, which holds it in its normal position. When this is done, the tail end of pawl 473 engages the fixed wall 487, throwing pawl 473 out of engagement with the ratchet-teeth. Pawl 475 has a projection 488, with which pawl 473 engages. In this manner both pawls are simultaneously thrown out, permitting spring 471 to draw the angle-bar into its normal parallel position. This rearward movement of slide 468 can be effected by means of a small hand-lever 489, Fig. 89. It is also effected by the movement of the starting-lever $u$, as will be presently explained. The starting-lever $u$ is situated at the right and in front of the machine in a convenient position. After each line is completed this lever is pushed down from its normal position to measure the line and set the justifying mechanism and then raised and pushed upward slightly above the normal position, the latter movement being to start the machine and restore the angle-bar to its initial position in order to receive a setting for a new line. The lever $u$ is connected by link 490 with arm 491 on the rock-shaft 492. A second arm 493 on said shaft is connected by link 494 with arm 495 to a second rock-shaft 496, Figs. 3, 8, 9, 10, 89, and 98. Shaft 496 is connected with the angle-bar slide 468 by sector-gear 497, pinion 498, and gear 499, the latter gear meshing with a rack on the slide 468. It will thus be seen that the downward movement of the starting-lever effects a forward movement of the justifier-slide. This forward movement of the slide continues until the outer or right edge of the angle-bar 469 engages the left inner edge of the block 437. The position of the block 437 at this time depends upon the matter in the line—that is, the combined thickness of the separators and matrices which have been assembled. The matrices, it should be understood, are of different thicknesses, the thickness of each matrix being equal to the space which its type or characters should occupy in the line. The position of the block 437, therefore, is different for the different lines and in each instance depends upon the amount of matter in the line or the difference between that amount of matter and the desired length of lines, which difference may be termed the "shortage" of the line. The forward movement of the angle-bar slide sets the justifying mechanism to cause proper spaces to be cast on the logotypes.

It is necessary that the angle-bar slide should be immediately returned to its initial position in order that the assembling of the matrices for the next line should not be delayed. When the starting-lever is raised, the justifier-slide is therefore returned, and by giving the starting-lever a slight upward movement beyond its normal position the angle-bar slide is moved rearward beyond its normal position, causing the pawls to be disengaged from the ratchet of the angle-bar, as hereinbefore explained with reference to Fig. 98, and permitting the angle-bar to be restored automatically to its initial position parallel to the slide.

The rock-shaft 492 carries a short arm 500, Figs. 7, 9, and 10, which abuts against a horizontal link 501, connected to the lower end of a vertical lever 502. The upper end of this lever is connected by link 503 with an elbow-lever 504. The elbow-lever 504 operates to withdraw a spring-latch 505 from the end of clutch-lever 506. The latter lever when engaged with the latch maintains its clutch $v$ inactive. When lever 506 is released, however, the spring 596 within the shaft $b$ throws the clutch in operation, Fig. 113. There are two unequally-spaced latches 505, hinged to the disk 508, which disk is fixed on shaft $b$. Each of these latches is pressed outward by a spring 509, and near its outer end is a slot or notch having an inclined edge 602. As the shaft revolves this inclined edge engages the end of the lever 506 and draws it inward toward shaft $b$, thus throwing the clutch $v$ out of operation. As disk 508 has two of these latches, it will be evident that the shaft $b$ will be automatically thrown out of operation after each partial rotation. The various operations performed by shaft $b$ will be recapitulated hereinafter.

On shaft 496 is loosely mounted a sector-gear 510, upon which is a pin 511. Fixed on shaft 496, adjacent to the sector-gear, is an arm 512, adapted to engage with the pin 511 and turn the sector-gear when the shaft 496 is turned in the direction for moving forward the justifier-slide. The sector-gear 510 meshes with pinion 513 on a shaft 514. Upon said shaft is also a gear 515, which meshes with the teeth on a sliding rack 516, Figs. 104, 104$^a$, 105, and 106. The rack 516 is in mesh with a pinion 517, mounted in a sliding yoke 518, which is adapted to slide in guides upon a sliding carriage 519, the carriage 519 being movable in guides upon the main frame. The yoke 518 carries a plunger 520, which is threaded to correspond to an internal thread in pinion 517. The plunger 520 is cylindrical and is prevented from turning by a rib or feather which engages the yoke, and consequently as the pinion 517 turns the plunger is moved one way or the other. The amount of movement of the plunger, as will be seen, must be in proportion to the amount of movement of the angle-bar slide—that is, it is determined by the shortage of the line and the number of separators in the line. The movement of the plunger for any particular line should be equal to the width of justifying-spaces which are to be cast upon the logotype of that line. As shaft 496 is rocked forward and then immediately backward, means must be provided for holding the rack 516 and its connected parts in position for justifying the line until the logotypes requiring justifying-spaces have been cast. A spring 521, acting through pinion 522 and rack 516, Figs. 104 and 108, tends to return said rack to its initial position. When the rack is moved forward, it is prevented from returning by a spring-pawl 523, which bears frictionally upon its upper surface. Above the pawl 523 is a lever 524, which is depressed in a manner to be hereinafter described to release the slide and its connected parts and permit them to return to normal position. A foot $524^a$ prevents abnormal displacement of lever 524, Fig. 108.

In measuring the shortage of the line with the angle-bar the actual shortage minus the combined thickness of the separators in the line is really measured. The mechanism above described would set the mold for casting a space which is therefore too small by the thickness of a separator, and it becomes necessary to give the body-piece a second and constant adjustment to allow for the thickness of a separator in casting each of the words of a line excepting the last one. This adjustment is effected as follows: Below the yoke 518 is a threaded stud 525, turning in a threaded opening in carriage 519. The stud 525 has a collar 526, which engages a groove in the lower edge of yoke 518. On the outer end of stud 525 is a sector-gear 527, which is in mesh with a second sector-gear 528, Figs. $104^a$, 105, and 106. To a pin 529 on said latter gear is connected a rod 530, which carries in its upper end a roll 531. The roll 531 is normally drawn up into the path of slide 445 by a spring 532. As the slide 445 moves to the left to carry a line of matrices to the mold it presses down the roll 531, turning the screw-stud 525 and causing the yoke 518 and its connected parts to move to the left, thus increasing the amount of space to be cast on the logotype, as will be presently explained. The rack 516 and the sector-gear 528 and pinion 517 are broad—that is, they have long teeth—and they remain in mesh during the movements of slide 519.

The mold is provided with a movable liner or body-piece 533, Figs. 104 and 105. This liner is in the form of a thin blade having on its upper and lower edges and left end a marginal flange 534. The right end of the blade is locked to the slide 519 by a spring-bolt 535. A sliding rod 536 carries a claw 537, which engages a pin 538 on the bolt 535. A handle 539 is provided on the rod 536 for withdrawing the bolt to release the liner. On the lower edge of the liner are teeth which engage a pinion 540. This pinion may be turned by a knob 541, Fig. 106, to remove the liner when it is unlocked.

Above the liner 533, Fig. 105, is mounted the movable jaw 542 of the matrix-clamp. This jaw is normally held down upon the liner and mold by a spring-pressed pin 543. In its rear end is a slot 544, into which engages a toe 545 upon the carriage 519. When the mold has been adjusted to cast a logotype, the rear end 546 of the jaw 542 is in contact with a small spindle $520^a$ within and carried by the plunger 520. The spindle $520^a$ is threaded and removably screwed into the right end of plunger 520. In the normal operation of the machine the spindle $520^a$ is in the position shown in Figs. $104^a$ and 105, with its head $520^b$ abutting against the plunger 520. When it is desired to cast a word of greater length than the length of the mold, the matrices for the word are assembled in two groups, with a separator between them, and two half-logotypes are cast. In such cases the intermediate separator is not counted in setting the justifier angle-bar, and the first half-logotype is cast with the spindle $520^a$ retracted until flush with the end of the plunger 320. The shoulder 544 of jaw 542 abuts on the toe 545, and the half-logotype is cast without any space. The spindle is then restored to normal position, and the second half-logotype is cast with the usual space. In this manner words of any length greater than that of the mold may be cast.

After a logotype is cast the slide 519 and its connected parts are moved to the right to release the matrices and allow them to be raised out of the way, after which the slide 519 and connected parts are moved to the left to eject the logotype from the mold 547. During this ejecting movement the movable jaw 542 is raised by means of an incline 548 on said jaw, which comes in contact with a fixed incline 549. This raising is for the purpose of preventing the movable jaw from encountering the knives which shave the logotypes. The slide 519 is moved to eject the logotype after each casting operation by means of link 550, cam-lever 551, and cam 552 on shaft $c$, Figs. 8 and 106.

The line of matrices and separators when assembled is moved to the left by the line-forwarder 455 until the forward end of the line encounters the head or clamp 843 of the slide 844, which is spring-pressed toward the right, Figs. 105, 107, 110, 111, and $111^a$. Slide 844 is controlled by a lever 845, having a pin entering a yoke or notch in said slide. A spring 846 is connected to an arm of lever 845 and tends constantly to move the slide to the right. The line-forwarder overpowers the yielding clamp 843, and the matrices of the first word are carried into engagement with the presentation-slide while gripped between the forwarder and the said clamp. Clamp 843 is then immediately moved to the left of the presentation-slide and out of its path as follows: As the presentation-slide 570 starts to descend a shoulder 847 on said slide immediately engages a short arm 848 of lever 845 and throws the slide 844 to the left. The clamp 843 repeats this operation for each word in the line, thus insuring the proper delivery of the matrices to the presentation-slide and preventing them from being canted or otherwise disarranged. The matrices are supported in the presentation-slide by the rib 553 on the lower end thereof.

The movement of the line to the left is limited by the first separator engaging the presentation-slide, the lugs of the separator projecting beyond the matrices and being thereby prevented from entering the space into which the matrices enter. The first separator strikes the end of the trip-bar 554, which operates through lever 555, link 556, and lever 556$^a$ to raise latch 557, permitting spring 557$^a$ to rock shaft 557$^b$ and throw back the latch 558, which retains the clutch-lever 559 in position to hold the main clutch open, Figs. 6, 8, 9, 105, 107. When the clutch-lever is released, a spring 560 within the shaft $a$ forces a rod 561 within said shaft to the left, operating toggle-arms 562, which operate clutch-shoes 563, and connect shaft $a$ with the drive-pulley 100. The rod 561 is connected with a collar 565, which bears on the clutch-lever 559, Figs. 9 and 115. The shaft $a$ is thus started, and it continues to turn until the casting cam-shafts $c$ and $d$ have made a full revolution, at the end of which time the latch 557 engages the end of the clutch-lever 559 and rocks said lever to throw out the clutch, the said latch 557 having an inclined surface which engages the lever and draws it radially inward toward shaft $a$. Shaft $a$ is in gear with shaft $c$, and shafts $c$ and $d$ are geared together, Fig. 9.

As shaft $d$ rotates cam-lever 566 is rocked vertically by cam 567, the lever being held in contact with cam by spring 568. The lever 566 is made in two parts connected by spring-joint 569, so that it may yield in case the presentation-slide becomes jammed, Fig. 120. The presentation-slide 570 is connected to the forward end of the lever by link 571. The first movement of the presentation-slide carries the matrices of the first word downward into proximity to the mold 547. As the presentation-slide moves down the slide 519 moves to the left, causing jaw 542 to compact the matrices against a jaw 573 upon the opposite side of the mold. The matrices are then given a further downward movement to press them against the face of the mold. As the presentation-slide reaches this position the foremost separator is pushed into a recess 572 in the slide, which recess is equal in depth to the thickness of the separator, Figs. 105 and 107. As the presentation-slide rises after the logotype is cast (the longitudinal pressure on matrices being relieved by the return of jaw 542) it stops first with its rail 553 opposite a fixed rail or rib 575, which is in line with the rib of the elevator when the latter is at its lower station. A slide 576, Figs. 1, 2, 94, 105, 107, arranged within the rail 434, then moves to the left and pushes the matrices from the presentation-slide onto the fixed rib 575. Slide 576 is operated by link 577, arm 578, rock-shaft 579, arm 580, link 581, cam-lever 582, and cam 583 on the elevator cam-shaft $e$. The cam 583 has three depressions equally spaced on its edge, two of these depressions being sufficient to move the matrices onto the fixed rail 575 only, while the third depression being deeper moves the matrices over the rail 575 and onto the elevator, Figs. 1, 2, 8, and 9. The cam-shafts $c$ and $d$ are geared to run at the same speed, and the elevator-shaft $e$ is geared to run at one-third of the speed of the shafts $c$ and $d$. Hence for each revolution of shafts $c$ and $d$ the shaft $e$ makes one-third of a revolution. The lower elevator-station comprises two rails 108$^a$, having beveled faces against which the elevator-head 108 fits. Upon the rails 108$^a$ are guides 109$^a$, and on the rear rail is a cam-arm 115$^a$, upon which the cam-roll 115 runs to guide the elevator properly into the station, Figs. 14 and 17.

The presentation-slide 570 comprises two relatively movable parts. One of these is the slide proper and the other is a hinged portion 849, Fig. 107. The two parts are normally pressed apart by a spring 850, which holds their lower ends sufficiently apart to permit the matrices to enter the recess 851 freely. The construction of the joint between the two parts prevents the jaws from opening unduly. The lower end of the hinged jaw 849 is slightly beveled, and as the presentation-slide moves into the vicinity of the mold this jaw engages a fixed incline 852, which brings the jaws together and correctly alines the matrices at the time they are presented to the mold.

When the presentation-slide is in its uppermost position, the separator in the recess 572 registers with the rib 406, upon which the separators are reconveyed to their magazine. The separators are then ejected from the presentation-slide onto rail 406 by a pusher 584, Figs. 105, 109, 110, 111. This pusher is connected to a lever 585, pivoted to a standard 586, in which the presentation-slide works. As the presentation-slide moves down an incline 587 on said slide engages a roll 588 on lever 585 and draws the pusher 584 to the left. When the pusher is withdrawn, it is held in such position by a latch 589. When the presentation-slide reaches its uppermost position, it strikes a pin 590 on the latch 589 and releases the lever 585, permitting a spring 591 to throw said lever and its connected pusher 584 to the right, carrying the separator onto the rib 406 and beyond a spring-catch 591$^a$, which prevents the return of the separators. The operations above described are repeated for each word in the line, and the matrices and separators are thus returned to their magazine. As each new line of matrices is moved to the presentation-slide the pawls 458$^a$ move to the left and then to the right, carrying the separators of the preceding line to the separator-magazine. After each third word is cast the elevator rises and carries the matrices which have been accumulated to the distributers. As the line-preceder 427 reaches the presentation-slide it is withdrawn from in front of the line by a pin 833 on arm 834, said pin engaging the notch 835 in the preceder-slide, Figs. 89, 93, 100, 101, 102, 107, and 111. The arm 834 is rocked by means of arm 836, link 837, rocker-arm 839, cam-arm 840, and cam 841, said cam being connected with the arm 460, which operates the separator gathering-slide 458.

Immediately when the preceder 427 is released from the line it is returned to its initial position by the spring-gear operating the slide 433. During its travel back the slide 427 is returned into the path of the succeeding line of matrices by contact with a fixed incline 842, Figs. 93 and 102. The preceder 427 is thus returned to its initial position against the succeeding line of matrices, as illustrated in Figs. 100 and 102.

After the line-forwarder 455 has pushed the last group of matrices into the presentation-slide it is carried back to its initial position by the arm 447. In making this movement it has to pass around and into the rear of the matrices which have been assembled for the succeeding line. As it begins its backward movement it strikes the cam edge of a spring 843$^a$ and is thrown out of the path of the matrices, as illustrated in full lines in Fig. 102. It is held in this position by the spring-bolt 457, Fig. 103, until it reaches the end of its travel, at which point it engages a spring projection 844, which throws it back into its normal position in the rear of the assembler, as shown in Figs. 94, 96, and 100.

When all the logotypes but the last one have been cast, they are measured, and the mold is set to cast a logotype which will exactly fill out the line to the desired length. Theoretically the last logotype should be equal to the combined width of the matrices of the last word; but in practice it is expedient to cast spaces on the logotypes, excepting the last one, which are slightly less in width than the average or normal justifying-space. This practice will leave a slight deficiency in the length of the line, which is supplied by casting a space on the inside of the last logotype. Should the justifying-spaces on the logotypes be of the full width required, the last word would be cast without any space. The mechanism for performing this "final justification" will now be described.

Mounted in the standard 586 and in the path of the line-forwarder 455 is a slide 592, Figs. 107, 109, and 110. When the matrices of the last word enter the presentation-slide, the line-forwarder engages slide 592 and moves it to the left, rocking its connected lever 593, Figs. 6, 8, and 9. Lever 593 operates through link 594 and lever 594$^a$ to raise latch 595, permitting spring 595$^a$ to rock elbow-lever 595$^b$. Lever 595$^b$ through link 503$^a$ and lever 504$^a$ operates the latch 505, releasing the clutch-lever 506, which controls the clutch $v$, Fig. 113. The clutch $v$, like the main clutch, is operated by a spring 596, which tends to move the shoes 597 radially outward by means of elbow-levers 598. The levers 598 are connected to a collar 599, which is fast on a rod 600, sliding within the shaft $b$. Rod 600 is connected with the sliding collar 601, upon which the elbow-lever 506 bears, Figs. 9 and 113. The shaft $b$ is thus started and makes part of a revolution, and it is again stopped by one of the latches 505, said latches having inclined surfaces 602, which rock the lever 506.

As the shaft $b$ rotates its first effect is to return the line-forwarder 455 to its initial position. During the return movement of the line-forwarder the plate 453 rides over and depresses the rear end of lever 524, Figs. 96 and 108, thus releasing the slide 516 and permitting it to partially restore the mold-adjusting devices to their initial or normal positions. The plate 453 has reverse inclines 453$^a$ and 453$^b$ on its ends, causing it to ride under the lever 524 in moving to the left and over said lever in moving to the right. The next effect of the return movement of the line-forwarder is to release the vertical slide 530, permitting the spring 532 to restore the slide 518 to its right-hand or normal position, thus completing the restoration of the mold-adjusting devices to normal position, ready to be set for a new line. As the shaft $b$ continues to rotate, a cam 603, Figs. 2, 4, 9, 11, and 12, operating through lever 604, link 605, arm 606, and rock-shaft 607, throws out clutch-lever 608. On the left end of shaft $c$ is a clutch-disk 609 adjacent to a loose gear 610. The disk 609 carries a bolt 611, which can be thrown into and out of connection with a notch 612 in gear 610, Figs. 12 and 13. A cam-lever 613 is pivoted on the hub of disk 609 and engages the bolt 611. The lever 613 throws the bolt in or out by engagement of the arm 608 with the cam-surfaces 614. A spring 615 tends to hold the lever at either extreme of its movement. The lever 608 is operated to throw the bolt 611 into the notch 612 while the shaft $c$ is at rest. Immediately after the shaft $c$ is started, as will be presently explained, it makes one revolution, during which time the gear 610 is carried around with it. Before the completion of the revolution the arm 608 is moved to the right, and as the gear 610 revolves the lever 613 rides upon said arm, withdrawing the bolt 611. The spring-pawl 616, carried by the arm 608, springs into the notch 612 and stops the gear 610 as the bolt is withdrawn.

A cam 617 on shaft $b$, Fig. 9, operates through an elbow-lever 618, link 619, and lever 620 to move the latch 558, which holds the starting-lever 559. The shafts $c$ and $d$ are thus started, and they make a complete revolution. This takes place immediately after the clutch-lever 608 is operated, as above described.

The gear 610 drives the gear 621, which is fast on the shaft $f$. The shaft $f$ is in line with shaft $d$, but independent thereof, as indicated in Fig. 12. On shaft $f$ are the cams which effect the final justification of the logotypes for each line.

Referring to Fig. 116, 622 indicates a line of logotypes complete, excepting the last word. In a slide 623 is guided a rack 625, upon the right end of which is a measuring-gage 624. The rack 625 is normally forced to the right by a spring-gear 626, carried on the slide 623. Slide 623 is controlled by link 627, cam-lever 628, and cam 629 on shaft $f$, Figs. 8 and 9. At the proper time the measuring-gage 624 is moved by the arm 628 into contact with the partial line of logotypes 622, as shown in Fig. 116. The right end of the line of logotypes is against a fixed abutment, which, as shown, is the inner end of the right wall 630 of the galley 631. The position of the gage is used to determine the width of the mold for casting the last word. For this purpose a stop 632 in the form of a rod is carried by the slide 623, Figs. 89 and 116. The stop 632 is in alinement with the portion 633 of the vise-jaw 542. Before the vise-jaw is moved to the left against the matrices and after the gage 624 has been adjusted the slide 623 and its connected parts are clamped by a pin 634, which is operated by a lever 635, link 636, cam-lever 637, and cam 638 on shaft $f$. The vise-jaw portion 633 is then moved against the stop 632, and the liner 533 moves with it and remains flush with it, no justification being provided for at this time by the ordinary justifying devices. The left-hand vise-jaw 573 of the matrix-clamp is then moved to the right to compact the matrices and close the mold. The extent of movement of jaw 573 is equal to the amount of space to be cast on the last logotype. The jaw 573 is moved by eccentric 639, rock-shaft 640, arm 641, link 642, arm 643, rock-shaft 644, cam-arm 645, and cam 646 on shaft $f$, Figs. 4, 6, 8, 9, and 105. While the parts are in this position, the last logotype is cast. The jaw 573 is held against the mold by the presentation-slide. A spring 647 within a thimble connected to jaw 573 lifts said jaw when the presentation-slide is raised to permit the logotype to be ejected. After the casting operation the completion of the rotation of shaft $f$ restores the measuring-gage 624 to its normal position ready to be brought into operation at the end of the succeeding line. A stop 648, Fig. 116, is provided for limiting the movement of the gage-rack 625 to the left. Stop 648 is adjustably held by the clamping-screw 649 and should be adjusted to the exact length of line which the machine is to produce. On the end of rack 625 is a depending lug $625^a$, which coöperates with a stop $623^a$ on slide 623 to limit the movement of the rack to the right.

*The mold.*—The mold-opening is adjustable both as to width of body and as to position of body with reference to the faces of the type. Referring to Fig. 104, the front mold-section 650 is constantly pressed by a spring 651 into contact with an adjusting-screw 652. Screw 652 is turned by means of a handle 653, which carries a spring plunger or detent 654, adapted to engage with any one of a series of holes in circular plate 655. Said holes correspond to the positions which the handle 653 must occupy when the mold is set for different fonts of type—such as pica, brevier, &c.—as well as to the different positions of the type-faces with respect to the type-bodies.

The rear mold-section 656 is adjustable toward and from the front mold-section. For this purpose it is engaged by a lever 657, pivoted at 658 and having an arm 659, which engages the end 660 of an adjusting-screw 661. To adjust the mold, screw 652 is first set for the particular font to be used, and the screw 661 is then turned until section 656 comes in contact with the liner 533, care being taken to permit a working fit between the liner and the mold-section. The spring-pressed plunger 662 tends to move the section 656 away from the liner. When the matrices are in position for casting and the liner is adjusted, a mold-gate 663 is moved across the open end of the mold. A wedge 664 then moves against the back of the gate and closes the same tightly, and a clamp 665 is then moved against the portion 656 to clamp the mold-sections and the liner close together. The gate 663 is operated by link 666, cam-lever 667, and cam 668. The wedge 664 is operated by link 669, lever 670, and cam 671. The mold-clamp 665 is operated by lever 672, link 673, cam-lever 674, and cam 675, Figs. 8, 9, 104, and 105.

To the forward mold-section is rigidly connected a trimming-knife 676, and a second trimming-knife 677 is connected to a movable shank 678. A spring 679 tends to move the latter knife forward. To adjust the rear knife, the liner is moved between the knives and the spring 679 permitted to press the rear knife against it. A clamping-screw 680, Fig.

109, is then turned down, causing a pin 681 to bear upon the shank 678 and clamp the same in position. The knives will then be located properly to shave the logotypes as they are ejected from the mold by the liner.

*The pump.*—Referring to Figs. 117 to 120, inclusive, 682 indicates the melting-pot, which is suitably supported in a casing 683. Beneath the pot is a gas-burner 684. Casing 683 is carried on arm 685 and arranged to be swung horizontally on a pivot 686, so that the melting-pot may be moved away from the mold and into position where it may be readily inspected. Within the melting-pot is a vertically-movable pump-body 687, guided and supported by two pairs of parallel bars 688, which are pivoted to the pot. A vertical movement is imparted to the pump-body by means of link 689, lever 690, link 691, cam-lever 692, and cam 693 on shaft $c$. The pump-cylinder 694 is in the lower part of the pump-body. Openings 695 permit the metal to flow freely into the lower part of the cylinder. Within the cylinder is the piston or plunger 696, which is operated at proper intervals by lever 697, link 698, lever 699, link 700, lever 701, and cam 702 on shaft $c$. The cams are so shaped that the pump-plunger first moves slightly upward to close the openings 695. The pump and plunger then move together until the nozzle 703 of the pump closes the jet-plate, after which the pump-plunger is given a quick upward movement to drive the molten metal into the mold.

Between the pump and the mold is a jet-plate 704, having a tapering opening, which registers with the mold during the casting operation. The jet-plate is reciprocated between the mold and a jet-ejector 705 by a link 706, cam-lever 707, and cam 708 on shaft $c$. Beneath the jet-plate is a nozzle-plate 709, which is reciprocated by link 710, cam-lever 711, and cam 712 on shaft $c$, Figs. 8 and 120. The jet-ejector 705 is in the form of a vertical slide or plunger carried by lever 713, which is operated in one direction to hold the ejector raised by a spring 714. The slide 704, having the jet-orifice, is first brought to register with the ejector 705, after which slide 709 moves forward and the end of the slide 709 strikes the lower end of lever 713, causing the ejector to move down and push the type-metal from the jet-opening through the opening 715 into the melting-pot. These operations take place in the following order: The pump-nozzle is raised while the opening in slide 709 is in register with the pump-nozzle. The jet-opening is then brought into register with the mold and nozzle and the pump operated. After the metal is injected into the mold the jet-slide 704 is first moved back to trim the logotype and to cut off communication between the pump and the mold. The pump is then returned and both slides 704 and 709 moved forward to cause the ejection of the jet from the jet-slide. The upward movements of pump-body and pump-plunger are effected by means of springs connected to the levers 692 and 701, as shown in Fig. 120. The movements of the slides 704 and 709 are positive in both directions, being controlled by cam-grooves.

As shown in Fig. 119, the opening in the pump-nozzle is substantially circular at its inner end 716, and from this point it flares outward in one direction and inward in the direction at right angles thereto until it terminates in a narrow slit 717 at the upper end. The cross-section of the opening decreases toward the outlet, being about two-thirds less at the outlet 717 than it is at the lower end 716. The nozzle is surmounted by a cap-plate having a slit corresponding to the opening 717, and said cap-plate is beveled at its outer edges to fit the opening in the nozzle-plate. A fixed stop 718, Figs. 120 and 123, is provided to aline the opening in the nozzle-plate with the nozzle of the pump. The link 710 is provided with a pin-and-slot connection with the lever 711, and the link and lever are also connected by a spring 719, thus permitting the slide 709 to be spring-pressed against the stop 718.

The mechanism for assembling the logotypes in lines and transmitting them to the galley is illustrated in Figs. 123 to 127, inclusive. Referring to these figures, 720 indicates a T-shaped plate, which is adapted to slide on the supporting-bracket 721. The plate 720 has at its right side a spur 722, which interlocks with a notch in the forward mold-section 650. The plate 720 is thus adjusted with the forward mold-section and always bears the same relation to said section. On the under side of the forward end of the plate or slide 720 is a pin 723, with which a spring-hook 724 on the under side of the galley engages when the galley is pushed into its operative position, as shown in Figs. 123 and 124. By reason of the connection of the galley with slide 720 the inner end or mouth of the galley always registers with the inner face of the mold-section 650. The galley is locked to the machine solely by the hook 724, and it may be disengaged in a moment when it is desired to unload the type contained in it. Within the galley is a sliding block 725, which recedes as the lines are moved into the galley-mouth and supports the lines in vertical position.

The galley-mouth is provided with a pair of jaws, one above and one below, which serve to retain the lines within the galley in proper position and which form guides against which the logotypes are assembled into lines. The upper jaw 726 is carried by pivoted arms 727 and the lower jaw 728 is carried by pivoted arms 729. The arms 727 729 are connected by segment-gears, as shown in Fig. 124, and one of the arms 729 has a rearward extension 730, which is moved in one direction by spring 731 to close the jaws and is periodically moved in the other direction to open the jaws by a cam projection 732 upon a slide 733. Slide 733 is operated by link 734, arm 735, and cam 736, connected to gear 610 on shaft c, the arm 735 having a pin 737, which carries a roll 738, bearing on said cam. A spring 739 holds the roll in contact with the cam. After each line is completed the slide 733 is moved forward, and its cam opens the jaws at the galley-mouth, causing the lower jaw to register with the bottom of the galley. At this moment the line is pushed into the galley by a pusher 740, which is operated by a spring-link 741, arm 742, rock-shaft 743, spring 744, arm 745, and cam 746 on shaft f.

The pusher 740 is given an independent forward movement after each logotype is cast to shift the logotype over against the jaws at the galley-mouth. This independent movement is imparted by a cam 747, on shaft d, operating through lever 748, link 749, and a hook 750. Hook 750 is interlocked with the pusher, and it draws the pusher back, compressing the spring-link 741 when a word is being ejected from the mold. After the word is opposite the galley the spring-link is permitted to expand and the pusher moves the logotype against the jaws at the galley-mouth, as will be more fully explained hereinafter. A pin-and-slot connection between the link 749 and the lever 748 permits the pusher to be moved forward by the link 741 to transfer the line to the galley. A spring 751 connects the lever 748 with link 749, and a spring 752 presses the roll of lever 748 against its cam 747.

As illustrated in Figs. 123 to 130, inclusive, the logotypes are ejected from the mold by the liner or body-piece 533, which liner follows each logotype until it has passed the knives 676 677 and the entire logotype has passed the right wall 630 of the galley. The logotypes then rest on the assembling-rail 754. When the first logotype has reached this position, the pusher 740 advances and moves the logotype over against the jaws or rails 726 728. While in this position, the logotype is partly in front and partly in the rear of the end of the wall 630 of the galley, as illustrated particularly in Figs. 123 and 130. In the former figure a single logotype is shown in dotted lines in the position in which it is left by the liner 533 and in full lines in the position in which it is left by the pusher 740. As the second logotype is ejected from the mold it engages the rear end of the first logotype and pushes the same to the left. The pusher 740 then moves the second logotype into line with the first. In like manner each succeeding logotype moves those preceding it to the left until a complete line is formed. The slide 733 then advances, and the cam 732 opens the jaws 726 728, the lower jaw moving down until its upper surface registers with the bottom of the galley. The pusher 740 then moves forward, carrying the line into the galley, and the jaws 726 728 immediately close to retain the line in upright position in the galley. The jaws at the galley-mouth serve to form one side of an assembling-channel in which the logotypes are assembled, and they also serve to sustain the lines of logotypes in the galley when the galley is removed from the machine. When it is desired to eject the assembled matter from the galley, a thumb-screw 755 is turned to open the jaws 726 728. The matter may then be ejected by the slide 725.

In Figs. 128 and 129 is illustrated a mechanism by means of which the nozzle 703 of the pump is cleaned after each logotype is cast. Referring to these figures, 756 indicates a wiper which is carried by a slide 757 and normally drawn to the left away from the pump by a spring 758, being held against a stop 759. A shoulder 760 on slide 709 engages a roller carried by a sector-gear 761. An intermeshing sector-gear 762 is connected with the slide 757 by an arm or lever 763 and a link 764. As the slide 709 advances it rocks the sector-gears and draws the wiper 756 to the right, causing it to scrape over the nozzle of the pump and to remove any surplus metal which may have gathered on the nozzle.

On the cam-shafts b and d equalizing or compensating cams are provided for the purpose of equalizing the strains upon the driving-gear which are produced by the several cams. Many of the cams at some parts of their revolution tend to retard the cam-shafts and at other periods tend to assist them. The resultant of these retarding and assisting effects tends to give the shafts irregular or jerky movements and also imparts unequal strains to the driving mechanism and unequal resistance to the motive power. To remedy this trouble, the cam-shafts are provided with compensating or equalizing cams, which are complementary in their effects to the resultant effects of all other cams on the shafts. Referring to Figs. 9, 121, and 122, 765 indicates an equalizing-cam on the shaft d. Bearing on this cam is a roll 766 on a cam-lever 767, which roll is forcibly pressed against the equalizing-cam by a spring 768. The spring is so proportioned and the cam so shaped that their combined effect is complementary to the resultant of the effects of the other cams on shafts c and d, and therefore said shaft offers a substantially constant resistance to the motive power. A similar compensating cam is formed on the cam-wheel 452 on shaft b, said cam operating in conjunction with lever 769 and spring 770, Fig. 7.

In Fig. 131 is illustrated a justified line of logotypes z, and in Fig. 132 the same logotypes are shown separated. Referring to these figures, 771 indicates the ordinary justifying-spaces, which are cast upon all of the logotypes excepting the one at the left end of the line, which is the last logotype cast. If the spaces 771 were of proper width to justify the line, the last logotype would be cast without any space. As heretofore explained, however, if the spaces must deviate from the normal amount required for justification, care is taken that they shall not overrun. It is found preferable to so adjust the mold or the justifying mechanism as to make the justifying-spaces very slightly too small in order to prevent overrunning. In casting the final logotype $z'$ the mold is adjusted independently of the combined thickness of the matrices for the logotype, the adjustment of the mold being equal to the difference between the column-measure and the aggregate width of the existing logotypes in the line. Any deficiency in the justification of a line is therefore made up by a space, which has been termed a "correcting-space," cast upon the inner end of the final logotype. Such a space is indicated at 772 in Figs. 131 and 132. The width or thickness of the correcting-space is generally very small, and for the purpose of illustration it is much exaggerated in the drawings.

It is desirable to be able to stop the machine instantly at any time, and for this purpose a stopping-lever $y$ is provided. As shown in Figs. 8, 9, and 10, the stopping-lever $y$ is connected, by means of arm 828, link 829, and lever 830, with a rod 831, having a forked end which engages a pin $831^a$ on an arm $559^a$, connected with the lever 559, which operates the main clutch $w$. When lever $y$ is thrown to the right against stop-pin 832, the rod 831 rocks the lever 559 and disconnects the main clutch. When the lever $y$ is thrown in the opposite direction, bringing lever 830 against stop $832^a$, it withdraws the rod 831 and permits the main clutch to reëngage and the shaft $a$ to continue its revolution.

The operation of the machine will be understood from the foregoing detailed description. The construction illustrated and described constitutes a form of the invention which has been found to operate satisfactorily. It will be evident, however, that the construction can be varied largely within the scope of the invention, and it is therefore to be understood that the broader claims herein contained are not limited to the particular mechanism and devices illustrated and described. It will also be evident that various features of the present invention are applicable to various classes of composing-machines, those in which ordinary printers' type are set and distributed, as well as those in which type or bars are cast from matrices. While the term "matrices" has been used in this specification for convenience, it is intended that such term shall include ordinary type or dies, as well when it is used in such connection or relation that the words "type" or "dies" might readily be substituted therefor.

Having thus fully described the invention, what we claim, and desire to secure by Letters Patent, is—

1. The combination of a matrix-magazine, means for assembling a line of matrices, means for casting a line of logotypes, and means for returning the matrices to the magazine.

2. The combination of a matrix-magazine, means for assembling a line of matrices, means for casting logotypes successively to form a line, and means for returning the matrices to the magazine.

3. The combination of a matrix-magazine, a separator-magazine, means for assembling a line of matrices and separators, means for casting a line of logotypes, and means for returning the matrices and separators to their magazines.

4. In a typographic machine, the combination with a mold, of means for separating word-matrices from a line thereof, mechanism for presenting word-matrices successively to the mold, and mechanism for casting logotypes successively from said word-matrices.

5. In a typographic machine, the combination of means for assembling letter-matrices to form a line thereof, means for separating the line into word-matrices, a mold, means for presenting the word-matrices successively to the mold, and mechanism for casting logotypes successively in said mold.

6. The combination of a matrix-magazine, means for assembling a line of matrices, a justifying mechanism, means for casting a justified line of logotypes, and means for returning the matrices to the magazine.

7. In a typographic machine, the combination with a mold, of means for successively presenting groups of matrices to the mold, and means for independently adjusting the mold for each group of matrices and casting slugs therein, and means for assembling the slugs in lines.

8. In a typographic machine, the combination with a mold, of means for successively presenting groups of matrices to the mold, and means for independently adjusting the mold for each group of matrices, said latter means including a justifying mechanism, whereby the mold is adjusted for justification.

9. The combination of means for assembling a line of matrices and separators, a justifying mechanism controlled by the number of intervals in the line and the measurement of the line of matrices, and means controlled by the justifying mechanism for casting a justified line of logotypes.

10. In a machine of the class described, the combination with mechanism for assembling individual matrices in lines, and justifying mechanism, of casting mechanism constructed and arranged to produce individual logotypes having integral justifying-spaces, and means for presenting word groups of matrices successively to the casting mechanism.

11. In a machine of the class described, the combination of a matrix-magazine, means for assembling a line of matrices, a justifying mechanism, means for casting justified logotypes separately and successively to form a line, and means for returning the matrices to their magazine.

12. A machine for producing justified lines of logotypes comprising the following elements: a line of assembled matrices representing the characters to be produced; means whereby the assembled line is employed to determine the spaces necessary for justification; and means acting upon the assembled matrices to separate them into groups and to present them to the casting mechanism whereby a series of logotypes representing the words and justifying-spaces integral therewith are cast one at a time.

13. A machine for producing justified typelines comprising the following elements: a line of assembled matrices representing the words admissible within the prescribed measure; means to determine the spaces necessary between the words to effect justification of the line; and means to separate the word groups of matrices and to cast individually from them the several words together with the integral spaces proper to justify the line.

14. A machine for producing type-lines comprising the following elements: an assembled line of individual matrices representing the words admissible within the prescribed measure; means to determine the additional space necessary to justify the line and to apportion it among the several words; and means to separate the groups of matrices representing words and to cast therefrom a series of logotypes sufficiently longer than the words to form a justified line.

15. A machine for producing justified typelines of prescribed length comprising the following elements: means to measure the aggregate width of the characters admissible within the line and thereby to determine the width of the spaces necessary between the words to justify the line; and means to cast the logotypes successively, each representing an individual word and the space necessary between such word and the next word.

16. A machine for producing a line of logotypes comprising the following elements: an assembled line of matrices for all the characters in the line; means to separate these matrices into groups corresponding each to a single logotype; and means to cast the logotypes individually and consecutively from the groups.

17. A machine for producing a line of logotypes of predetermined length comprising the following elements: an assembled line of matrices for all the characters in the line; means to separate the matrices into groups corresponding each to a single logotype; and means to cast the logotypes individually and consecutively as the groups are separated, and to form upon each logotype except one a justifying-space so that collectively they will fill out the predetermined length of line.

18. A machine for producing a line of logotypes of predetermined length comprising the following elements: means to measure the total justifying-space to be filled out in the line and to apportion it among the several words; and means to produce the logotypes individually and consecutively and to form a justifying-space upon each logotype except one, so that said spaces collectively will fill out the total justifying-space.

19. A machine for producing a line of logotypes of predetermined length comprising the following elements: means to measure the total space to be filled out in the line and to apportion this space among the several words; and means to produce the logotypes individually and consecutively and to form upon each logotype except one its apportioned share of justifying-space.

20. A machine for producing a justified line of logotypes comprising the following elements: means to represent the characters for the entire line; means to measure the excess space to be filled out in the line; means to apportion the excess space among the several words; and means to produce the several logotypes and to form upon each logotype except one its apportioned share of the excess space.

21. A machine for producing a line of logotypes of predetermined length comprising the following elements: means to represent the characters for the entire line; means to measure the excess space to be filled out in the line; means to apportion the excess space among the several words; and means to produce the several logotypes individually and consecutively and to form upon each logotype except one its apportioned share of the excess space so that collectively they will fill out the predetermined length of line.

22. A machine for producing a line of logotypes of predetermined length comprising the following elements: a plurality of matrices for all the characters in the line; means to measure the excess space to be filled out in the line; means to apportion the excess space among the several words; and means to cast the several logotypes consecutively and to form upon each logotype except one its apportioned share of the excess space, so that collectively they will fill out the predetermined length of line.

23. In a machine of the class described, the combination with casting mechanism, of means for detaching word-matrices from a line thereof and presenting them successively to the casting mechanism, for the purpose set forth.

24. In a machine of the class described, the combination with casting mechanism including an adjustable mold and justifying mechanism arranged to adjust the mold, of means for detaching word-matrices from a line thereof and presenting them successively to the mold, and means for operating the casting mechanism to cast justified logotypes.

25. In a machine of the class described, the combination with means for assembling a line of matrices and separators, of means for casting logotypes, said casting mechanism being intermittently operated, and means brought into action by the assembled line for starting the casting mechanism.

26. In a machine of the class described, the combination with means for assembling a line of matrices and separators, of means for casting logotypes, said casting mechanism being intermittently operated, means for presenting word groups of matrices to the casting mechanism, and means brought into action by the assembled line for starting the casting mechanism as each group of matrices is presented to it.

27. In a machine of the class described, the combination with means for assembling a line of matrices and separators, of means for casting logotypes, said casting mechanism being intermittently operated, and means brought into action by the separators for starting the casting mechanism.

28. The combination of a matrix-magazine, matrices therefor, means for assembling a line of matrices, means for casting logotypes successively to form a line, means for assembling the line of logotypes, and means for returning the matrices to the magazine.

29. A machine for producing a line of logotypes of predetermined length comprising the following elements: a plurality of matrices for all the characters in the line; means to measure the excess space to be filled out in the line; means to apportion the excess space among the several words; and means to cast the several logotypes individually and consecutively and to form upon each logotype except one its apportioned share of the excess space so that collectively they will fill out the predetermined length of line.

30. A machine for producing a justified line of logotypes comprising the following elements; an assembled line of matrices representing all the characters for the line; means to measure the assembled line of matrices; an adjustable mold; and means actuated by the measuring devices to adjust the mold together with means for producing logotypes individually and consecutively in the mold.

31. A machine for producing a justified line of logotypes comprising the following elements: an assembled line of matrices representing all the characters for the line; means to measure the assembled line of matrices; an adjustable mold member; and means actuated by the measuring devices to adjust the mold member together with means for producing logotypes individually and consecutively in the mold.

32. A machine for producing a justified line of logotypes comprising the following elements: an assembled line of matrices to represent all the characters in the line; an adjustable mold; devices to measure the assembled line of matrices and to adjust the mold; and means to alter the adjustment of the mold so that a logotype may be cast without a justifying-space.

33. A machine for producing a justified line of logotypes comprising the following elements: an assembled line of matrices to represent all the characters in the line; an adjustable mold member; devices to measure the assembled line of matrices and to adjust the mold member; and means to release the mold member from its adjusted position in order that a logotype may be cast without a justifying-space.

34. A machine for producing logotypes comprising the following elements: an assembled line of matrices and space-blanks; casting mechanism; means to receive the word-matrices and to present them individually and consecutively to the casting mechanism; and means to remove the matrices and space-blanks from the presentation means.

35. A machine for producing logotypes comprising the following elements: an assembled line of matrices and space-blanks; casting mechanism; a suitably-actuated slide to receive the word-matrices individually and consecutively and to present them to the casting mechanism; and means to remove the matrices and space-blanks from the presentation-slide.

36. The combination of a plurality of assembled letter-matrices constituting several word-matrices, a mold, means for presenting the word-matrices successively to the mold, and mechanism for casting logotypes successively in said mold.

37. The combination with a mold, of means for successively presenting groups of matrices to the mold, matrix-clamping means for adjusting the mold for each group of matrices, and justifying means for effecting an independent adjustment of the mold, for the purpose set forth.

38. The combination of a composed line of matrices representing a plurality of words, an adjustable mold, to coöperate consecutively with the word groups, and means controlled by the composed line of matrices to determine the adjustment of the mold.

39. The combination of a composed line of matrices representing a plurality of words, a mold to coöperate consecutively with the word groups, an adjustable mold member, and means controlled by the composed line of matrices to determine the adjustment of the mold member.

40. The combination of a line of matrices, an adjustable mold to coöperate consecutively with the word groups, and an intermediate device through which the composed line of matrices determine the adjustment of the mold to produce a line longer than the matrix-line.

41. The combination of a line of matrices, a mold to coöperate consecutively with the word groups, an adjustable mold member, and an intermediate device through which the composed line of matrices determine the adjustment of the mold member to produce a line longer than the matrix-line.

42. The combination of a composed line of matrices, space-blanks of distinctive form dividing the matrices into groups, a mold and means controlled by the line to determine the length of the mold in excess of the groups presented thereto, so that the series of slugs may produce a justified line longer than the matrix-line.

43. The combination of a composed line of matrices, space-blanks of distinctive form dividing the matrices into groups, a mold member, and means controlled by the line to determine the adjustment of the mold member in relation to the groups presented thereto, so that the series of slugs may produce a justified line longer than the matrix-line.

44. The combination with a mold of means for successively presenting groups of matrices to the mold, and means for adjusting the mold for each group of matrices, said latter means including a justifying mechanism whereby the mold is adjusted for justification.

45. The combination of an assembled line of matrices and space-blanks, a justifying mechanism controlled by the number of intervals in the line and the measurement of the assembled line, and means controlled by the justifying mechanism for casting a justified line of logotypes.

46. The combination with casting mechanism including an adjustable mold and justifying mechanism arranged to adjust the mold, of means for detaching word-matrices from a line thereof and presenting them successively to the mold, and means for operating the casting mechanism to cast justified logotypes.

47. The combination with casting mechanism including an adjustable mold member and justifying mechanism arranged to adjust the mold member, of means for detaching word-matrices from a line thereof and presenting them successively to the mold, and means for operating the casting mechanism to cast justified logotypes.

48. The combination with casting mechanism including an adjustable mold, of a justifier arranged to adjust the mold, an assembled line of matrices and space-blanks, means for presenting the matrix of each word independently to the mold, and means for operating the casting mechanism to cast justified logotypes.

49. The combination with casting mechanism including an adjustable mold provided with an adjustable justifying member, of means arranged to adjust the said member, an assembled line of matrices and space-blanks, means for presenting the matrix of each word independently to the mold, and means for operating the casting mechanism to cast justified logotypes.

50. The combination with a composite word-matrix comprising a plurality of individual matrices, of an adjustable mold, means for clamping the matrices while presented to the mold, and means independent of the clamping means for adjusting said mold a predetermined amount to cast from said matrix a logotype having a predetermined space thereon.

51. The combination with a composite word-matrix having a plurality of individual matrices, of an adjustable mold, and means for adjusting said mold to cast a logotype of predetermined length to accurately complete a justified line of logotypes.

52. The combination with a composite word-matrix having a plurality of individual matrices, of an adjustable mold and an adjustable justifying member, and means for automatically adjusting said mold and justifying member to cast from said matrix a logotype having a predetermined space thereon.

53. The combination with a composite word-matrix having a plurality of individual matrices, of an adjustable mold having an adjustable justifying member, and means for adjusting said mold and said justifying member to cast a logotype of predetermined length adapted to accurately complete a justified line of logotypes.

54. The combination of an assembled line of matrices, an adjustable mold and an adjustable mold member, means whereby the mold is adjusted by the matrices presented thereto, and a measuring device for the line of matrices and connections to adjust the mold member therefrom.

55. The combination with casting mechanism of means for detaching word-matrices from a line thereof and presenting them successively to the casting mechanism.

56. In a machine of the class described, the combination with casting mechanism including an adjustable mold, of a justifier arranged to adjust the mold, means for assembling a line of matrices and separators, means for presenting the matrices of each word independently to the mold, means for operating the casting mechanism to cast justified logotypes, means for assembling the logotypes in line, and means for distributing the matrices.

57. The combination of an assembled line of matrices, a mold to coöperate consecutively with the word groups, an adjustable mold member, devices to measure the assembled line of matrices and to adjust the mold member, and means to hold the mold member in its adjusted position.

58. The combination of an assembled line of matrices, an adjustable mold member, devices to measure the assembled line of matrices and to adjust the mold member, means to hold the mold member in its adjusted position, and further means to release the mold member from its adjusted position.

59. In a machine for producing a justified line of logotypes, means for casting each logotype of a line excepting the last with an integral justifying-space, in combination with means for casting the last logotype of the line with an integral correcting-space, whereby errors in the justifying-spaces are corrected in the last logotype and accurate justifications insured.

60. In a machine for producing a justified line of logotypes, the combination of means for casting and assembling the logotypes for a line, excepting the last one, said logotypes being provided with justifying-spaces, means for measuring the logotypes so assembled to ascertain the amount of space remaining to be filled, and means for casting the last logotype for the line of a width to exactly fill said space.

61. In a machine for producing justified lines of logotypes, means for casting logotypes for a line, excepting the last one, with integral justifying-spaces, means for ascertaining the exact measurement for the last logotype, and means for casting said last logotype with an integral correcting-space on its inner end, whereby all of the spacing is located between the words.

62. In a typographic machine, the combination of means, including a mold, for casting and assembling the logotypes for a line, excepting the last one, a gage, means for setting said gage in accordance with the aggregate measurement of said logotypes, and means for setting the mold by said gage for casting the last logotype whereby a perfectly-justified line is produced.

63. In a typographic machine, the combination with means, including a mold, for casting and assembling the logotypes of a line, excepting the last one, a gage, means for setting said gage in accordance with the aggregate measurement of said logotypes, means for clamping said gage, and means for setting the mold by said gage for casting the last logotype, whereby a perfectly-justified line is produced.

64. In a typographic machine, the combination of means for producing a partial line of logotypes, means for measuring said partial line, and means controlled by said measurement for producing a logotype to complete the line to the predetermined length, whereby a perfectly justified line is produced.

65. In a typographic machine, the combination of means for producing a partial line of composition which requires but a single word or syllable to form a complete line, means for measuring said partial line, and means controlled by said measuring means for completing the line, whereby a perfectly-justified line is produced.

66. In a typographic machine, the combination of means for producing a partial line of composition which requires but a single word or syllable to form a complete line, means for measuring said partial line to determine the exact amount necessary to justify the line, and means for determining from said measurement a final space which together with the last word will produce a justified line.

67. In a typographic machine, the combination of means for assembling a partial line of composition with justifying-spaces between the words thereof, means for measuring said partial line and means controlled by said measurement for casting a logotype of suitable length to justify the line.

68. In a typographic machine, the combination of means for assembling a partial line of composition with justifying-spaces between the words thereof, means for measuring said partial line, means controlled by said measurement for determining the final space necessary to justify the line, and means for producing a final space to complete the justification of the line.

69. In a typographic machine, the combination of means for assembling a partial line with justifying-spaces between the words thereof, means for measuring said partial line, means controlled by said measurement for determining the final space necessary to justify the line, and means for casting a final space to complete the justification of the line.

70. A justifying mechanism comprising an angle-bar, a toothed segment for moving the angle-bar, and means controlled by the space-blank mechanism to actuate the segment.

71. In a typographic machine, a justifying mechanism comprising an angle-bar, a toothed segment for moving the angle-bar, and a moving pawl controlled by the space-key.

72. In a typographic machine, the combination with means for assembling a line of matrices and separators, of a justifying device comprising an angularly-movable bar, means for adjusting said bar in accordance with the number of separators in a line, means for bringing said bar into conjunction with a part whose location indicates the length of the unjustified line, and casting mechanism controlled by said justifying mechanism.

73. In a typographic machine, the combination of a mold, means for assembling a line of matrices and separators, and a justifier comprising a slide, a bar pivoted on said slide, means for giving said bar an angular movement in proportion to the number of separators in the line, means for moving the slide an amount dependent upon the length of the line to be justified and the angular position of the bar, and connections between the said slide and the mold, for the purpose set forth.

74. In a typographic machine, a justifying mechanism comprising an angle-bar, a toothed segment connected to the bar, and a moving pawl controlled by the space-key for adjusting said angle-bar, the teeth of said segment being unequally spaced, for the purpose set forth.

75. In a typographic machine, the justifying mechanism comprising a pivoted bar, means for moving said bar about its pivot in proportion to the number of word-spaces in a line, and means for moving said bar bodily into a limiting-space proportionate to the shortage of the line.

76. In a typographic machine, the combination with means for assembling a line, of a pivoted bar, means for moving said bar about its pivot in proportion to the number of word-spaces in a line, and a support for said bar movable transversely of the line, for the purpose set forth.

77. In a typographic machine, the combination with means for assembling a line of matrices and separators, of a justifying device comprising an angularly-movable bar, means for adjusting said bar in accordance with the number of separators in a line, means for bringing said bar into conjunction with a part whose location indicates the length of the unjustified line, and casting mechanism controlled by said justifying mechanism.

78. In a typographic machine, the combination with a matrix-magazine, a circulating series of matrices, and means for assembling matrices to form a line of word-matrices, of a mold, automatic means to variably adjust the mold to cast logotypes of different lengths, and means to automatically return the matrices to the magazine after the casting operation.

79. In a typographic machine, the combination with a matrix-magazine, a separator-magazine, circulating series of matrices and separators, a keyboard, and means controlled by the keyboard for assembling matrices and separators to form lines of word-matrices, of a mold, automatic means to variably adjust the mold to cast logotypes of different lengths, and means to automatically return the matrices and separators to their respective magazines after the casting operation.

80. In a typographic machine, the combination with a matrix-magazine, circulating series of matrices and separators, a keyboard, and means controlled by the keyboard for assembling lines of matrices and separators, of a justifying mechanism, a mold, automatic means to variably adjust the mold to cast logotypes adapted to form justified lines, and means to automatically return the matrices and separators to their magazines after the casting operation.

81. In a typographic machine, a justifying device comprising an angle-bar, a moving pawl, and a segmental rack having teeth the spacing of which gradually varies, whereby the constant movement of the pawl imparts a variable angular movement to the angle-bar.

82. In a typographic machine, a justifying device comprising an angle-bar, a segmental rack connected with said angle-bar, a space-key, and a pawl operating in response to the space-key and arranged to move said rack step by step to adjust the angle-bar for different lines.

83. In a typographic machine, a font-separator comprising a series of testing devices, means for subjecting the matrices to the testing devices successively, chutes or receptacles to receive the matrices of the respective fonts, and a distributer receiving matrices from said receptacles.

84. In a typographic machine, a font-separator comprising a series of font-feelers, means for bringing the matrices successively into contact with the feelers to test the same, and font chutes or receptacles for receiving the matrices which pass the feelers.

85. In a typographic machine, a font-separator comprising a series of font chutes or receptacles, and a series of sets of font-feelers, testing-slides arranged to carry matrices into contact with the font-feelers, and a transfer-slide arranged to transfer the matrices intermittently to the successive testing-slides.

86. In a typographic machine, the combination of a distributing mechanism, an assembling mechanism arranged to assemble lines of matrices and separators, and a casting mechanism for casting logotypes from word groups of matrices, with an elevator for raising the matrices from the casting mechanism to the distributer, said elevator being arranged and operated to carry a plurality of word groups of matrices to the distributer at each ascent.

87. In a typographic machine, the combination with a distributer, an assembling mechanism, a casting mechanism, and an elevator, of a lower elevator-station adapted to receive a plurality of word groups of matrices, means for transferring said word groups of matrices successively from the casting mechanism to said lower station and from the lower station to the elevator, and an upper elevator-station at which the matrices are discharged to the distributer.

88. In a typographic machine, the combination with a distributer, of an elevator for raising matrices to the distributer, said elevator being constructed and operating to impart to the matrices a quarter-turn in elevating them, for the purpose set forth.

89. In a typographic machine, the combination with a distributer, and a casting mechanism, of an elevator for raising matrices from the casting mechanism to the distributer, said elevator comprising a rocking arm, a lever pivoted at the end of said arm, means on said lever for receiving and supporting a line of matrices, and means for turning said lever through an arc of ninety degrees as the matrices are carried from the mold-station to the elevator-station.

90. In a typographic machine, the combination of matrix-assembling mechanism, casting mechanism and distributing mechanism, with an elevator, means for accumulating a plurality of groups of matrices between the casting mechanism and the elevator, and means for operating the elevator periodically to carry the accumulated matrices to the distributing mechanism, the casting mechanism being operated prior to each upward movement of the elevator.

91. In a typographic machine, a distributer for separating matrices into groups or fonts, in combination with a swinging frame upon which said distributer is mounted, and means for locking said frame to hold the distributer in its operative position.

92. In a typographic machine, the distributer constructed to distribute matrices into groups or fonts, a series of receptacles into which the matrices are distributed, and a frame carrying said distributer, said frame being movable, as and for the purpose set forth.

93. In a typographic machine, the combination of a distributer constructed to distribute matrices into groups or fonts, a character-distributer, and movable frames upon which said distributers are respectively mounted.

94. In a typographic machine, the combination with a plurality of magazines, of a distributing apparatus supported above the magazines, and a movably-mounted frame carrying said distributing apparatus, said frame being movable to expose the magazine-mouths.

95. In a typographic machine, the combination with a magazine, of a hinged counterbalanced frame above the magazine, and a distributing mechanism carried by said frame.

96. In a typographic machine, the combination with a magazine, of a movable frame above the magazine, a distributing mechanism carried by said frame, means for operating the distributing mechanism, and means for automatically stopping the distributing mechanism when the frame is raised to expose the magazine.

97. In a typographic machine, the combination with a magazine, of a movable frame above the magazine, a distributing mechanism supported on said frame, means for operating said distributing mechanism including a clutch, and means for automatically disconnecting said clutch when the frame is raised.

98. In a typographic machine, a distributing apparatus comprising a series of magazines adapted to receive a series of fonts of matrices, a series of carriers arranged to travel above said magazines, a font-distributer to separate matrices by fonts and deliver them to the carriers, means for circulating the carriers with relation to the magazines, and means for discharging the matrices from the carriers to their respective magazine-compartments.

99. In a typographic machine, a matrix-carrier provided with a plurality of rows of cells, a plurality of magazines, means in the carrier for sustaining matrices in the cells, means for moving the carrier step by step relative to the magazines, and means for testing the matrices at each step and releasing such matrices as register with their proper magazine-compartments.

100. In a distributer of a typographic machine, a carrier having a plurality of cells and having each cell provided with a pair of matrix-supporting pawls and means for holding said pawls yieldingly in either operative or inoperative position.

101. In a distributer of a typographic machine, a carrier having a plurality of rows of cells, and matrix supporting and releasing devices for each cell, in combination with a plurality of magazines, said carrier being arranged to distribute matrices to all of said magazines.

102. In a distributer of a typographic machine, a series of independent carriers, each carrier having a plurality of rows of cells and matrix supporting and releasing devices for each of the cells, in combination with a plurality of magazines, and means for moving said series of carriers step by step over said magazines.

103. In a distributer of a typographic machine, the combination of a font-separator, a series of chutes or channels into which the several fonts are transferred from said separator, a plurality of magazines corresponding to the fonts to be distributed, and carriers movable step by step, said carriers receiving matrices from the font-separator and transferring them to their respective magazines.

104. In a distributer of a typographic machine, the combination of a matrix-carrier having a plurality of cells, matrix supporting and releasing devices for said cells, means for moving the carrier step by step with relation to a magazine, and a series of feelers arranged to test the matrices at each step, said feelers coöperating with the matrix-releasing devices to release the matrices when they register with their proper magazine-compartments.

105. In a distributer for typographic machines, the combination with a plurality of parallel magazines, of a series of matrix-carriers, and means for moving said carriers in a substantially rectangular path with relation to said magazines.

106. In a distributer for a typographic machine, a plurality of magazines arranged in two groups, in combination with a series of matrix-carriers, means for moving said carriers step by step along the front group of magazines, means for transferring said carriers and moving them step by step along the rear group of magazines, and means for again transferring said carriers to the front group, whereby the carriers travel in substantially rectangular paths and coöperate with all of the magazines.

107. In a typographic machine, the combination with a plurality of magazines, of a series of matrix-carriers arranged to travel step by step over said magazines, a series of feeler-bars arranged one over each magazine, and means for reciprocating the feeler-bars vertically, said feeler-bars being adapted to test each matrix until it reaches its appropriate magazine-compartment.

108. In a distributer of a typographic machine, a matrix-carrier having a plurality of cells, matrix-supporting devices movable in and out of each cell, a feeler-bar having a plurality of yielding feeler devices, means for subjecting the matrices in the carrier to successive feelers, and means whereby each feeler effects the withdrawal of the supports from the matrix to which it corresponds.

109. In a distributing mechanism for typographic machines, the combination of a matrix-carrier having a plurality of matrix-cells, matrix-supporting devices for each cell, a series of feelers each arranged to withdraw the supports from its corresponding matrix, and means for returning said supports to a position to receive new matrices.

110. In a distributer for a typographic machine, the combination with a magazine, a series of carriers, and means for imparting a step-by-step movement to said carriers, of a series of feeler-bars arranged above the carriers, a horizontal frame in which said feeler-bars are supported, and means for reciprocating said frame vertically.

111. In a typographic machine, the combination with the matrix-carriers and the gears imparting a step-by-step movement to said carriers, of the reversely-toothed ratchet-wheel, the moving-pawl, and the two holding-pawls, all arranged to give said carriers an accurate step-by-step movement.

112. In the distributer of a typographic machine, means for imparting a definite step-by-step movement to the carriers comprising the reversely-toothed ratchet-wheel 229, moving-pawl 232, the locking-pawl 234, the reverse-locking pawl 237 for preventing overmotion, and means for throwing said latter pawl out of engagement with the ratchet-wheel intermittently, for the purpose set forth.

113. In a typographic machine, a series of independent magazines, each magazine being independently removable without disturbing the remaining magazines and being provided with relatively movable means for raising its contained matrices and supporting the same when the magazine is removed from the machine.

114. In a typographic machine, a series of independently-removable magazines in combination with means for locking and unlocking said magazines in their operative positions in the machine, each magazine being provided with relatively movable means for supporting its contained matrices when removed from the machine.

115. In a typographic machine, a series of independently-removable magazines, in combination with a locking-bar and locking devices upon the several magazines adapted to engage with said bar and lock said magazines in their operative positions in the machine.

116. In a typographic machine, a series of independently-removable magazines, each magazine having at its lower end a movable retaining-bar, and means for automatically bringing said bar into position to support the matrices in the magazine when the latter is removed.

117. In a typographic machine, a plurality of magazines, a movable retaining-bar at the bottom of each magazine, means for yieldingly holding said retaining-bar in position to support the matrices when a magazine is in its operative position, and means for positively locking said retaining-bar in such position when a magazine is removed from the machine.

118. In a typographic machine, a plurality of magazines, in combination with retaining-bars for normally closing the magazine-outlets, and a locking-bar common to all of the magazines, said locking-bar being movable and constructed to lock and unlock the several magazines.

119. In a typographic machine, the combination of a plurality of magazines for different fonts, with a funnel having a plurality of channels for directing matrices from the magazines to a common assembling-point, and means for bringing said funnel into coöperation with any one of said magazines.

120. In a typographic machine, the combination of a plurality of magazines for a plurality of fonts of matrices, a funnel having two branches, and means whereby either one of said branches may be brought into action, said funnel branches being so arranged that one must be inoperative while the other is operative.

121. In a typographic machine, a series of independently-removable magazines, each magazine comprising a frame and a channel member removably inserted in the frame said channel member comprising a connected series of channels.

122. In a typographic machine, a series of independently-removable magazines, each magazine comprising a frame, a channel member removably held in the frame, and locking devices for securing the channel member to the frame said channel member comprising a connected series of channels.

123. In a typographic machine, the combination with a plurality of magazines, of a funnel arranged to coöperate with any one of said magazines to direct the matrices therefrom to a common discharge-opening, said funnel being adapted to rock about an axis passing through said discharge-opening.

124. In a typographic machine, a plurality of magazines for lower-case characters, and a plurality of magazines for upper-case characters, a funnel having a branch for lower-case characters and a branch for upper-case characters, and means for shifting the funnel at will to coöperate with different magazines.

125. In a typographic machine, the combination with a series of independent magazines, each magazine being independently removable without disturbing the remaining magazines, of a distributer arranged to distribute into all of said magazines, and assembling mechanism below the magazines.

126. In a typographic machine, a plurality of upper-case magazines and a plurality of lower-case magazines, side by side in rectangular arrangement in combination with a distributer arranged to distribute into all of the magazines, and means below the magazines for assembling type or matrices from all of the magazines at a common point.

127. In a typographic machine, a series of independently-removable and interchangeable magazines, each magazine being removable without disturbing the remaining magazines, in combination with latches for holding the respective magazines in position and with a common lock for all of said magazines.

128. In a typographic machine, a series of independently-removable magazines, said magazines being arranged side by side in parallel planes, and each magazine being removable by an edgewise lateral sliding movement in its own plane, without disturbing the remaining magazines.

129. In a typographic machine, a plurality of independently-removable channeled magazines arranged side by side, a matrix-locking member on each magazine and common to all the channels thereof, and means for operating said members to lock and unlock the matrices in the several magazines, for the purpose set forth.

130. In a typographic machine, a plurality of upper-case magazines, and a corresponding plurality of lower-case magazines, each magazine having a plurality of channels and a movable device for normally retaining the type or matrices therein, in combination with means for simultaneously releasing the type or matrices in any upper-case magazine and the corresponding lower-case magazine.

131. In a typographic machine, a plurality of upper-case magazines, and a corresponding plurality of lower-case magazines, each magazine having a plurality of channels and a movable device for normally retaining the type or matrices therein, in combination with a rod common to all of said magazines, said rod coöperating with the retaining devices and being adapted to simultaneously release the type or matrices in any upper-case magazine and its corresponding lower-case magazine.

132. In a typographic machine, a removable magazine, in combination with escapement mechanism, and a relatively movable device connected with the magazine and independent of the escapement mechanism for sustaining the matrices in the magazine when the latter is removed from the machine.

133. In a typographic machine, a removable channeled magazine in combination with a relatively movable device carried by said magazine and common to the several channels thereof, said device being adapted to engage the matrices and sustain them when said magazine is removed from the machine.

134. In a typographic machine, a plurality of removable and interchangeable channeled magazines, each provided with a relatively movable device common to the channels thereof and adapted to engage and sustain the matrices in the magazine when the latter is removed from the machine.

135. In a typographic machine, a series of removable magazines, provided respectively with permanently-connected locking devices for retaining the matrices therein when the magazines are removed from the machine, in combination with escapement mechanism adapted to sustain the matrices when they are released from their locking devices.

136. In a typographic machine, a channeled magazine for matrices in combination with a relatively movable matrix-locking device permanently connected thereto and extending across the channels and adapted to engage the lowest matrices in the several channels.

137. In a typographic machine, a plurality of removable channeled magazines, each provided with a matrix-locking device comprising a bar extending transversely across the channels and movable to engage and disengage the lowest matrices in the several channels.

138. In a typographic machine, a plurality of removable channeled magazines, each provided with a matrix-locking device comprising a pivotally-mounted bar extending transversely across the channels and movable to engage and disengage the lowest matrices in the several channels.

139. In a typographic machine, the combination of a removable magazine, with permanently-connected relatively movable means for engaging and sustaining the lowest matrices in the magazine, and means for locking said engaging means.

140. In a typographic machine, the combination of a movable magazine having a plurality of matrix-channels and relatively movable means connected to the magazine and common to the channels and independent of the escapements for locking the matrices in the magazine to prevent accidental discharge thereof when the magazine is removed.

141. In a typographic machine, the combination of a removable magazine and means for locking the matrices in the magazine to prevent accidental discharge thereof when the magazine is removed, said means being automatically operated as the magazine is withdrawn from the machine.

142. In a typographic machine, the combination of a removable magazine and means for locking the matrices in the magazine to prevent accidental discharge thereof when the magazine is removed, said locking means being automatically operated when the magazine is withdrawn from and replaced in the machine to lock and unlock the matrices respectively.

143. In a typographic machine, the combination with a magazine, of escapement devices for releasing the matrices successively, and means to raise the matrices and free them from the escapement devices.

144. In a typographic machine, a channeled magazine, escapement devices for discharging the matrices therefrom and means to raise the matrices in all of the channels to free them from the escapement devices.

145. In a typographic machine, a channeled magazine, escapement devices supported by the magazine and upon which the matrices in the magazine rest when the magazine is operative, and means to support the matrices independently of the escapement devices when the magazine is inoperative.

146. In a typographic machine, a channeled magazine in combination with a laterally and vertically movable bar, adapted to engage and raise the matrices in the magazine, for the purpose set forth.

147. In a typographic machine, a channeled magazine in combination with a pivotally-mounted bar adapted to engage the lowest matrices in the magazine, and means for rocking said bar into and out of engagement with said lowest matrices.

148. In a typographic machine, the combination with a plurality of magazines, of a common escapement for the corresponding channels of the magazines, and means for preventing the release of the matrices by said escapement.

149. In a typographic machine, the combination with a plurality of magazines, of a common escapement for corresponding channels of the several magazines, and means adapted to be operated at will for preventing the release of the matrices by said escapement.

150. In a typographic machine, the combination with a plurality of magazines, of a common escapement for corresponding channels of the several magazines, and means for disengaging the matrices of any magazine at will from said escapement.

151. In a typographic machine, the combination with a plurality of magazines, of a common escapement for the corresponding channels of the magazines, and means for raising the matrices in any magazine to disengage them from said escapement.

152. In a typographic machine, a plurality of parallel magazines in combination with escapement-bars common to the several magazines, and upon which the matrices normally rest, and means to raise said matrices to free them from the escapement-bars.

153. In a typographic machine, a plurality of magazines in combination with a plurality of escapement devices, each escapement device being common to all of said magazines.

154. In a typographic machine, a plurality of magazines, in combination with a plurality of escapement devices, each escapement device being common to all of said magazines, and selective mechanism adapted to render the escapement devices operative upon any desired magazine.

155. In a typographic machine, a plurality of magazines, in combination with a plurality of escapement devices, each escapement device being common to all of said magazines, and selective mechanism adapted to render said escapements operative or inoperative with respect to any particular magazine, as desired.

156. In a typographic machine, the combination with a magazine, of an escapement device, means for operating the escapement device to release a matrix from the magazine, and means operable at will for preventing the discharge of the matrix when the escapement is operated.

157. In a typographic machine, a plurality of magazines, a common escapement for releasing corresponding matrices from the corresponding channels of the several magazines, and independent means for preventing or permitting the discharge of matrices when the escapement is operated.

158. In a typographic machine, a plurality of magazines, a common escapement for releasing matrices from the corresponding channels of the several magazines, and means adapted to prevent said escapement from releasing matrices from any selected magazine.

159. In a typographic machine, a plurality of magazines, each having a laterally-movable transverse member adapted to engage the terminal matrices and move them backward within the magazine.

160. In a typographic machine, a plurality of magazines, each provided with a transverse movable member adapted to move downward and outward to release the matrices and to move inward and upward to raise and retain the matrices in the magazine.

161. In a typographic machine, a plurality of magazines, each provided with a transverse movable member adapted to engage the terminal matrices and move them backward within the magazine, and means for locking said member.

162. In a typographic machine, a magazine provided with a permanently-connected movable member adapted to engage the terminal matrices and move them backward within the magazine.

163. In a typographic machine, a magazine having a transversely-arranged laterally-movable member adapted to engage the terminal matrices and move them backward within the magazine.

164. In a typographic machine, the combination with a magazine having a plurality of normally inoperative sections, and means for rendering any section operative, of an escapement-bar extending beneath all of said sections and arranged to coöperate with any operative section, and means to reciprocate the said bar to release matrices from the operative section.

165. In a typographic machine, a magazine having a plurality of upper-case sections and a plurality of lower-case sections, a retaining-bar for each section arranged to normally retain the matrices therein, and means whereby but one of said retaining-bars may be withdrawn and a single section rendered operative at a time.

166. In a typographic machine, the combination with a magazine having a series of sections, of a series of escapement-bars, each bar extending beneath all of the magazine-sections and being provided with means to release the lowest matrix in an operative section and retain the other matrices therein.

167. In a typographic machine, the combination of a magazine having a plurality of sections, of a plurality of escapement-bars arranged beneath the magazine, each bar extending transversely beneath all of the magazine-sections, openings in said bars through which matrices may pass to the assembler, and a keyboard and intermediate mechanism for operating the escapement-bars.

168. In a typographic machine, the combination with a magazine having a plurality of sections, of a plurality of reciprocating escapement-bars each bar being arranged to coöperate with all of the magazine-sections, means independent of the escapement for rendering the magazine-sections operative or inoperative at will, a keyboard, and power-operated mechanism for reciprocating the escapement-bars in response to the keyboard.

169. In a typographic machine, a magazine having a plurality of upper-case sections and a corresponding plurality of lower-case sections, all of said magazine-sections being normally inoperative, and means for rendering any upper-case section and its corresponding lower-case section simultaneously available without rendering the remaining sections available.

170. In a typographic machine, a magazine having a plurality of independent sections each provided with a plurality of channels, said sections being independently removable and each provided with automatic means independent of the escapement devices for retaining the matrices therein when removed.

171. In a typographic machine, a magazine in combination with a series of escapements upon which the matrices normally rest, and with a transversely-arranged laterally-movable member adapted to engage the matrices and free them from the escapements.

172. In a typographic machine, a series of magazines, in combination with a distributing mechanism arranged to simultaneously distribute into all of said magazines, an assembling mechanism also common to all of said magazines, and a single keyboard controlling said assembling mechanism.

173. In a typographic machine, a series of parallel magazines in rectangular arrangement, in combination with a distributing mechanism arranged to distribute simultaneously into all of said magazines, and an assembling mechanism coöperating with all of said magazines.

174. In a distributer for a typographic machine, the combination of a series of matrix-carriers, a magazine having a plurality of sections, means to move the carriers parallel with the sections and a pair of slides at each end of the magazine-sections arranged to move the carriers transversely to the magazine.

175. In a typographic machine, a magazine adapted to receive and sustain matrices one above the other upon their sides, turning-channels arranged directly beneath the magazine-channels and into which the matrices drop sidewise, and abutments in said channels for giving the matrices a quarter-turn to direct them endwise to the assembler.

176. In a typographic machine, the combination with a magazine, of the turning-channels beneath the magazine, and the movable funnel beneath the turning-channels.

177. In a typographic machine, the combination with a magazine having a plurality of sections normally inoperative, a movable funnel adapted to coöperate with any one of said sections, means for moving the funnel, and means connected with the funnel for rendering any one of the magazine-sections operative whereby the funnel is made to register with the operative magazine-sections.

178. In a typographic machine, a magazine in combination with a funnel for bringing matrices to a common point comprising front and back plates, intermediate ribs or partitions, and converging flexible guides at its edges upon which the matrices impinge and travel.

179. In a typographic machine, the combination with a series of separator-plates each having an undercut notch, of a rail adapted to enter and support said separators, and means for disengaging the separators from the rail successively.

180. In a typographic machine, the combination of a series of separators, each having an undercut notch, a magazine-rail adapted to engage said notches and support the separators, means for discharging the separators successively from said rail, and means for automatically returning the separators to the magazine-rail.

181. In a typographic machine, the combination with a separator-rail, of means for discharging separators successively from one end of the rail, means for supplying separators to the opposite end of the rail, and a slide movable along the rail and provided with pawls adapted to engage the separators and move them toward the discharging end of the rail.

182. In a typographic machine, the combination with a series of separators, of a rail upon which said separators are supported, means for discharging the separators successively from one end of the rail, a slide provided with pawls for engaging the separators, means for urging said slide normally in the direction in which the separators are discharged, and means for reciprocating said slide periodically in the opposite direction to collect any separators which may be at the receiving end of the rail.

183. In a typographic machine, the combination with an assembling mechanism, and a channel for conducting matrices to said assembling mechanism, of an opening in said channel, a separator-magazine adjacent to said opening, and means for feeding separators individually through said opening into the channel.

184. In a typographic machine, the combination with means for assembling a line of matrices and separators, of means for producing a justified cast line comprising justifying mechanism controlled by the number of separators and the actual measurements of the assembled line, and a casting mechanism controlled by the justifying mechanism.

185. In a typographic machine, the combination with a casting mechanism including a mold, of a justifying mechanism arranged to adjust the mold, and means for releasing the mold from the control of the justifier at will.

186. In a typographic machine, the combination with a casting mechanism including an adjustable mold, of a justifying mechanism, and intermediate devices whereby the mold is adjusted by the justifying mechanism, said devices including means, such as the spindle 520$^a$, whereby the control of the mold by the justifying mechanism may be suspended.

187. In a typographic machine, means for presenting a matrix to a mold, in combination with means for adjusting the walls of the mold above and below the character on the matrix, whereby the depth of the type-body and the position of the letter on said body may be varied at will a body-piece, and means for automatically moving one of said walls to alternately clamp and release the body-piece.

188. In a typographic machine, the combination with means for assembling a plurality of matrices, of a mold comprising four relatively movable walls, means for adjusting two of said walls manually, and automatic means for moving the remaining walls whereby the slug is ejected from the mold.

189. In a typographic machine, a mold having two adjustable sections, and a movable body-piece between said sections, an adjusting device for one of said sections provided with an index, and means for automatically moving the other section toward and away from the body-piece to clamp and release said body-piece, for the purpose set forth.

190. In a typographic machine, a mold having two adjustable sections, and an intermediate adjustable body-piece, screw-threaded devices for adjusting said sections independently, and automatic means for closing said sections tightly upon the body-piece when the latter is adjusted and releasing said body-piece after the casting operation.

191. In a typographic machine, the combination with a mold, comprising two sections and an intermediate body-piece, of the slide 663 for closing the end of the mold, the wedge for clamping said slide, and automatic means for operating said slide and wedge.

192. In a machine of the class described, the combination with the mold, of a presentation-slide having a rib thereon adapted to support matrices in position to be presented to the mold.

193. In a typographic machine, the combination with a mold, and means for presenting word-matrices to the mold successively to form the words of a line, of a movable right-hand vise-jaw and means for moving said jaw to clamp the matrices of each word excepting the last one, a movable left-hand vise-jaw, and means for moving said left-hand jaw to clamp the matrices for the last word of a line only.

194. In a typographic machine, the combination with means for assembling matrices and presenting them to a mold, of a movable body-piece or liner for the mold, a vise-jaw movable relatively to the body-piece, and justifying mechanism arranged to control the movement of the vise-jaw relatively to the body-piece, for the purpose set forth.

195. In a typographic machine, the combination with a mold, and means for assembling and presenting matrices to the mold, of a movable body-piece for varying the length of the mold-opening, a matrix-clamp movable relatively to the body-piece, a stop for alining the end of the body-piece and matrix-clamp, and justifying mechanism arranged to control the relative movement of the body-piece and matrix-clamp.

196. In a typographic machine, the combination of means for assembling and presenting groups of matrices to a mold, of a movable body-piece closing one end of the mold, a transversely-movable slide closing the opposite end of the mold, a matrix-clamping jaw normally flush with one end of the mold, a movable matrix-clamp at the other end of the mold, and means for controlling the movement of the body-piece relatively to said latter clamp whereby justifying-spaces are cast upon the characters formed in the mold.

197. In a typographic machine, the combination with a mold adapted to cast logotypes, and means for presenting word-matrices to said mold, of a matrix-clamp at one end of the mold, and means for adjusting the same relatively to the mold to cast justifying-spaces, and a matrix-clamp at the opposite end of the mold, and means for adjusting said latter clamp to cast a correcting-space on the logotype, for the purpose set forth.

198. In a typographic machine, the combination with a mold, of a presentation-slide comprising two relatively movable jaws, means for introducing matrices into said slide between said jaws when the latter are partially separated, and means for closing the jaws to aline the matrices.

199. In a typographic machine, the combination with a mold, of the presentation-slide having means for receiving and sustaining matrices and having a recess adapted to receive a single separator, and means for engaging the matrices and separators of a line successively with the presentation-slide.

200. In a typographic machine, the combination with the mold, and the vertically-movable presentation-slide, of the assembling-rail and means for assembling a line of matrices and separators thereon, the separator-rail above said assembling-rail, the elevator-station rail adjacent to the presentation-slide, means for engaging the matrices and separators respectively with the presentation-slide, and means for discharging the matrices onto the elevator-station rail and the separators onto the separator-rail.

201. In a typographic machine, the combination of a mold, a melting-pot and pump, a jet-slide and a nozzle-slide located between the pump and mold, and means for moving said slides independently.

202. In a typographic machine, the combination with a mold and a pump, of a jet-slide movable transversely to the mold, a nozzle-slide movable parallel with the jet-slide, and means for moving the jet-slide, before the nozzle-slide is moved, to cut off communication between the pump and mold.

203. In a typographic machine, the combination with a mold and a pump, of a jet-slide, a nozzle-slide, and a device operated by said nozzle-slide for ejecting the jet therefrom.

204. In a typographic machine, the combination with means for assembling a plurality of matrices and presenting the matrices to a mold, of a mold comprising two relatively movable sections, and an intermediate body-piece, means for adjusting one of said sections, and a slug-trimming knife connected to and movable with said section.

205. In a typographic machine, the combination with a mold, of a pump-nozzle movable to and from the mold, a nozzle-plate having an opening therein in which the pump-nozzle fits when moved up to the mold, and a wiper arranged to move across the nozzle when the latter is withdrawn from the mold.

206. In a typographic machine, a mold comprising two adjustable sections and an intermediate body-piece, means tending to move said sections away from the body-piece whereby the latter may be freely adjusted, and automatic means for clamping the sections upon the body-piece during the casting operation.

207. In a typographic machine, a mold comprising two sections, and an intermediate body-piece, springs tending to move the said sections away from the body-piece, adjusting-screws for moving said sections toward the body-piece, and automatic means for clamping said sections upon the body-piece during the casting operation.

208. In a typographic machine, a mold having four adjustable walls, in combination with automatic mechanism for adjusting two of said walls.

209. The combination of a channeled magazine, movable means secured thereto, and common to all the channels, to confine the matrices therein, and means for locking said confining means.

210. In a typographic machine, the combination with means for assembling a plurality of matrices, and means for presenting the matrices in a group to the mold, of a mold having a movable end wall, means for retracting said wall, and means for ejecting the slug in an endwise direction from the mold.

211. In a typographic machine, the combination of means for assembling a line of matrices and separators, a yielding resistant against which the line is assembled, a casting mechanism, a line-forwarder arranged to forward said line and said yielding resistant to the casting mechanism, means for immediately withdrawing the resistant and returning it to its initial position before the casting takes place, and means for returning the line-forwarder to its initial position after the last matrices have been presented to the mold.

212. In a typographic machine, the combination with matrices having undercut notches, of a presentation-slide having a rail adapted to enter said notches whereby the matrices are supported by the presentation-slide.

213. In a typographic machine, a presentation-slide having two relatively movable jaws, and means for normally separating said jaws, of means for engaging matrices with said slide between the jaws, and means for closing the jaws to aline the matrices as they are presented to the mold.

214. In a typographic machine, the combination with a mold, and a presentation-slide movable toward and away from the mold, of two relatively movable jaws on said slide, and a fixed part adapted to engage and close said jaws upon the matrices as the latter are presented to the mold.

215. In a typographic machine, the combination with means for assembling a line of matrices and separators, of a presentation-slide adapted to receive word-matrices while in one position and adapted to receive a separator while in another position whereby the matrices and separators are separated.

216. The combination with a composite matrix composed of a plurality of individual matrices, of an adjustable mold, means for adjusting the mold to correspond to said matrix to cast a logotype, and independent means to adjust the mold to cast a space on the logotype.

217. The combination with a composite matrix composed of a plurality of individual matrices, of an adjustable mold, automatic means for adjusting the mold to correspond to said matrix, and automatic means to adjust the mold additionally for justification.

218. The combination with a composite matrix composed of a plurality of individual matrices, of an adjustable mold and means for automatically adjusting said mold to cast from said matrix a logotype having a predetermined space thereon.

219. In a typographic machine, the combination with means for assembling a plurality of matrices and means for presenting the matrices thus assembled in a group to the mold, of a mold movable transversely to the line of matrices, and an adjusting device for said mold provided with a suitable index, whereby the position of the type-faces on the slug may be varied.

220. A matrix for a typographic machine having a series of font-distributing nicks in one side, a series of character-distributing nicks in the opposite side and a character impression in its end.

221. A matrix for a typographic machine having a series of font-distributing nicks in one side, a series of character-distributing nicks in the opposite side, a character impression in one end and an undercut notch in the opposite end.

222. In a typographic machine, the combination of mechanism for composing matrices, a presentation-slide for carrying said matrices to the mold, means for transferring the matrices in a straight path to said presentation-slide, an elevator for transferring the matrices to the distributing mechanism, and means for transferring the matrices from the presentation-slide to the elevator.

223. In a typographic machine, the combination of means for composing a line of matrices, a mold, a vertically-movable presentation-slide, a distributing mechanism, an elevator, means for moving the matrices into engagement with the presentation-slide, means for moving the presentation-slide vertically to carry the matrices to the mold, and means for transferring the matrices from the presentation-slide to the elevator.

224. In a typographic machine, the combination of a way and means for assembling matrices and separators thereon, a mold lower than said way, a presentation-slide movable vertically to carry the matrices from said way to said mold, an elevator-station above the mold, means for transferring the matrices horizontally from the way to the presentation-slide, and means for transferring the matrices horizontally from said presentation-slide to said elevator-station.

225. In a typographic machine, the combination of a way and means for assembling matrices and separators thereon, a vertically-movable presentation-slide, means for moving said slide intermittently to different elevations, means for delivering the matrices and separators to said slide at one elevation, a mold with which said matrices coöperate at another elevation, means for discharging the matrices from the slide at a third elevation, and means for discharging separators from the slide at a fourth elevation.

226. In a typographic machine, the combination with means for assembling a line of matrices and separators, and with an adjustable mold, of a movable presentation-slide, means for engaging word groups of matrices with said presentation-slide successively, means for moving the slide to carry said word group of matrices to the mold, and means for discharging said word groups of matrices successively from the presentation-slide after the casting operations.

227. In a typographic machine, a presentation-slide movable to different stations, means for assembling a line of matrices and separators, means for engaging the separators successively with one part of said presentation-slide, means for engaging the word groups of matrices successively with another part of said slide, means for discharging said separators from the presentation-slide to their magazine, and means for discharging the word groups of matrices from the presentation-slide.

228. In a typographic machine, means for assembling a line of matrices, means for shifting the line endwise in a straight path, a vertically-movable presentation-slide to receive the matrices and present the same to a mold, an elevator for carrying the matrices to a distributing mechanism, and means for transferring the matrices from the presentation-slide to the elevator after the casting operation.

229. In a typographic machine, means for assembling a line of matrices, a way upon which said matrices are assembled, a mold at a different level from said way, an elevator-station above the mold, a presentation-slide arranged to carry the matrices from said way to said mold and from said mold to said station, and an ejector for moving the casting from the mold, all of said parts being arranged in a common plane.

230. In a typographic machine, the combination of the following elements arranged in a vertical plane at different elevations, viz: a way upon which the matrices are assembled, a mold, an elevator-station, and a separator-magazine in combination with a presentation-slide adapted to receive matrices and separators from said way, said slide being movable to carry the matrices to the mold, and then to said elevator-station and also movable to deliver said separators to the separator-magazine.

231. In a typographic machine, the combination with means for assembling a line of matrices and separators, of a way upon which said separators and matrices are assembled, a presentation-slide coöperating with said way to receive the matrices and separators therefrom, a mold with which said presentation-slide coöperates, and means for separating the separators from the matrices before presenting the latter to the mold.

232. In a typographic machine, the combination with a way and means for assembling matrices and separators thereon, of a presentation-slide movable transversely to said way and having independent means for sustaining the separators and matrices.

233. In a typographic machine, the combination with a way and means for assembling matrices and separators thereon, of a presentation-slide movable transversely to said way, said slide having means at its lower end for sustaining the matrices and independent means above said end for sustaining the separators.

234. In a typographic machine, the combination with a way and means for assembling matrices and separators thereon, of a vertically-movable presentation-slide having means for receiving the separators and independent means for receiving and sustaining the matrices, and a mold to coöperate with said matrices while sustained in said presentation-slide.

235. In combination, a plurality of magazines, a constantly-operative distributer for all the magazines, a single assembler and movable means through which the matrices may be delivered to the assembler from one magazine or another at will.

236. In a typographic machine, the combination with means for assembling a plurality of matrices, and means for presenting the same to a mold, of a mold and means for adjusting said mold bodily with respect to the position of the matrices when presented to the mold, whereby the position of the type-faces on the body of the slug may be varied.

237. In a typographic machine, the combination with means for assembling a plurality of matrices and means for presenting the same to a mold, of a mold comprising two members and an intermediate body-piece, and means for adjusting said members and body-piece relative to the casting position of the matrices, whereby the position of the type-faces on the slugs may be varied.

238. In a typographic machine, the combination of two groups of magazines, selective means for bringing into action any magazine of one group and its corresponding magazine of the other group, assembling mechanism, and power-operated means for rendering the assembling mechanism operative upon either of said selected magazines at will.

239. In a typographic machine, the combination with a plurality of upper-case magazines, a plurality of lower-case magazines, assembling mechanism, means for bringing the assembling mechanism into operation upon any one of said magazines, said assembling mechanism being adapted to coöperate with but one magazine at a time.

In testimony whereof we affix our signatures, at Baltimore, Maryland, this 9th day of December, 1901, in presence of two witnesses.

[L. S.] SAFE DEPOSIT & TRUST
 COMPANY OF BALTIMORE,
By JNO. W. MARSHALL,
 *2d Vice-Prest.*, ABNER GREENLEAF,
*Executors of Ottmar Mergenthaler, deceased.*

EMIL LAWRENZ.

Witnesses:
 JOHN J. NELLIGAN,
 FRANK N. MASLIN.